United States Patent
Tanabe et al.

(10) Patent No.: US 9,862,605 B2
(45) Date of Patent: Jan. 9, 2018

(54) NITROGEN-CONTAINING CARBON ALLOY, METHOD FOR PRODUCING SAME, CARBON ALLOY CATALYST, AND FUEL CELL

(71) Applicant: FUJIFILM Corporation, Minato-ku, Tokyo (JP)

(72) Inventors: Jun Tanabe, Ashigarakami-gun (JP); Naoya Hatakeyama, Ashigarakami-gun (JP); Michio Ono, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 733 days.

(21) Appl. No.: 14/463,291

(22) Filed: Aug. 19, 2014

(65) Prior Publication Data
US 2014/0356760 A1 Dec. 4, 2014

Related U.S. Application Data

(63) Continuation of application No. PCT/JP2013/053926, filed on Feb. 19, 2013.

(30) Foreign Application Priority Data

Feb. 20, 2012 (JP) ................................ 2012-033640

(51) Int. Cl.
*C01B 21/082* (2006.01)
*B01J 27/24* (2006.01)
(Continued)

(52) U.S. Cl.
CPC ............. *C01B 21/082* (2013.01); *B01J 27/24* (2013.01); *C01B 21/0828* (2013.01);
(Continued)

(58) Field of Classification Search
CPC .... C01B 21/082; C01B 21/0828; B01J 27/24; H01M 4/9041; H01M 2008/1095; C01P 2006/12
See application file for complete search history.

(56) References Cited

U.S. PATENT DOCUMENTS

| | | | |
|---|---|---|---|
| 2009/0041653 A1 | 2/2009 | Hwang et al. | |
| 2011/0245071 A1* | 10/2011 | Tanabe | B01J 23/745 502/180 |
| 2014/0051860 A1 | 2/2014 | Tanabe | |

FOREIGN PATENT DOCUMENTS

| | | |
|---|---|---|
| JP | 2009-040673 A | 2/2009 |
| JP | 2010-524195 A | 7/2010 |

(Continued)

OTHER PUBLICATIONS

International Preliminary Report on Patentability dated Sep. 4, 2014, issued by the International Searching Authority in counterpart Application No. PCT/JP2013/053926.
(Continued)

*Primary Examiner* — Ula C Ruddock
*Assistant Examiner* — Matthew W Van Oudenaren
(74) *Attorney, Agent, or Firm* — Sughrue Mion, PLLC

(57) ABSTRACT

A problem to be solved by the invention is to provide a production method of a nitrogen-containing carbon alloy that has sufficiently high redox activity or has a large number of reaction electrons of redox reaction. A method for producing a nitrogen-containing carbon alloy comprising baking a precursor containing a nitrogen-containing organic compound and an inorganic metal salt containing one or more kinds of Fe, Co, Ni, Mn and Cr, wherein: the precursor satisfies one of the requirements (a) and (b) below, and, the nitrogen-containing organic compound is one of a compound represented by the formula (1) below, a tautomer of (Continued)

the compound, and a salt and hydrate thereof: (a) the precursor contains the inorganic metal salt in an amount exceeding 45% by mass based on the total amount of the nitrogen-containing organic compound and the inorganic metal salt of the precursor, in which the total amount includes the mass of hydrated water in the nitrogen-containing organic compound and the inorganic metal salt, and the amount of the inorganic metal salt includes the mass of hydrated water in the inorganic metal, (b) the precursor further contains a β-diketone metal complex:

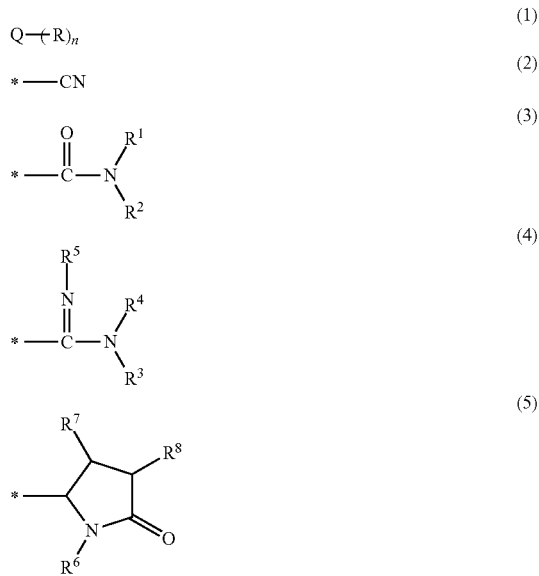

18 Claims, 1 Drawing Sheet

(51) Int. Cl.
    *H01M 4/96*    (2006.01)
    *H01M 4/90*    (2006.01)
    *H01M 8/1018*  (2016.01)

(52) U.S. Cl.
    CPC .......... *H01M 4/9041* (2013.01); *H01M 4/96* (2013.01); *C01P 2006/12* (2013.01); *H01M 2008/1095* (2013.01)

(56) References Cited

FOREIGN PATENT DOCUMENTS

JP    2011-225431 A    11/2011
WO    2008/127828 A1   10/2008

OTHER PUBLICATIONS

Office Action dated Jun. 2, 2015 from the Japanese Patent Office in counterpart Japanese Application No. 2013-030352.
Jun Maruyama et al., "Direct synthesis of a carbonaceous fuel cell catalyst from solid containing small organic molecules and metal salts", Carbon, 2010, pp. 3271-3276, vol. 48.
Pierre Kuhn et al., "From Microporous Regular Frameworks to Mesoporous Materials with Ultrahigh Surface Area: Dynamic Reorganization of Porous Polymer Networks", J. Am. Chem. Soc., Sep. 13, 2008, pp. 13333-13337, vol. 130, No. 40.
Pierre Kuhn, et al., "Toward Tailorable Porous Organic Polymer Networks: A High-Temperature Dynamic Polymerization Scheme Based on Aromatic Nitriles", Macromolecules, 2009, pp. 319-326, vol. 42, No. 1.
Carine E. Chan-Thaw et al., "Covalent Triazine Framework as Catalytic Support for Liquid Phase Reaction", Nano Lett., 2010, pp. 537-541, vol. 10.
Parminder Kaur et al., "Porous Organic Polymers in Catalysis: Opportunities and Challenges", ACS Catal., 2011, pp. 819-835, vol. 1.
Jiayin Yuan et al., "Ionic Liquid Monomers and Polymers as Precursors of Highly Conductive, Mesoporous, Graphitic Carbon Nanostructures", Chem. of Mater., 2010, pp. 5003-5012, vol. 22, No. 17.
Jian Tian et al., "Optimized Synthesis of Fe/N/C Cathode Catalysts for PEM Fuel Cells: A Matter of Iron—Ligand Coordination Strength", Angew. Chem. Int. Ed., 2013, pp. 1-5, vol. 52.
International Search Report for PCT/JP2013/053926.
Written Opinion for PCT/JP2013/053926.

\* cited by examiner

NITROGEN-CONTAINING CARBON ALLOY, METHOD FOR PRODUCING SAME, CARBON ALLOY CATALYST, AND FUEL CELL

CROSS-REFERENCE TO RELATED APPLICATIONS

This application is a Continuation of PCT International Application No. PCT/JP2013/053926, filed Feb. 19, 2013, which claims priority under 35 U.S.C. Section 119(a) to Japanese Patent Application No. 2012-033640 filed on Feb. 20, 2012. Each of the above applications is hereby expressly incorporated by reference, in its entirety, into the present application.

TECHNICAL FIELD

The present invention relates to a nitrogen-containing carbon alloy, a method for producing the same, and a carbon alloy carbon catalyst and a fuel cell using the same.

RELATED ART

An electrode catalyst for a solid polymer electrolyte fuel cell necessarily has both high oxygen reduction catalytic activity and high electroconductivity. A noble metal catalyst using platinum (Pt), palladium (Pd) or the like has been used as a catalyst having high oxygen reduction catalytic activity for a solid polymer electrolyte fuel cell used, for example, in an automobile, a home cogeneration system and the like. However, it is the current situation that a noble metal catalyst is high in cost and thus is hard to spread.

Accordingly, techniques have been developed for a catalyst that has a largely reduced in use of platinum and a catalyst that is formed without platinum. For example, there are proposals of a catalyst using a carbon alloy obtained in such a manner that a precursor of a resin or the like is mixed with a metal complex, such as cobalt phthalocyanine or iron phthalocyanine, the mixture is polymerized to form a polymer, and the polymer is baked to form the carbon alloy.

Non Patent Document 1 discloses anon-platinum catalyst for a fuel cell formed by mixing and baking a nitrogen-containing polycyclic organic compound having a cyano group, ferric gluconate dihydrate as an organic metal complex, and magnesium acetate tetrahydrate as a precursor of metal oxide as a template. There is described that the amount of the organic metal complex added is 1% by mass Fe based on the sum of the nitrogen-containing polycyclic organic compound and the organic metal complex, and the amount of the precursor of metal oxide as a template is 50% by mass in terms of magnesium acetate based on the nitrogen-containing polycyclic organic compound.

Patent Document 1 describes the use as a non-platinum catalyst for a fuel cell of a carbon alloy obtained by baking a precursor containing a nitrogen-containing crystalline organic compound having a cyano group and cobalt chloride or iron chloride as an inorganic metal salt. The literature describes that the range of at least one selected from an inorganic metal and an inorganic metal salt is from 0.001 to 45 parts by mass per 100 parts by mass of the sum with the nitrogen-containing crystalline organic compound.

Patent Document 2 has a description relating to carbon for a catalyst for a fuel cell obtained by baking a precursor containing sucrose, a transition metal precursor and silica particles. The literature describes that the amount of the transition metal precursor added is from 0.3 to 3 mol per 1 mol of sucrose, an Non Patent Documents the amount of the silica particles added is from 0.25 to 2 mol per 1 mol of sucrose, which are thus converted, for example, to an amount of the silica particles of from 30 to 81 parts by mass per 100 parts by mass of the sum of the silica particles and sucrose.

Non Patent Documents 2 to 5 describe a production method relating to porous carbon for a catalyst of a fuel cell obtained by baking a precursor containing a nitrogen-containing organic compound and zinc chloride.

Non Patent Document 6 describes a method of baking a precursor containing a salt of a nitrogen-containing organic compound and iron chloride. However, there is no description relating to a non-platinum catalyst for a fuel cell.

Patent Document 3 describes a production method of a cathode catalyst of a fuel cell containing a step of forming a metal-containing polymer by thermally decomposing in a substantially inert atmosphere a mixture containing at least one kind of a nitro-containing or amino-containing aromatic compound, such as 4-phthalimide, and at least one kind of a transition metal salt, and a step of forming a metal-containing cathode catalyst of a fuel cell by activating the metal-containing polymer by heating in the presence of a nitrogen-containing activator.

RELATED ART DOCUMENT

Patent Document

[Patent Document 1] JP-A-2011-225431
[Patent Document 2] JP-A-2009-40673
[Patent Document 3] JP-T-2010-524195

Non Patent Document

[Patent Document 1] Jun Maruyama, etc., Carbon, 48, 3271 (2010)
[Patent Document 2] Pieer Kuhn, etc., J. Am. Chem. Soc., 130, 13333 (2008)
[Patent Document 3] Pieer Kuhn, etc., Macromolecules., 4, 319 (2009)
[Patent Document 4] Carine E. Chan-Thaw, etc., Nanolett., 10, 537 (2010)
[Patent Document 5] Parminder Kaur, etc., ACS Catal., 1, 819 (2011)
[Patent Document 6] Jiayin Yuan, etc., Chem. Mater., 22, 5003 (2010)

SUMMARY OF INVENTION

Technical Problem

However, as a result of investigations by the present inventors for the production methods described in the literatures, it has been found that all of them are unsatisfactory. Specifically, the carbon alloy described in Non Patent Document 1 has low oxygen reduction activity. While not sticking to any theory, magnesium acetate tetrahydrate has a melting point 80° C., whereas magnesium acetate, which is a thermal decomposition product of magnesium acetate tetrahydrate, has a melting point of 2,852° C., and it is expected that both of them are not melted within a temperature range that is optimum for forming catalytic activity by the baked nitrogen-containing organic compound.

It has been found that the carbon alloy described in Patent Document 1 contains only a small amount of the metal salt added, has a small increase of the specific surface area by acid cleaning of the metal formed, and has low catalytic activity, and thus there is a demand of improvement in enhancement of the catalytic activity.

It has been found that the catalyst for a fuel cell described in Patent Document 2 used no nitrogen-containing organic compound, and thus is unsatisfactory in the catalytic activity.

It has been found that the carbon alloys described in Non Patent Documents 2 to 5 form porous carbon, but do not have sufficient capability in the catalytic activity. While not sticking to any theory, it is expected that zinc chloride used becomes a molten salt at 275° C. on temperature rising, and thus has a considerably small specific surface area on coordinating the nitrogen-containing organic compound to zinc chloride, thereby failing to form catalytically active sites, or zinc chloride fails to form Zn through thermal decomposition below 1,000° C., and thus the nitrogen-containing organic compound fails to provide catalytically active sites.

It has been found that in the method described in Non Patent Document 6, porous carbon may not be provided due to the small amount of iron chloride added, and the catalytic activity may not be enhanced.

It has been found that the cathode catalyst of a fuel cell described in Patent Document 3 is unsatisfactory in the catalytic activity and is demanded to be improved. While not sticking to any theory, it is expected that with the nitro-containing or amino-containing aromatic compound, such as 4-phthalimide, used in Patent Document 3, in the temperature rising process, a nitro group is released and emitted to fail to introduce nitrogen to graphite, whereas an amino group is reacted with a nitrile group to fail to form catalytically active sites with coordination of the metal and the nitrile group, and 4-phthalimide may not undergo ring opening due to the stability thereof and may not coordinate to the metal to fail to introduce nitrogen to graphite, thereby failing to provide a favorable nitrogen-containing carbon alloy.

An object of the invention is to solve the problems described above. Specifically, a problem to be solved by the invention is to provide a production method of a nitrogen-containing carbon alloy that has sufficiently high redox activity or has a large number of reaction electrons of redox reaction.

Solution to Problem

The inventors have made earnest investigations for solving the problems. As a result, it has been found that a nitrogen-containing carbon alloy enhanced in the oxygen reduction reaction (ORR) activity may be produced by baking a precursor using a nitrogen-containing organic compound having a particular structure and a particular inorganic metal salt, wherein (a) the precursor is prepared to have an amount of the inorganic metal salt added exceeding a particular range, or (b) a precursor further contains a β-diketone metal complex. In particular, it has been found that with an expectation that carbon of a cyano group is important as a carbon source for forming graphite and a nitrogen source on introducing nitrogen to graphite with coordination to the metal, a nitrogen-containing carbon alloy enhanced in the oxygen reduction reaction (ORR) activity may be produced by using a nitrogen-containing organic compound having a cyano group or a substituent that easily forms a cyano group through dehydration, condensation, decomposition or the like. It has been found furthermore that the imide described in Patent Document 3 is not suitable for the method of the invention since the 5-membered ring structure is stable and may not undergo ring opening due to the stability thereof and may not coordinate to the metal.

As a result, the invention has been completed. The problems thus solved by the following measures.

[1] A method for producing a nitrogen-containing carbon alloy comprising baking a precursor containing a nitrogen-containing organic compound and an inorganic metal salt containing one or more kinds of Fe, Co, Ni, Mn and Cr, wherein:

the precursor satisfies one of the requirements (a) and (b) below, and, the nitrogen-containing organic compound is one of a compound represented by the formula (1) below, a tautomer of the compound, and a salt and hydrate thereof:

(a) the precursor contains the inorganic metal salt in an amount exceeding 45% by mass based on the total amount of the nitrogen-containing organic compound and the inorganic metal salt of the precursor, in which the total amount includes the mass of hydrated water in the nitrogen-containing organic compound and the inorganic metal salt, and the amount of the inorganic metal salt includes the mass of hydrated water in the inorganic metal, (b) the precursor further contains a β-diketone metal complex:

Formula (1)

wherein, Q represents a 5-membered to 7-membered aromatic or heterocyclic ring, R represents a substituent represented by the following formulae (2) to (5), and n represents an integer of from 1 to 4;

Formula (2)

Formula (3)

Formula (4)

Formula (5)

wherein, $R^1$ to $R^8$ each independently represent a hydrogen atom, a substituted or unsubstituted alkyl group, a substituted or unsubstituted aryl group, a substituted or unsubstituted heterocyclic group, or a substituted or unsubstituted heterocyclic group that is formed by taking $R^1$ and $R^2$ together, or taking $R^3$ and $R^4$ together, or taking $R^7$ and $R^8$ together, and * represents a site bonded to Q.

[2] The method for producing a nitrogen-containing carbon alloy according to [1], comprising baking a precursor containing at least one nitrogen-containing organic compound, an inorganic metal salt containing one or more kinds of Fe, Co, Ni, Mn and Cr, and at least one β-diketone metal complex, wherein:

the nitrogen-containing organic compound is one of a compound represented by the following formula (1), a tautomer of the compound, and, a salt and hydrate thereof:

   Formula (1)

wherein, Q represents a 5-membered to 7-membered aromatic or heterocyclic ring, R represents a substituent represented by the following formulae (2) to (5), and n represents an integer of from 1 to 4;

   Formula (2)

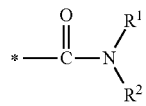   Formula (3)

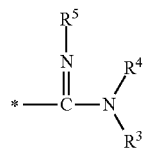   Formula (4)

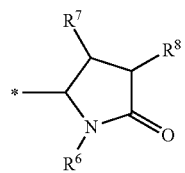   Formula (5)

wherein, $R^1$ to $R^8$ each independently represent a hydrogen atom, a substituted or unsubstituted alkyl group, a substituted or unsubstituted aryl group, a substituted or unsubstituted heterocyclic group, or a substituted or unsubstituted heterocyclic group that is formed by taking $R^1$ and $R^2$ together, or taking $R^3$ and $R^4$ together, or taking $R^7$ and $R^8$ together, and * represents a site bonded to Q.

[3] The method for producing a nitrogen-containing carbon alloy according to [2], wherein the β-diketone metal complex is represented by the following formula (6):

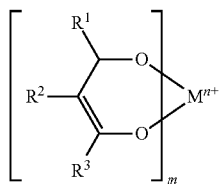   Formula (6)

wherein, M represents a metal, $R^1$ and $R^3$ each independently represent a hydrocarbon group which may have a substituent, and $R^2$ represents a hydrogen atom or a hydrocarbon group which may have a substituent, and $R^1$, $R^2$ and $R^3$ may be bonded to each other to form a ring, and n represents an integer of 0 or more, and m represents an integer of 1 or more, and in the β-diketone metal complex, β-diketone or an ion thereof is coordinated or bound to an atom or an ion of the metal M.

[4] The method for producing a nitrogen-containing carbon alloy according to [2], wherein the β-diketone metal complex is acetylacetone iron(II), bis(dipivaloylmethane)iron (II), bis(diisobutoxymethane)iron(II), bis(isobutoxypivaloylmethane)iron(II), or bis(tetramethyloctadione)iron(II).

[5] The method for producing a nitrogen-containing carbon alloy according to [2], wherein the inorganic metal salt is a halide.

[6] The method for producing a nitrogen-containing carbon alloy according to [2], wherein the inorganic metal salt contains Fe or Co.

[7] The method for producing a nitrogen-containing carbon alloy according to [2], wherein, in the formula (1), Q represents a 5- or 6-membered aromatic rign, a 5- or 6-membered heterocyclic ring, or a condensed ring thereof.

[8] The method for producing a nitrogen-containing carbon alloy according to [2], wherein, in the formula (1), Q represents a benzene ring, a pyridine ring, or a condensed ring thereof.

[9] The method for producing a nitrogen-containing carbon alloy according to [2], wherein the nitrogen-containing organic compound is a compound represented by the following formula (7) or (8), or a multimer of two or more compounds containing two or more moiety represented by the formula (7) or (8):

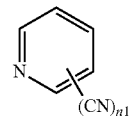   Formula (7)

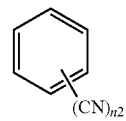   Formula (8)

wherein, n1 represents an integer of from 1 to 5, and n2 represents an integer of from 1 to 6.

[10] The method for producing a nitrogen-containing carbon alloy according to [2], further comprising cleaning the baked nitrogen-containing carbon alloy with an acid.

[11] The method for producing a nitrogen-containing carbon alloy according to [10], further comprising rebaking the nitrogen-containing carbon alloy cleaned with an acid.

[12] The method for producing a nitrogen-containing carbon alloy according to [2], wherein the precursor further contains a conductive assistant.

[13] A nitrogen-containing carbon alloy produced by baking a precursor containing at least one nitrogen-containing organic compound, an inorganic metal salt containing one or more kinds of Fe, Co, Ni, Mn and Cr, and at least one β-diketone metal complex, wherein:

the nitrogen-containing organic compound is one of a compound represented by the following formula (1), a tautomer of the compound, and, a salt and hydrate thereof:

   Formula (1)

wherein, Q represents a 5-membered to 7-membered aromatic or heterocyclic ring, R represents a substituent represented by the following formulae (2) to (5), and n represents an integer of from 1 to 4;

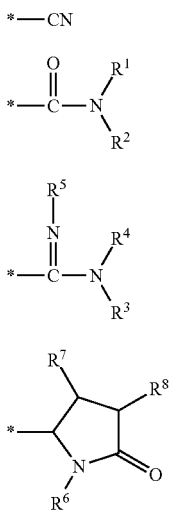

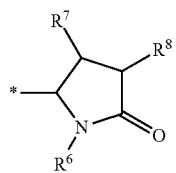

wherein, $R^1$ to $R^8$ each independently represent a hydrogen atom, a substituted or unsubstituted alkyl group, a substituted or unsubstituted aryl group, a substituted or unsubstituted heterocyclic group, or a substituted or unsubstituted heterocyclic group that is formed by taking $R^1$ and $R^2$ together, or taking $R^3$ and $R^4$ together, or taking $R^7$ and $R^8$ together, and * represents a site bonded to Q.

[16] The carbon alloy catalyst according to [15], wherein a coated amount of the nitrogen-containing carbon alloy after drying is 0.05 mg/cm² or more.

[17] A membrane-electrode assembly including the carbon alloy catalyst containing the nitrogen-containing carbon alloy produced by baking a precursor containing at least one nitrogen-containing organic compound, an inorganic metal salt containing one or more kinds of Fe, Co, Ni, Mn and Cr, and at least one β-diketone metal complex, wherein:

the nitrogen-containing organic compound is one of a compound represented by the following formula (1), a tautomer of the compound, and, a salt and hydrate thereof:

$$Q(-R)_n \qquad \text{Formula (1)}$$

wherein, Q represents a 5-membered to 7-membered aromatic or heterocyclic ring, R represents a substituent represented by the following formulae (2) to (5), and n represents an integer of from 1 to 4;

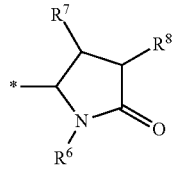

wherein, $R^1$ to $R^8$ each independently represent a hydrogen atom, a substituted or unsubstituted alkyl group, a substituted or unsubstituted aryl group, a substituted or unsubstituted heterocyclic group, or a substituted or unsubstituted heterocyclic group that is formed by taking $R^1$ and $R^2$ together, or taking $R^3$ and $R^4$ together, or taking $R^7$ and $R^8$ together, and * represents a site bonded to Q.

[14] The nitrogen-containing carbon alloy according to [13], wherein specific surface area of the nitrogen-containing carbon alloy obtained by a Brunauer-Emmett-Teller method is 670 m²/g or more.

[15] A carbon alloy catalyst containing the nitrogen-containing carbon alloy produced by baking a precursor containing at least one nitrogen-containing organic compound, an inorganic metal salt containing one or more kinds of Fe, Co, Ni, Mn and Cr, and at least one β-diketone metal complex, wherein:

the nitrogen-containing organic compound is one of a compound represented by the following formula (1), a tautomer of the compound, and, a salt and hydrate thereof:

$$Q(-R)_n \qquad \text{Formula (1)}$$

wherein, Q represents a 5-membered to 7-membered aromatic or heterocyclic ring, R represents a substituent represented by the following formulae (2) to (5), and n represents an integer of from 1 to 4;

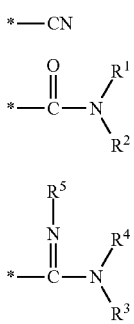

[18] A fuel cell including the carbon alloy catalyst containing the nitrogen-containing carbon alloy produced by baking a precursor containing at least one nitrogen-containing organic compound, an inorganic metal salt containing one or more kinds of Fe, Co, Ni, Mn and Cr, and at least one β-diketone metal complex, wherein:

the nitrogen-containing organic compound is one of a compound represented by the following formula (1), a tautomer of the compound, and, a salt and hydrate thereof:

  Formula (1)

wherein, Q represents a 5-membered to 7-membered aromatic or heterocyclic ring, R represents a substituent represented by the following formulae (2) to (5), and n represents an integer of from 1 to 4;

*—CN  Formula (2)

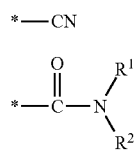  Formula (3)

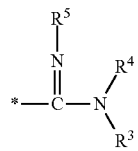  Formula (4)

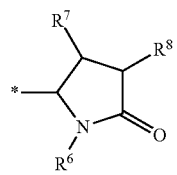  Formula (5)

wherein, $R^1$ to $R^8$ each independently represent a hydrogen atom, a substituted or unsubstituted alkyl group, a substituted or unsubstituted aryl group, a substituted or unsubstituted heterocyclic group, or a substituted or unsubstituted heterocyclic group that is formed by taking $R^1$ and $R^2$ together, or taking $R^3$ and $R^4$ together, or taking $R^7$ and $R^8$ together, and * represents a site bonded to Q.

[19] A method for producing a nitrogen-containing carbon alloy comprising baking a precursor containing a nitrogen-containing organic compound and an inorganic metal salt containing one or more kinds of Fe, Co, Ni, Mn and Cr, wherein:

the precursor contains the inorganic metal salt in an amount exceeding 45% by mass based on the total amount of the nitrogen-containing organic compound and the inorganic metal salt of the precursor, in which the total amount includes the mass of hydrated water in the nitrogen-containing organic compound and the inorganic metal salt, and the amount of the inorganic metal salt includes the mass of hydrated water in the inorganic metal, the nitrogen-containing organic compound is one of a compound represented by the following formula (1), a tautomer of the compound, and a salt and hydrate thereof:

  Formula (1)

wherein, Q represents a 5-membered to 7-membered aromatic or heterocyclic ring, R represents a substituent represented by the following formulae (2) to (5), and n represents an integer of from 1 to 4;

*—CN  Formula (2)

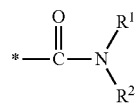  Formula (3)

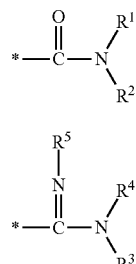  Formula (4)

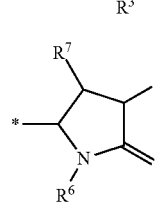  Formula (5)

wherein, $R^1$ to $R^8$ each independently represent a hydrogen atom, a substituted or unsubstituted alkyl group, a substituted or unsubstituted aryl group, a substituted or unsubstituted heterocyclic group, or a substituted or unsubstituted heterocyclic group that is formed by taking $R^1$ and $R^2$ together, or taking $R^3$ and $R^4$ together, or taking $R^7$ and $R^8$ together, and * represents a site bonded to Q.

[20] The method for producing a nitrogen-containing carbon alloy according to [19], wherein the inorganic metal salt is a halide.

[21] The method for producing a nitrogen-containing carbon alloy according to [19], wherein the inorganic metal salt contains Fe or Co.

[22] The method for producing a nitrogen-containing carbon alloy according to [19], wherein, in the formula (1), Q represents a 5- or 6-membered aromatic rign, a 5- or 6-membered heterocyclic ring, or a condensed ring thereof.

[23] The method for producing a nitrogen-containing carbon alloy according to [19], wherein, in the formula (1), Q represents a benzene ring, a pyridine ring, or a condensed ring thereof.

[24] The method for producing a nitrogen-containing carbon alloy according to [19], wherein the nitrogen-containing organic compound is a compound represented by the following formula (6) or (7), or a multimer of two or more compounds containing two or more moiety represented by the formula (7) or (8):

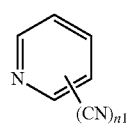  Formula (6)

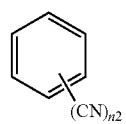  Formula (7)

wherein, n1 represents an integer of from 1 to 5, and n2 represents an integer of from 1 to 6.

[25] The method for producing a nitrogen-containing carbon alloy according to [19], further comprising cleaning the baked nitrogen-containing carbon alloy with an acid.

[26] The method for producing a nitrogen-containing carbon alloy according to [25], further comprising rebaking the nitrogen-containing carbon alloy cleaned with an acid.

[27] A nitrogen-containing carbon alloy produced by baking a precursor containing a nitrogen-containing organic compound and an inorganic metal salt containing one or more kinds of Fe, Co, Ni, Mn and Cr, wherein:

the precursor contains the inorganic metal salt in an amount exceeding 45% by mass based on the total amount of the nitrogen-containing organic compound and the inorganic metal salt of the precursor, in which the total amount includes the mass of hydrated water in the nitrogen-containing organic compound and the inorganic metal salt, and the amount of the inorganic metal salt includes the mass of hydrated water in the inorganic metal, the nitrogen-containing organic compound is one of a compound represented by the following formula (1), a tautomer of the compound, and a salt and hydrate thereof:

  Formula (1)

wherein, Q represents a 5-membered to 7-membered aromatic or heterocyclic ring, R represents a substituent represented by the following formulae (2) to (5), and n represents an integer of from 1 to 4;

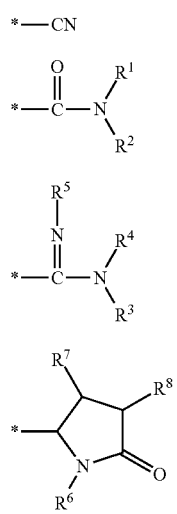

Formula (2)

Formula (3)

Formula (4)

Formula (5)

wherein, $R^1$ to $R^8$ each independently represent a hydrogen atom, a substituted or unsubstituted alkyl group, a substituted or unsubstituted aryl group, a substituted or unsubstituted heterocyclic group, or a substituted or unsubstituted heterocyclic group that is formed by taking $R^1$ and $R^2$ together, or taking $R^3$ and $R^4$ together, or taking $R^7$ and $R^8$ together, and * represents a site bonded to Q.

[28] The nitrogen-containing carbon alloy according to [27], wherein specific surface area of the nitrogen-containing carbon alloy obtained by a Brunauer-Emmett-Teller method is 670 m²/g or more.

[29] A carbon alloy catalyst containing the nitrogen-containing carbon alloy produced by baking a precursor containing a nitrogen-containing organic compound and an inorganic metal salt containing one or more kinds of Fe, Co, Ni, Mn and Cr, wherein:

the precursor contains the inorganic metal salt in an amount exceeding 45% by mass based on the total amount of the nitrogen-containing organic compound and the inorganic metal salt of the precursor, in which the total amount includes the mass of hydrated water in the nitrogen-containing organic compound and the inorganic metal salt, and the amount of the inorganic metal salt includes the mass of hydrated water in the inorganic metal, the nitrogen-containing organic compound is one of a compound represented by the following formula (1), a tautomer of the compound, and a salt and hydrate thereof:

  Formula (1)

wherein, Q represents a 5-membered to 7-membered aromatic or heterocyclic ring, R represents a substituent represented by the following formulae (2) to (5), and n represents an integer of from 1 to 4;

  Formula (2)

Formula (3)

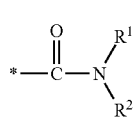

Formula (4)

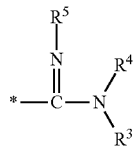

Formula (5)

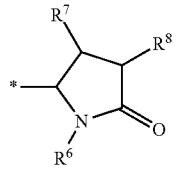

wherein, $R^1$ to $R^8$ each independently represent a hydrogen atom, a substituted or unsubstituted alkyl group, a substituted or unsubstituted aryl group, a substituted or unsubstituted heterocyclic group, or a substituted or unsubstituted heterocyclic group that is formed by taking $R^1$ and $R^2$ together, or taking $R^3$ and $R^4$ together, or taking $R^7$ and $R^8$ together, and * represents a site bonded to Q.

[30] The carbon alloy catalyst according to [29], wherein a coated amount of the nitrogen-containing carbon alloy after drying is 0.05 mg/cm² or more.

[31] A membrane-electrode assembly including the carbon alloy catalyst containing the nitrogen-containing carbon alloy produced by baking a precursor containing at least one nitrogen-containing organic compound, an inorganic metal salt containing one or more kinds of Fe, Co, Ni, Mn and Cr, and at least one β-diketone metal complex, wherein:

the nitrogen-containing organic compound is one of a compound represented by the following formula (1), a tautomer of the compound, and, a salt and hydrate thereof:

  Formula (1)

wherein, Q represents a 5-membered to 7-membered aromatic or heterocyclic ring, R represents a substituent represented by the following formulae (2) to (5), and n represents an integer of from 1 to 4;

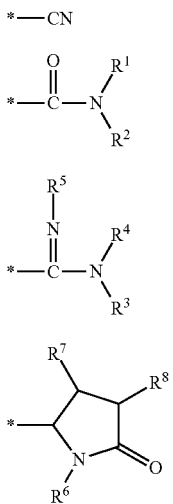

wherein, $R^1$ to $R^8$ each independently represent a hydrogen atom, a substituted or unsubstituted alkyl group, a substituted or unsubstituted aryl group, a substituted or unsubstituted heterocyclic group, or a substituted or unsubstituted heterocyclic group that is formed by taking $R^1$ and $R^2$ together, or taking $R^3$ and $R^4$ together, or taking $R^7$ and $R^8$ together, and * represents a site bonded to Q.

[32] A fuel cell including the carbon alloy catalyst containing the nitrogen-containing carbon alloy produced by baking a precursor containing at least one nitrogen-containing organic compound, an inorganic metal salt containing one or more kinds of Fe, Co, Ni, Mn and Cr, and at least one β-diketone metal complex, wherein:

the nitrogen-containing organic compound is one of a compound represented by the following formula (1), a tautomer of the compound, and, a salt and hydrate thereof:

Q—(R)$_n$      Formula (1)

wherein, Q represents a 5-membered to 7-membered aromatic or heterocyclic ring, R represents a substituent represented by the following formulae (2) to (5), and n represents an integer of from 1 to 4;

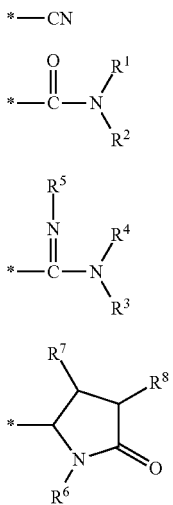

wherein, $R^1$ to $R^8$ each independently represent a hydrogen atom, a substituted or unsubstituted alkyl group, a substituted or unsubstituted aryl group, a substituted or unsubstituted heterocyclic group, or a substituted or unsubstituted heterocyclic group that is formed by taking $R^1$ and $R^2$ together, or taking $R^3$ and $R^4$ together, or taking $R^7$ and $R^8$ together, and * represents a site bonded to Q.

Advantageous Effects of Invention

According to the invention, there is to be provided a production method of a nitrogen-containing carbon alloy that has sufficiently high redox activity or has a large number of reaction electrons of redox reaction. The nitrogen-containing carbon alloy produced according to the invention may be used as a carbon catalyst, and the carbon catalyst may be applied to such purposes as a fuel cell and an environmental catalyst.

DESCRIPTION OF EMBODIMENTS

Figure 1:
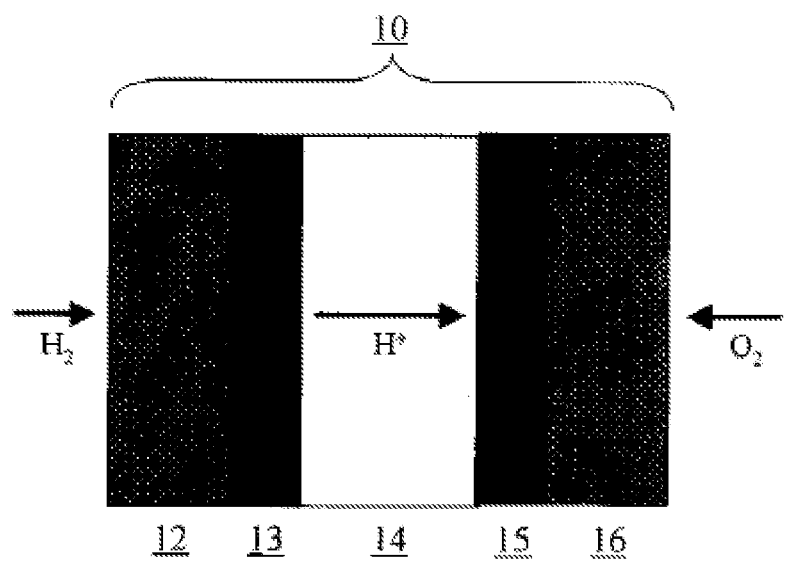
FIG. 1 The figure is a schematic structural illustration of a fuel cell using a carbon alloy according to the invention.

The substituent referred in the invention may be any group that may be substituted, and examples thereof include a halogen atom (such as a fluorine atom, a chlorine atom, a bromine atom and an iodine atom), a hydroxyl group, a cyano group, an aliphatic group (including an aralkyl group, a cycloalkyl group, an active methine group and the like), an aryl group (irrespective of the substitution position), a heterocyclic group (irrespective of the substitution position), an acyl group, an aliphatic oxy group (including a group containing repetition of a unit of an alkoxy group, an alkylene oxy group, an ethylene oxy group or a propylene oxy group), an aryloxy group, a heterocyclic oxy group, an aliphatic carbonyl group, an arylcarbonyl group, a heterocyclic carbonyl group, an aliphatic oxycarbonyl group, an aryloxycarbonyl group, a heterocyclic oxycarbonyl group, a carbamoyl group, a sulfonylcarbamoyl group, an acylcarbamoyl group, a sulfamoylcarbamoyl group, a thiocarbamoyl group, an aliphatic carbonyloxy group, an aryloxycarbonyloxy group, a heterocyclic carbonyloxy group, an amino group, an aliphatic amino group, an arylamino group, a heterocyclic amino group, an acylamino group, an aliphatic oxyamino group, an aryloxyamino group, a sulfamoylamino group, an acylsulfamoylamino group, an oxamoylamino group, an aliphatic oxycarbonylamino group, an aryloxycarbonylamino group, heterocyclic oxycarbonylamino group, a carbamoylamino group, a mercapto group, an aliphatic thio group, an arylthio group, a heterocyclic thio group, an alkylsulfinyl group, an arylsulfinyl group, an aliphatic sulfonyl group, an arylsulfonyl group, a heterocyclic sulfonyl group, a sulfamoyl group, an aliphatic sulfonylureido group, an arylsulfonylureido group, a heterocyclic sulfoniylureido group, an aliphatic sulfonyloxy group, an arylsulfonyloxy group, a heterocyclic sulfonyloxy group, a sulfamoyl group, an aliphatic sulfamoyl group, an arylsulfamoyl group, a heterocyclic sulfamoyl group, an acylsulfamoyl group, a sulfonylsulfamoyl group or a salt thereof, a carboamoylsulfamoyl group, a sulfonamide group, an aliphatic ureido group, an arylureido group, a heterocyclic ureido group, an aliphatic sulfonamide group, an arylsulfonamide group, a heterocyclic sulfonamide group, an aliphatic sulfinyl group, an arylsulfinyl group, a nitro group, a nitroso group, a diazo group, an azo group, a hydrazino group, a dialiphatic oxyphosphinyl group, a diaryloxyphosphinyl group, a silyl group (such as trimethylsilyl, t-butyldimethylsilyl and phenyldimethylsilyl), a silyloxy group (such as trimethylsilyloxy and t-butyldimethylsilyloxy), a borono group and an ionic hydrophilic group (such as a carboxyl group, a sulfo group, a phosphono group and a quaternary ammonium group). These substituents may be further substituted, and examples of the further substituent include groups selected from the substituents described above.

The invention will be described in detail below.

Method for Producing a Nitrogen-Containing Carbon Alloy

The Method for producing a nitrogen-containing carbon alloy of the invention (which may be hereinafter referred to as the production method of the invention) contains baking a precursor containing a nitrogen-containing organic compound and an inorganic metal salt containing one or more kinds of Fe, Co, Ni, Mn and Cr, wherein the precursor satisfies one of the requirements (a) and (b) below, and the nitrogen-containing organic compound is one of a compound represented by the formula (1) below, a tautomer of the compound, and a salt and hydrate thereof.

(a) the precursor is prepared to have an amount of the inorganic metal salt added exceeding a particular range, or (b) the precursor further contains a β-diketone metal complex.

While not sticking to any theory, the nitrogen-containing carbon alloy obtained by the production method of the invention is formed with a template, which is a nano metal cluster newly formed through thermal decomposition of the inorganic metal salt, through carbonization of the nitrogen-containing organic compound on the nano metal cluster to form voids. Accordingly, the specific surface area of the nitrogen-containing carbon alloy may be increased by removing the nano metal cluster through acid cleaning.

In the production method of the invention, the inorganic metal salt is thermally decomposed on forming the nitrogen-containing carbon alloy to form nano metal particles, and the metal thereof and the nitrogen-containing organic compound undergo mutual action to form catalytically active sites. Accordingly, it is considered that the density of functional groups is considerably increased, and the specific surface area is increased, whereby the number of the catalytically active sites is drastically increased, and the electric current density (i.e., the ORR activity) is enhanced.

In the method for producing a nitrogen-containing carbon alloy of the invention, the step of baking the precursor preferably comprises;

(1) a preparing a precursor by mixing the nitrogen-containing organic compound and the inorganic metal salt containing one or more kinds of Fe, Co, Ni, Mn and Cr (wherein the precursor contains the inorganic metal salt added in an amount exceeding a particular range, or further contains a β-diketone metal complex), (2) a temperature-rising which rising temperature in an inert atmosphere from room temperature to a carbonization temperature at a rate of 1° C. or more and 1,000° C. or less per minute, (3) a carbonization which maintaining temperature from 500 to 1,000° C. for from 0.1 to 100 hours, and (4) a cooling which cooling from the carbonization temperature to room temperature.

(5) After cooling the carbon alloy to room temperature after the carbonization process, a pulverization process may be performed.

(6) A cleaning the baked nitrogen-containing carbon alloy with an acid is preferably contained after the baking step.

(7) A rebaking the nitrogen-containing carbon alloy thus cleaned with an acid is more preferably contained after the acid cleaning step.

The method for producing a nitrogen-containing carbon alloy of the invention will be described below for the steps described above.

Preparation Step of Precursor

The components of the precursor used for the step of preparing the precursor containing a nitrogen-containing organic compound and an inorganic metal salt containing one or more kinds of Fe, Co, Ni, Mn and Cr, wherein (a) the precursor contains the inorganic metal salt in an amount exceeding 45% by mass based on the total amount of the nitrogen-containing organic compound and the inorganic metal salt of the precursor, in which the total amount includes the mass of hydrated water in the nitrogen-containing organic compound and the inorganic metal salt, and the amount of the inorganic metal salt includes the mass of hydrated water in the inorganic metal, or (b) the precursor further contains a β-diketone metal complex, will be described.

Nitrogen-Containing Organic Compound

The nitrogen-containing organic compound is used for preparation of the precursor.

The nitrogen-containing organic compound is one of a compound represented by the following formula (1) or a tautomer of the compound, and, a salt and hydrate thereof.

$$Q-(-R)_n \qquad (1)$$

In the formula (1), Q represents a 5-membered to 7-membered aromatic or heterocyclic ring, R represents a substituent represented by the following formulae (2) to (5), and n represents an integer of from 1 to 4.

Formula (2)

Formula (3)

Formula (4)

Formula (5)

In the formulae (3) to (5), $R^1$ to $R^8$ each independently represent a hydrogen atom, a substituted or unsubstituted alkyl group, a substituted or unsubstituted aryl group, a substituted or unsubstituted heterocyclic group, or a substituted or unsubstituted heterocyclic group that is formed by taking $R^1$ and $R^2$ together, or taking $R^3$ and $R^4$ together, or taking $R^7$ and $R^8$ together, and * represents a site bonded to Q.

The nitrogen-containing organic compound is represented by the formula (1) and an organic compound that has at least one of the structures represented by the formulae (2) to (5) and an unsaturated bond in the molecule thereof.

It is considered that the at least one of the structures represented by the formulae (2) to (5) contained therein forms active sites having high oxygen reduction activity formed of C, N and a metal, in the nitrogen-containing carbon alloy obtained by baking.

In the formula (1), Q represents a 5-membered to 7-membered aromatic or heterocyclic ring, and Q may be a condensed ring thereof.

In the invention, Q in the formula (1) is preferably a 5-membered or 6-membered aromatic or heterocyclic ring, or a condensed ring thereof.

In the formula (1), Q is more preferably an aromatic ring or an aromatic heterocyclic ring. The presence of an unsaturated bond facilitates the formation of a carbon alloy skeleton through various mutual actions described later.

Preferred examples of the 5-membered or 6-membered aromatic or heterocyclic ring represented by Q in the formula (1) include structures represented by the following formulae (A-1) to (A-20).

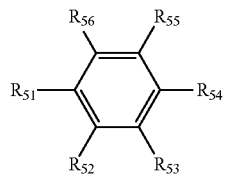
(A-1)

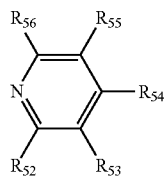
(A-2)

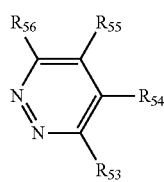
(A-3)

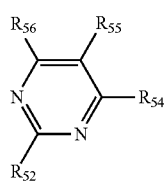
(A-4)

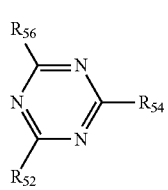
(A-5)

-continued

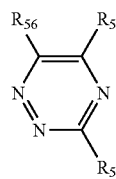
(A-6)

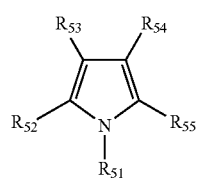
(A-7)

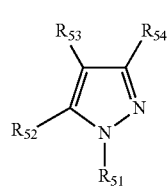
(A-8)

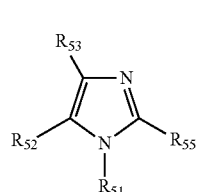
(A-9)

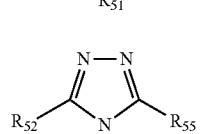
(A-10)

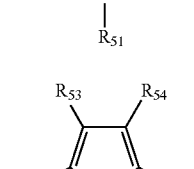
(A-11)

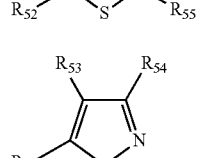
(A-12)

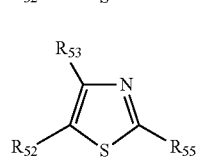
(A-13)

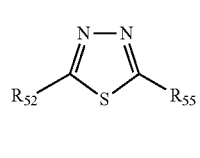
(A-14)

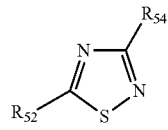
(A-15)

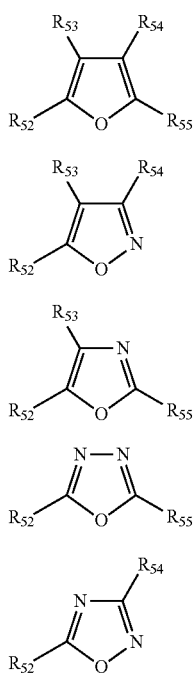

(A-16)

(A-17)

(A-18)

(A-19)

(A-20)

In the formulae (A-1) to (A-20), at least one of $R^{51}$ to $R^{56}$ represents a site bonded to R in the formula (1), and the other groups of $R^{51}$ to $R^{56}$ than the site bonded to R each independently represent a hydrogen atom or a substituent, provided that substituents adjacent to each other may be bonded to form a 5-membered or 6-membered ring. A condensed heteropolycyclic compound may also be used.

The substituents represented by $R^{51}$ to $R^{56}$ may be any groups that are described for the substituent above and are capable of being substituted. Preferred examples of the substituents represented by $R^{51}$ to $R^{56}$ include an alkyl group, a halogen atom (such as a fluorine atom, a chlorine atom, a bromine atom and an iodine atom), an aliphatic group, an aryl group, a heterocyclic group, a hydroxyl group, an acyl group, an aliphatic oxycarbonyl group, a carbamoyl group which may have a substituent, an ureido group which may have a substituent, an acylamino group, a sulfonamide group, an aliphatic oxy group, an aliphatic thio group, a cyano group and a sulfonyl group, and more preferred examples thereof include a halogen atom (such as a fluorine atom, a chlorine atom, a bromine atom and an iodine atom), an aliphatic group, an aryl group, a heterocyclic group, a hydroxyl group, an aliphatic oxycarbonyl group, a carbamoyl group which may have a substituent, an ureido group which may have a substituent, and an aliphatic oxy group.

Preferred examples of the substituents represented by $R^{51}$ to $R^{56}$ include an alkyl group (such as a methyl group, an ethyl group and a t-butyl group), an aryl group (such as a phenyl group and a naphthyl group), a halogen atom (such as a chlorine atom, a bromine atom and a fluorine atom) and a heteroaryl group (such as a pyridyl group). Among these, the substituents represented by $R^{51}$ to $R^{56}$ are preferably a halogen atom or a heteroaryl group, and more preferably a chlorine atom or a pyridyl group. The heterocyclic group preferably contains nitrogen in the heterocyclic ring thereof, whereby nitrogen is regularly arranged at the edge portion derived from the crystalline structure of the nitrogen-containing organic compound, and thus free metal ions are capable of being coordinated.

The number of hydrogen atoms contained in $R^{51}$ to $R^{56}$ is preferably from 1 to 4, and more preferably from 2 to 4.

In the formulae (A-1) to (A-20), preferred examples of the structure of Q in the compound represented by the formula (1) include structures represented by the formulae (A-1) to (A-6).

In the method for producing a nitrogen-containing carbon alloy of the invention, Q preferably represents a benzene ring or a pyridine ring, or a condensed ring thereof.

In the formula (1), R represents a substituent represented by the following formulae (2) to (5).

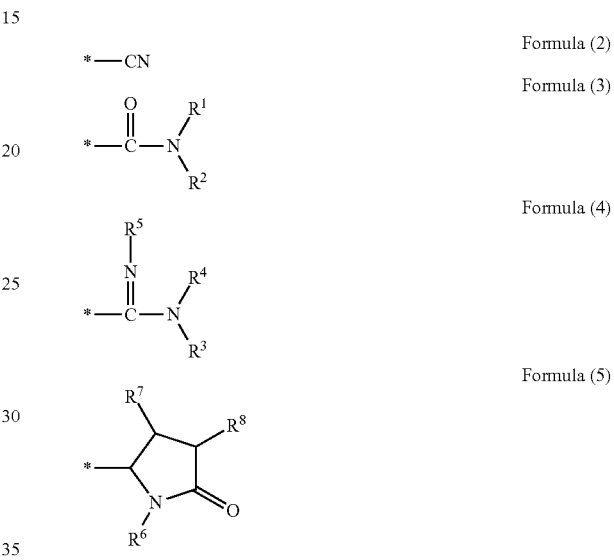

Formula (2)

Formula (3)

Formula (4)

Formula (5)

In the formulae (3) to (5), $R^1$ to $R^8$ each independently represent a hydrogen atom, a substituted or unsubstituted alkyl group, a substituted or unsubstituted aryl group, a substituted or unsubstituted heterocyclic group, or a substituted or unsubstituted heterocyclic ring that is formed by taking $R^1$ and $R^2$ together, or taking $R^3$ and $R^4$ together, or taking $R^7$ and $R^8$ together, and * represents a site bonded to Q.

The nitrogen-containing organic compound represented by the formula (1) contains the structures represented by the formulae (2) to (5), and therefore a CN bond is formed in the decomposition product, and nitrogen is maintained through the mutual action between the CN bond and the metal until the carbonization. Accordingly, nitrogen is liable to be introduced into the graphene of the carbon alloy, and the oxygen reduction reaction activity is favorably enhanced.

Preferred ranges of the groups represented by $R^1$ to $R^8$ include a hydrogen atom and the groups described for the substituent.

Among these, $R^1$ to $R^4$ each independently preferably represent a hydrogen atom or an alkyl group, and more preferably a hydrogen atom.

$R^5$ and $R^6$ each independently preferably represent a hydrogen atom or an alkyl group, and more preferably a hydrogen atom.

$R^7$ and $R^8$ each independently preferably represent a hydrogen atom or an alkyl group, and may be bonded to each other to form a ring. Examples of the ring formed by taking $R^7$ and $R^8$ together include a benzene ring, a pyridine ring, a pyrazine ring, a pyrimidine ring, a triazine ring, a pyridazine ring, a pyrrole ring, a pyrazole ring, an imidazole ring, a triazole ring, an oxazole ring, an oxadiazole ring, a triazole ring, a thiadiazole ring, a furan ring, a thiophene ring, a selenophene ring, a silole ring, a germole ring, a phosphole ring and a pyrrolidone ring. Preferred examples thereof include pyrrolidone ring, a benzene ring, a pyridine ring, a pyrazine ring, a pyrimidine ring, a triazine ring, a pyridazine ring, a pyrrole ring, a pyrazole ring, an imidazole ring and a triazole ring, and more preferred examples thereof include a pyrrole ring and a pyrrolidone ring.

Preferred examples of R in the compound represented by the formula (1) include structures represented by the formulae (2) and (3).

Examples of the compound represented by the formula (1) that contains the structure represented by the formula (4) include the compounds represented by the formula (1) in JP-A-2011-225431.

In the formula (1), n represents an integer of from 1 to 4, preferably an integer of from 1 to 3, and more preferably 1 or 2.

In the invention, the nitrogen-containing organic compound is preferably a compound represented by the formula (7) or (8), or a multimer of two or more compounds containing two or more moiety represented by the formula (7) or (8).

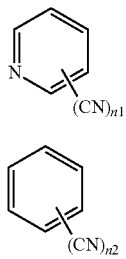

Formula (7)

Formula (8)

In the formulae (7) and (8), n1 represents an integer of from 1 to 5, and n2 represents an integer of from 1 to 6. n1 is preferably from 1 to 4, more preferably from 2 to 4, and further preferably 2. n2 is preferably from 1 to 4, more preferably from 2 to 4, and further preferably 2.

The compound represented by the formula (7) or (8) may have a substituent other than a cyano group, and preferably as only a cyano group.

Specific examples of the compound represented by the formula (1) are shown below, but the invention is not limited thereto.

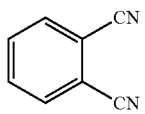
(B-1)

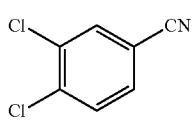
(B-2)

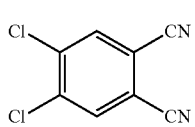
(B-3)

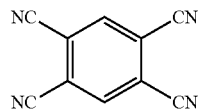
(B-4)

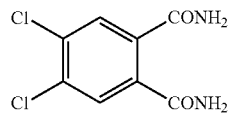
(B-5)

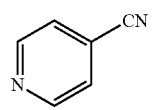
(B-7)

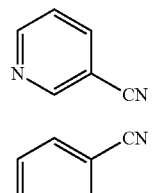
(B-8)

(B-9)

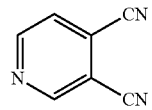

(B-11)

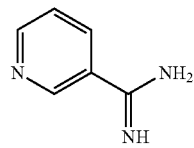

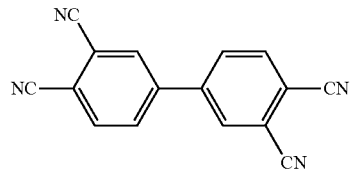
(B-12)

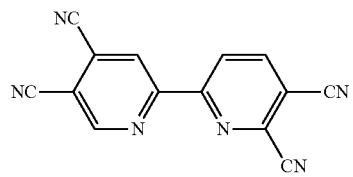
(B-13)

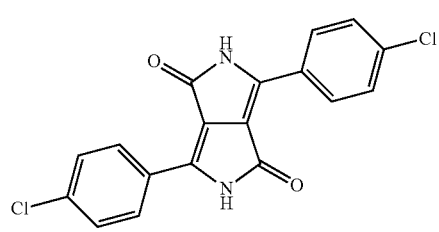
(B-14)

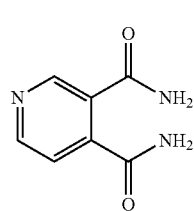
(B-15)

The nitrogen-containing organic compound is preferably a nitrogen-containing crystalline organic compound for facilitating regular arrangement of molecules due to the crystallinity. The nitrogen-containing crystalline organic compound is preferably other compounds than a nitrogen-containing metal complex. A nitrogen-containing metal complex is difficult to be purified and has a constant compositional ratio of the nitrogen-containing ligand and the metal complex, and therefore on decomposition in baking, the decomposition rate of the nitrogen-containing ligand and the vaporization rate of the metal complex to be coordinated may not be controlled, which makes difficult to provide the target nitrogen-containing carbon alloy. Even though a nitrogen-containing metal complex is mixed with a low molecular weight organic compound, the nitrogen-containing metal complex crystals are decomposed, and the metal is directly reduced, whereby the metal may be aggregated with the adjacent metal to form crystals. The metal is removed by acid cleaning to make the resulting nitrogen-containing carbon alloy heterogeneous, which may deteriorate the target capability.

The nitrogen-containing crystalline organic compound preferably forms a crystalline structure through two or more bonds or mutual actions selected from a π-π mutual action, a coordination bond, a charge transfer mutual action and a hydrogen bond. This is because the intermolecular mutual action may be enhanced by using a low molecular weight compound forming a crystalline structure, thereby suppressing vaporization on baking for providing the nitrogen-containing carbon alloy.

The crystalline structure referred therein means the arrangement mode or the alignment mode of molecules in the crystal. In other words, the crystalline structure is formed of repeating structures of unit lattices, and the molecules are arranged at arbitrary sites in the lattices and aligned. Furthermore, the molecules are in a homogeneous mode in the crystal. Specifically, in the crystal, the functional groups are homogeneously arranged, and the molecules undergo the mutual actions similarly inside the unit lattices and outside the unit lattices. For example, in the case of the nitrogen-containing organic compound that has a stacked structure, an aromatic ring, a heterocyclic ring, a condensed polycyclic ring, a condensed heteropolycyclic ring, an unsaturated bond (such as a C=N group, a vinyl group, an allyl group and an acetylene group) and the like undergo a mutual action (for example, aromatic rings undergo a face-to-face π-π mutual action (π-π stacks)). The $sp^2$ orbitals or the sp orbitals of carbon derived from the unsaturated bond in the rings or groups are regularly stacked at regular intervals to form a stacked column structure.

In the stacked column structure, the stacked columns adjacent to each other form a homogeneous structure with a regular intermolecular distance through a hydrogen bond or a van der Waals mutual action. Accordingly, heat transfer inside the crystal may be easily achieved.

The nitrogen-containing organic compound preferably has crystallinity irrespective of the low molecular weight thereof, and preferably has heat resistance through vibration relaxation due to phonons (quantized lattice vibration) with respect to heat. Accordingly, the decomposition temperature may be kept to the carbonization temperature, and vaporization of the decomposition product is reduced to facilitate carbonization, thereby forming the skeleton of the carbon alloy.

The crystalline compound is preferred since the alignment thereof may be controlled on baking to form a uniform carbon material.

The nitrogen-containing organic compound preferably has a melting point of 25° C. or more. When the melting point is less than 25° C., an air layer contributing to heat resistance may not be present on baking, and the material may be boiled or bumped through the relationship between the temperature and the vapor pressure, thereby failing to provide a carbon material.

The nitrogen-containing organic compound preferably has a molecular weight of from 60 to 2,000, more preferably from 100 to 1,500, and particularly preferably from 130 to 1,000.

The nitrogen-containing organic compound may be used solely or as a mixture of two or more kinds thereof. The metal content in the nitrogen-containing organic compound other than the inorganic metal salt described later is preferably 10 ppm or less. When the molecular weight is in the aforementioned range, purification thereof before baking may be facilitated.

The nitrogen-containing organic compound preferably has a nitrogen content of from 0.1 to 55% by mass, more preferably from 1 to 30% by mass, and particularly preferably from 4 to 20% by mass. By using the compound that has nitrogen atoms (N) in an amount in the aforementioned range, a compound as a nitrogen source may not be necessarily introduced separately, and nitrogen atoms and metal are arranged regularly and homogeneously at the crystalline edges, thereby facilitating the mutual action between nitrogen and the metal. Accordingly, the compositional ratio of nitrogen atoms and the metal may be such a compositional ratio that provides high oxygen reduction activity.

The nitrogen-containing organic compound is preferably a refractory compound that has ΔTG in a nitrogen atmosphere at 400° C. of from −95 to −0.1%, more preferably from −95 to −1%, and particularly preferably from −90 to −5%. The nitrogen-containing organic compound is preferably a refractory compound that is not evaporated but is carbonized on baking.

The ΔTG herein means the mass reduction rate at 400° C. based on the mass at room temperature (30° C.) in the TG-DTA measurement of the mixture of the nitrogen-containing organic compound and the inorganic metal salt by temperature-rising from 30° C. to 1,000° C. at a rate of 10° C. per minute under nitrogen stream at 100 mL/min.

The nitrogen-containing organic compound is also preferably a pigment having a structure represented by the formula (1).

The pigment forms a stacked column structure through π-π mutual action, and the stacked columns form a homogeneous structure with a regular intermolecular distance through a hydrogen bond or a van der Waals mutual action, thereby achieving easily heat transfer inside the crystal. Furthermore, the pigment has crystallinity irrespective of the low molecular weight thereof, and has heat resistance through vibration relaxation due to phonons (quantized lattice vibration) with respect to heat. Accordingly, the decomposition temperature may be kept to the carbonization temperature, and vaporization of the decomposition product is reduced to facilitate carbonization.

Preferred examples among the pigments include an isoindoline pigment, an isoindolinone pigment, a diketopyrrolopyrrole pigment, a quinacridone pigment, an oxazine compound, a phthalocyanine compound, a quinophthalone pigment, a latent pigment obtained by making these pigment latent, and a lake pigment obtained by converting a dye to a pigment with a metal ion, and more preferred examples thereof include a diketopyrrolopyrrole pigment, a quinacridone pigment, an isoindoline pigment, an isoindolinone pigment, a quinophthalone pigment, a latent pigment (described later) obtained by making these pigment latent. This is because the benzonitrile (Ph-CN) skeleton, which is formed through decomposition on baking the pigment, becomes a reaction active species, thereby forming a carbon alloy catalyst that has higher oxygen reduction reaction activity. The presence of a metallic species (M) therewith forms a complex, Ph-CN.M, thereby forming a carbon alloy that has further higher oxygen reduction reaction activity.

Inorganic Metal Salt

In the preparation of the precursor, an inorganic metal salt containing one or more kinds of Fe, Co, Ni, Mn and Cr is used, and the precursor preferably contains the inorganic metal salt in an amount exceeding 45% by mass based on the total of the nitrogen-containing organic compound and the inorganic metal salt, in which the total amount includes the mass of hydrated water in the nitrogen-containing organic compound and the inorganic metal salt, and the amount of the inorganic metal salt includes the mass of hydrated water in the inorganic metal. Accordingly, a carbon alloy having higher oxygen reduction activity may be obtained through the mutual action with nitrogen atoms. On baking the organic material containing the nitrogen-containing organic compound, the nitrogen-containing organic compound is decomposed, and the decomposition product thus formed forms the nitrogen-containing carbon alloy catalyst in in the gaseous phase. When a metal is present in the vicinity thereof in the gaseous phase, the decomposition product undergoes mutual action with the metal (i.e., forms a complex therewith), thereby further enhancing the performance of the nitrogen-containing carbon alloy catalyst. Furthermore, it is preferred that the nitrogen-containing carbon alloy containing nitrogen atoms (N) that are fixed in a high concentration to the surface of the carbon catalyst is formed through catalytic action or the like of the particular transition metal compound added to the nitrogen-containing organic compound containing nitrogen atoms (N) as a constitutional component, and carbon fine particles containing the transition metal compound undergoing mutual action with the nitrogen atoms (N) is formed. The transition metal compound undergoing mutual action with the nitrogen atoms (N) may be partially released off by the acid treatment described later.

Salts of cobalt, iron, manganese, nickel and chromium enhance the catalytic activity of the carbon catalyst and are excellent in formation of a nano-sized shell structure, and among these, cobalt andiron are preferred since they are excellent in formation of a nano-sized shell structure. Cobalt and iron contained in the carbon catalyst may enhance the oxygen reduction activity of the catalyst in the carbon catalyst. The transition metal is most preferably iron. This is because the iron-containing and nitrogen-containing carbon alloy has a high rising electric potential and a larger number of reaction electrons (described later) than cobalt, and relatively enhances the durability of the fuel cell. One of more kinds of the other elements than the transition metals (for example, boron, an alkali metal (such as Na, K and Cs), an alkaline earth metal (such as Mg, Ca and Ba), lead, tin, indium, thallium and the like) may be contained unless the activity of the carbon catalyst is impaired.

The inorganic metal salt is not particularly limited, and examples thereof include a hydroxide, an oxide, a nitride, a sulfated compound, a sulfited compound, a sulfide, a sulfonated compound, a carbonylated compound, a nitrated compound, a nitrited compound and a halide. It is preferred that the counter ion is a halide ion, a nitrate ion or a sulfate ion. A halide, a nitrate or a sulfate having a halide ion, a nitrate ion or a sulfate ion as a counter ion is preferred since it may be bonded to carbon on the surface of carbon formed on thermal decomposition to increase the specific surface area.

In the method for producing a nitrogen-containing carbon alloy of the invention, the inorganic metal salt is preferably a halide.

The inorganic metal salt may contain crystal water. The inorganic metal salt preferably contains crystal water since the thermal conductivity may be enhanced to achieve homogeneous baking thereby. Examples of the inorganic metal salt containing crystal water that may be preferably used include cobalt(III) chloride hydrate, iron(III) chloride hydrate, cobalt(II) chloride hydrate and iron(II) chloride hydrate.

For the nitrogen-containing carbon alloy of the invention, the precursor preferably contains the inorganic metal salt in an amount exceeding 45% by mass, more preferably exceeding 45% by mass and of 85% by mass or less, and further preferably exceeding 45% by mass and of 70% by mass or less, based on the total of the nitrogen-containing organic compound and the inorganic metal salt, in which the total amount includes the mass of hydrated water in the nitrogen-containing organic compound and the inorganic metal salt, and the amount of the inorganic metal salt includes the mass of hydrated water in the inorganic metal.

When the amount is in the range, a carbon alloy having high oxygen reduction reaction activity (ORR activity) may be formed.

For the ORR activity, the electric current density may be measured according to the method described in detail in the examples and may be designated as the ORR activity value. For providing high output power, the electric current density on oxygen reduction is preferably low, and specifically is preferably $-400$ $\mu A/cm^2$ or less, more preferably $-500$ $\mu A/cm^2$ or less, further preferably $-600$ $\mu A/cm^2$ or less, and most preferably $-700$ $\mu A/cm^2$ or less.

In the organic material before baking, it is advantageous that the nitrogen-containing organic compound and the inorganic metal salt may not be necessarily dispersed homogeneously. Specifically, on decomposition of the nitrogen-containing organic compound by baking, it is considered that an active species having oxygen reduction reaction activity may be formed if the decomposition product of the nitrogen-containing organic compound is in contact with a vaporized product of the inorganic metal salt or the like, and therefore the oxygen reduction reaction activity of the carbon alloy is not influenced by the mixed state of the nitrogen-containing organic compound and the inorganic metal salt at room temperature.

The particle size of the inorganic metal salt is preferably 0.001 μm or more and 100 μm or less, and more preferably 0.01 μm or more and 10 μm or less, in terms of diameter. When the particle diameter of the inorganic metal salt is in the range, it may be mixed homogeneously with the nitrogen-containing organic compound, thereby facilitating formation of the complex by the nitrogen-containing organic compound on decomposition.

Organic Metal Complex

In the method for producing a nitrogen-containing carbon alloy of the invention, the precursor may further contain at least one kind of an organic metal complex. As the organic metal complex, a β-diketone metal complex may be solely used, or a β-diketone metal complex and another organic metal complex may be used as a mixture. By adding a β-diketone metal complex to the precursor, high ORR activity may be obtained, and in addition, a carbon alloy catalyst showing a large reaction electron number may be obtained.

Examples of the β-diketone metal complex include the compounds described in Sakutai Kagaku, Kiso to Saishin no Wadai (Coordination Chemistry, Basics and Latest Topics), edited by The Society of Pure & Applied Coordination Chemistry, published by Kodansha Scientific, Ltd., and specifically preferred examples thereof include compounds containing a metal ion having a ligand coordinated thereto. The β-diketone metal complex may have various coordination numbers of ligands, may be a geometrical isomer of the complex, and may have various valencies for the metal ion. The β-diketone metal complex may be an organic metal compound having a metal-carbon bond.

Preferred examples of the metal ion include ions of cobalt, iron, manganese, nickel and chromium.

Preferred examples of the ligand include a unidentate ligand (such as a halide ion, a cyanide ion, ammonia, pyridine (py), triphenylphosphine and a carboxylic acid), a bidentate ligand (such as ethylenediamine (en), a β-diketonate (such as acetylacetonate (acac), pivaloylmethane (DPM), diisobutoxymethane (DIBM), isobutoxypivaloylmethane (IBPM) and tetramethyloctadione (TMOD)), trifluoroacetylacetonate (TFA), bipyridine (bpy) and phenanthrene (phen)), and a polydentate ligand (such as ethylenediamine tetraacetate ion (edta)).

Examples of the metal complex used include a β-diketone metal complex (such as (bis(acetylacetonato)iron(II) [Fe(acac)₂], tris(acetylacetonato)iron(III) [Fe(acac)₃], bis(acetylacetonato)cobalt(II) [Co(acac)₂], tris(acetylacetonato)cobalt(III) [Co(acac)₃], tris(dipivaloylmethane)iron(III) [Fe(DPM)₃], tris(dipivaloylmethane)cobalt(III) [Co(DPM)₃], tris(diisobutoxymethane)iron(III) [Fe(DIBM)₃], tris(diisobutoxymethane)cobalt(III) [Co(DIBM)₃], tris(isobutoxypivaloylmethane)cobalt(III) [Co(IBPM)₃], tris(tetramethyloctadione)iron(III) [Fe(TMOD)₃], tris(tetramethyloctadione)cobalt(III) [Co(TMOD)₃]), tris(1,10-phenanthrolinato)iron(III) chloride [Fe(phen)₃]Cl₂, tris(1,10-phenanthrolinato)cobalt(III) chloride [Co(phen)₃]Cl₂, N,N'-ethylenediaminebis(salicylideneaminato)iron(II) [Fe(salen)], N,N'-ethylenediaminebis(salicylideneaminato)cobalt(II) [Co(salen)], tris(2,2'-bipyridine)iron(II) chloride [Fe(bpy)₃]Cl₂, tris(2,2'-bipyridine)cobalt(II) chloride [Co(bpy)₃]Cl₂, metal phthalocyanine (MPc), and iron acetate [Fe(OAc)₂]. Among these, a β-diketonate iron complex (such as bis(acetylacetonato)iron(II) [Fe(acac)₂], tris(acetylacetonato)iron(III) [Fe(acac)₃], bis(dipivaloylmethane)iron(II) [Fe(DPM)₂], bis(diisobutoxymethane)iron(II) [Fe(DIBM)₂], bis(isobutoxypivaloylmethane)iron(II) [Fe(IBPM)₂], bis(tetramethyloctadione)iron(II) [Fe(TMOD)₂]), N,N'-ethylenediaminebis(salicylideneaminato)iron(II) [Fe(salen)], tris(2,2'-bipyridine)iron(II) chloride [Fe(bpy)₃]Cl₂, iron phthalocyanine (MPc), iron acetate [Fe(OAc)₂] and bis(acetylacetonato)iron(II) [Fe(acac)₂] are preferred, and in the method for producing a nitrogen-containing carbon alloy of the invention, the organic metal complex is particularly preferably acetylacetone iron(II), bis(dipivaloylmethane)iron(II) [Fe(DPM)₂], bis(diisobutoxymethane)iron(II) [Fe(DIBM)₂], bis(isobutoxypivaloylmethane)iron(II) [Fe(IBPM)₂] and bis(tetramethyloctadione)iron(II) [Fe(TMOD)₂], which are β-diketonate iron(II) complexes.

β-Diketone Metal Complex

As the metal complex, a β-diketone metal complex (a β-diketonate metal complex) is described in detail. The β-diketone metal complex means a compound represented by the following formula (6) and a tautomer thereof.

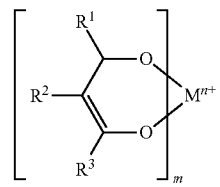

Formula (6)

In the formula (6), M represents a metal, $R^1$ and $R^3$ each independently represent a hydrocarbon group which may have a substituent, and $R^2$ represents a hydrogen atom or a hydrocarbon group which may have a substituent. $R^1$, $R^2$ and $R^3$ may be bonded to each other to form a ring. n represents an integer of 0 or more, and m represents an integer of 1 or more. In the compound β-diketone or an ion thereof is coordinated or bound to an atom or an ion of the metal M.

Preferred examples of the metal include cobalt, iron, manganese, nickel and chromium, more preferred examples thereof include cobalt and iron, and further preferred examples thereof include iron.

Examples of the "hydrocarbon group" of the hydrocarbon group which may have a substituent, for $R^1$, $R^2$ and $R^3$ include an aliphatic hydrocarbon group, an alicyclic hydrocarbon group, an aromatic hydrocarbon group, a heterocyclic hydrocarbon group, and a group formed by bonding a plurality of these groups. Examples of the aliphatic hydrocarbon group include an alkyl group (e.g., a $C_{1-6}$ alkyl group), such as methyl, ethyl, propyl, isopropyl, butyl, isobutyl, s-butyl, t-butyl and hexyl; and an alkenyl group (e.g., a $C_{2-6}$ alkenyl group), such as an allyl group. Examples of the alicyclic hydrocarbon group include a cycloalkyl group (e.g., a 3-membered to 15-membered cycloalkyl group), such as cyclopentyl and cyclohexyl; a cycloalkenyl group (e.g., a 3-membered to 15-membered cycloalkenyl group), such as a cyclohexenyl group; and a bridged hydrocarbon group (e.g., a bridged hydrocarbon group having approximately from 6 to 20 carbon atoms), such as an adamantyl group. Examples of the aromatic hydrocarbon group include an aromatic hydrocarbon group (aryl group) having approximately from 6 to 20 carbon atoms, such as a phenyl group and a naphthyl group. Examples of the heterocyclic hydrocarbon group include a nitrogen-containing 5-membered hydrocarbon group, such as a pyrrolyl group, an imidazolyl group and a pyrazolyl group; a nitrogen-containing 6-membered hydrocarbon group, such as a pyridyl group, a pyrazinyl group, a pyrimidinyl group and a pyridazinyl group; a nitrogen-containing bicyclic condensed hydrocarbon group, such as a pyrrolidinyl group, an indolizinyl group, an isoindolyl group, an isoindolynyl group, an indolyl group, an indazolyl group, a purinyl group, a quinolizinyl group, a quinolinyl group, a naphthyridinyl group, a phthalazinyl group, a quinoxalinyl group, a cinnolinyl group and a pteridinyl group; a nitrogen-containing tricyclic condensed hydrocarbon group, such as carbazolyl group, a β-carbolinyl group, a phenanthridinyl group, an acridinyl group, a perimidinyl group, a phenanthrolinyl group, a phenazinyl group and an anthyridinyl group; and oxygen-containing monocyclic, oxygen-containing polycyclic, sulfur-containing, and selenium- or tellurium-containing hydrocarbon groups.

Examples of the substituent that may be substituted on the hydrocarbon groups include a halogen atom, such as fluorine, chlorine and bromine atoms; an alkoxy group (e.g., a $C_{1-4}$ alkoxy group), such as methoxy, ethoxy, propoxy, isopropyloxy, butoxy, isobutyloxy and t-butyloxy groups; a hydroxyl group; an alkoxycarbonyl group (e.g., a $C_{1-4}$ alkoxycarbonyl group), such as methoxycarbonyl and ethoxycarbonyl groups; an acyl group (e.g., a $C_{1-10}$ acyl group), such as acetyl, propionyl and benzoyl groups; a cyano group; and a nitro group.

Examples of the ring formed by bonding $R^1$, $R^2$ and $R^3$ to each other include a 5-membered to 15-membered cycloalkane or cycloalkene ring, such as a cyclopentane ring, a cyclopentene ring, a cyclohexane ring and a cyclohexene ring.

Preferred examples of $R^1$ and $R^3$ include an alkyl group (e.g., a $C_{1-6}$ alkyl group), an alkenyl group (e.g., a $C_{2-6}$ alkenyl group), a cycloalkyl group (e.g., a 3-membered to 15-membered cycloalkyl group), a cycloalkenyl group (e.g., a 3-membered to 15-membered cycloalkenyl group), an aryl group (e.g., a $C_{6-15}$ aryl group), and an aryl group having a substituent (e.g., a $C_{6-15}$ aryl group having a substituent, such as a p-methylphenyl group and a p-hydroxyphenyl group). Preferred examples of $R^2$ include a hydrogen atom, an alkyl group (e.g., a $C_{1-6}$ alkyl group), an alkenyl group (e.g., a $C_{2-6}$ alkenyl group), a cycloalkyl group (e.g., a 3-membered to 15-membered cycloalkyl group), a cycloalkenyl group (e.g., a 3-membered to 15-membered cycloalkenyl group), an aryl group (e.g., a $C_{6-16}$ aryl group), and an aryl group having a substituent (e.g., a $C_{6-15}$ aryl group having a substituent, such as a p-methylphenyl group and a p-hydroxyphenyl group).

In the compound represented by the formula (6), the valency n of the metal may be any one of zerovalent, monovalent, divalent, trivalent and the like, and is generally divalent or trivalent. In the case where the metal is divalent or trivalent, the β-diketone is coordinated in the form of a β-diketonate as a corresponding anion. As the valency of the metal is n, the coordination number m is generally the same as n. However, a solvent or the like may be axially coordinated to the metal, and in this case, the valency n of the metal and the coordination number m may be different from each other.

Examples of a solvent that may be axially coordinated include pyridine, acetonitrile and an alcohol, and any solvent that is axially coordinated may be used.

The β-diketone iron complex used may be a commercially available product or a purified one thereof, or may be prepared. The β-diketone iron complex used may be formed in the reaction system. In the case where the β-diketone iron complex is formed in the reaction system, for example, a chloride or a hydroxide of iron and a β-diketone, such as acetylacetone are added. In this case, a base, such as ammonia, an amine compound, and a hydroxide, a carbonate salt, a carboxylate salt or the like of an alkali metal or an alkaline earth metal, may be added.

The amount of the β-diketone iron complex added is approximately generally from 0.001 to 50% by mol, preferably from 0.01 to 10% by mol, and particularly preferably from 0.1 to 1% by mol.

Conductive Assistant

In the invention, a conductive assistant may be added to the precursor, which may be then baked, or may be added to the carbon alloy. For dispersing the conductive assistant homogeneously, the conductive assistant is preferably added to the precursor and baked.

The conductive assistant is not particularly limited, and examples thereof include carbon black, such as Norit (produced by Cabot Norit Americas, Inc.), Ketjen Black (produced by Lion Corporation), Vulcan (produced by Cabot Corporation), Black Parl (produced by Cabot Corporation), and Acetylene Black (produced by Chevron Phillips Chemical Company) (all of them are trade names), and a carbon material, such as graphite, a fullerene, e.g., $C_{60}$ and $C_{70}$, carbon nanotubes, carbon nanohorns and carbon fibers.

The ratio of the conductive assistant added is preferably from 0.01 to 50% by mass, more preferably from 0.1 to 20% by mass, and further preferably from 1 to 10% by mass, based on the total mass of the precursor. A too large amount of the conductive assistant added is not suitable since the aggregation and growth of the metal formed from the inorganic metal salt in the system may be heterogeneous, thereby failing to provide the target porous nitrogen-containing carbon.

Temperature-Rising Step and Carbonization Step

In the production method of the invention, the precursor containing the nitrogen-containing organic compound and the inorganic metal salt containing one or more kinds of Fe, Co, Ni, Mn and Cr is preferably heat-treated to a carbonization temperature.

In the heat treatment to the carbonization temperature, the portions of temperature rising are referred totally to an infusiblization treatment.

The baking temperature for the carbonization treatment is not particularly limited as far as it is a temperature where the nitrogen-containing organic compound is heat-decomposed and carbonized, and the upper limit of the carbonization temperature is necessarily 1,000° C. When the carbonization temperature exceeds 1,000° C., it is difficult to make nitrogen to remain in the carbon skeleton, which may provide such a tendency that the N/C atomic ratio is lowered to reduce the oxygen reduction reaction activity. Furthermore, the yield of the carbide may be considerably reduced to fail to produce the carbide with high yield in some cases.

The lower limit of the reaction temperature is preferably 400° C., more preferably 500° C., and further preferably 600° C. When the reaction temperature is 400° C. or more, the carbonization may proceed sufficiently to provide a carbon alloy having high catalytic capability. When the reaction temperature is 1,000° C. or less, nitrogen remains in the carbon skeleton to provide the target N/C atomic ratio, and sufficient oxygen reduction reaction activity may be obtained.

In the case where the production method of the invention contains a rebaking described later, the baking temperature of the carbonization treatment is preferably from 400 to 900° C., more preferably from 500 to 850° C., and further preferably from 600 to 800° C., for performing the rebaking treatment at a temperature higher than the temperature for the initial carbonization treatment.

In the carbonization treatment, the material to be treated may be maintained at a temperature of from 400 to 1,000° C. for from 0.1 to 100 hours, and more preferably from 1 to 10 hours. Even when the carbonization treatment performed for more than 10 hours, there are cases where an effect that corresponds to the treating time may not be obtained.

The carbonization treatment is preferably performed in an inert atmosphere, and is preferably performed under a stream of an inert gas or a nonoxidative gas. The flow rate of the gas is preferably from 0.01 to 2.0 L/min per an inner diameter of 36 mm, more preferably from 0.05 to 1.0 L/min per an inner diameter of 36 mm, and particularly preferably from 0.1 to 0.5 L/min per an inner diameter of 36 mm. When the baking is performed at 0.01 L/min or less, amorphous carbon by-produced on baking may not be distilled off, which may cause reduction of the treating temperature of the nitrogen-containing carbon alloy thus formed. When the baking is performed at 2.0 L/min or more, it is not preferred since the substrate may vaporize before carbonization to fail to provide the nitrogen-containing carbon alloy. When the flow rate is in the range, it is preferred since the target nitrogen-containing carbon alloy may be favorably obtained.

When the carbonization treatment is performed at a high temperature in the first step, the yield of the carbon alloy is lowered, but the resulting carbon alloy has a uniform crystallite size, in which the metal is homogeneously distributed, thereby maintaining high activity. As a result, the carbon alloy that is excellent in the oxygen reduction capability may be produced.

The temperature rising step may be performed by dividing into two steps of temperature rising. More specifically, by performing the first step treatment at a relatively low temperature, the impurity components, the solvent and the like that are unstable to heat may be removed.

By performing the second step treatment subsequently, not only the decomposition reaction and the carbonization reaction of the organic material may be performed continuously, but also the decomposition product and the metal are subjected to mutual action, thereby stabilizing the metal in a highly active state. For example, iron ion may be contained in a divalent state. As a result, a carbon alloy having high oxygen reduction capability may be produced.

By performing the second step treatment, furthermore, the treatment temperature of the subsequent carbonization treatment may be increased, and thereby a carbon alloy having a higher regularity of the carbon structure may be obtained. As a result, the carbon alloy is enhanced in conductivity to provide high oxygen reduction capability, and the durability as a catalyst is also enhanced.

The temperature rising to the temperature of the first step is performed for maintaining only the structure that is stable to heat, and providing residual heat for the second step treatment. The temperature rising to the carbonization temperature in the second step is performed for providing a suitable carbon alloy. If the temperature exceeds the carbonization temperature, the carbonization proceeds excessively, whereby a suitable carbon alloy may not be obtained in some cases, and furthermore there are cases where the yield is lowered.

The temperature rising treatment in the first step is preferably performed in an inert atmosphere. The inert atmosphere herein means a gas atmosphere including a nitrogen gas atmosphere and a rare gas atmosphere. Even when oxygen is contained therein, an atmosphere that is restricted in oxygen amount to such an extent that a material to be treated is not burnt may be used. The atmosphere may be either a closed system or a flow system where a fresh gas is fed thereto, and is preferably a flow system. In the case of using the flow system, the flow rate of the gas is preferably from 0.01 to 2.0 L/min of the gas per an inner diameter of 36 mm, more preferably from 0.05 to 1.0 L/min of the gas per an inner diameter of 36 mm, and particularly preferably from 0.1 to 0.5 L/min of the gas per an inner diameter of 36 mm.

In the first step temperature rising treatment, the organic material containing the nitrogen-containing organic compound, the inorganic metal salt and the like is preferably subjected to temperature rising to from 100 to 500° C., and more preferably from 150 to 400° C. Accordingly, a homogeneous preliminarily carbonized material may be obtained.

In the first step of temperature rising treatment, the organic material containing the nitrogen-containing organic compound, the inorganic metal salt and the like is placed in a carbonization equipment or the like and then subjected to temperature rising from ordinary temperature to the prescribed temperature, or the organic material may be inserted in a carbonization equipment or the like at the prescribed temperature. In the first step of temperature rising treatment, the temperature rising from ordinary temperature to the prescribed temperature is preferably performed. When the temperature is raised from ordinary temperature to the prescribed temperature, the temperature rising rate is preferably constant. More specifically, the temperature rising rate is preferably 1° C. or more and 1,000° C. or less per minute, and more preferably 1° C. or more and 500° C. or less per minute.

In the second step of temperature rising treatment, after completing the first step temperature rising treatment, the temperature may be consecutively increased to perform the second step temperature rising treatment. Alternatively, the temperature may be once lowered to room temperature, and then the second step temperature rising treatment may be performed. On cooling the preliminarily carbonized material to room temperature after the first step of temperature rising treatment, the material may be pulverized homogeneously, may be further molded, or may be subjected to acid cleaning for removing metals. The material is preferably pulverized homogeneously and subjected to acid cleaning.

More specifically, the temperature rising rate is preferably 2° C. or more and 1,000° C. or less per minute, and more preferably 5° C. or more and 500° C. or less per minute.

The second step of temperature rising treatment is preferably performed in an inert atmosphere, and in the case where the atmosphere is a flow system, the flow rate of the gas is preferably from 0.01 to 2.0 L/min of the gas per an inner diameter of 36 mm, more preferably from 0.05 to 1.0 L/min of the gas per an inner diameter of 36 mm, and particularly preferably from 0.1 to 0.5 L/min of the gas per an inner diameter of 36 mm.

The gas flow rate in the second step may be different from the gas flow rate in the first step.

The carbonization treatment is preferably performed in the presence of an activator. By performing the carbonization treatment at a high temperature in the presence of an activator, fine pores grow in the carbon alloy to increase the surface area thereof, and thus the exposure of the metal on the surface of the carbon alloy is increased to enhance the capability as a catalyst. The surface area of the carbonized product may be measured by $N_2$ adsorption amount.

While the activator that may be used is not particularly limited, at least one kind selected from the group consisting of carbon dioxide, water vapor, air, oxygen, an alkali metal hydroxide, zinc chloride and phosphoric acid may be used, and preferably at least one kind selected from the group consisting of carbon dioxide, water vapor, air and oxygen may be used. The gaseous activator, such as carbon dioxide and water vapor, may be contained in an amount of from 2 to 80% by mol, and preferably from 10 to 60% by mol, in the atmosphere of the second step carbonization treatment. When the amount is 2% by mol or more, a sufficient activation effect may be obtained, and when the amount exceeds 80% by mol, the activation effect becomes conspicuous, but the yield of the carbonized material may be considerably reduced, thereby failing to produce the carbonized material efficiently. The solid activator, such as an alkali metal hydroxide, may be mixed in the form of solid with the material to be carbonized, or may be used after dissolving or diluting with a solvent, such as water, with which the material to be carbonized is impregnated, or after forming into a slurry, which may be kneaded with the material to be carbonized. The liquid activator may be diluted with water or the like, and then the material to be carbonized may be impregnated therewith, or may be kneaded therewith.

After the carbonization, nitrogen atoms may be introduced. The method of introducing nitrogen atoms in this case may be a liquid phase doping method, a gas phase doping method, or a gas phase-liquid phase doping method. For example, the carbon alloy may be thermally treated by maintaining in an ammonia atmosphere as a nitrogen source at a temperature of 200° C. or more and 800° C. or less for 5 minutes or more and 180 minutes or less, thereby introducing nitrogen atoms to the surface of the carbon catalyst.

Cooling Step and Pulverization Treatment

After completing the carbonization treatment, the carbon alloy is cooled to room temperature, and may be subjected to a pulverization treatment. The pulverization treatment may be performed by any method known by a skilled person in the art, and for example, the carbon alloy may be pulverized with a ball mill, or by mechanical pulverization or the like.

Acid Cleaning Step

The method for producing a nitrogen-containing carbon alloy of the invention preferably contains an acid cleaning step of cleaning the baked nitrogen-containing carbon alloy with an acid after the baking step. By cleaning the metal on the surface of the carbon alloy catalyst thus formed, ORR activity may be considerably enhanced. While not sticking to any theory, it is expected that a porous nitrogen-containing carbon alloy having an optimum porosity may be obtained by the acid cleaning treatment.

In the acid cleaning treatment, an arbitrary aqueous Bronsted (protonic) acid including a strong acid and a weak acid may be used in the acid cleaning treatment. Furthermore, an inorganic acid (mineral acid) or an organic acid may be used. Preferred examples of the acid include HCl, HBr, HI, $H_2SO_4$, $H_2SO_3$, $HNO_3$, $HClO_4$, $(HSO_4)^-$, $(HSO_3)^-$, $(H_3O)^+$, $H_2(C_2O_4)$, $HCO_2H$ $HClO_3$, $HBrO_3$, $HBrO_4$, $HIO_3$, $HIO_4$, $FSO_3H$, $CF_3SO_3H$, $CF_3CO_2H$, $CH_3CO_2H$ and $B(OH)_3$ (including arbitrary combinations thereof), but the acid is not limited thereto.

The method described in JP-A-2010-524195 may also be used in the invention.

Rebaking Step

The production method of a nitrogen-containing carbon alloy of the invention preferably contains a step of rebaking the nitrogen-containing carbon alloy thus cleaned with an acid after the acid cleaning step. The rebaking step performed may enhance the electric current density associated with the increase of the coated amount of the nitrogen-containing carbon alloy coated on an electrode, thereby enhancing the ORR activity. There is no significant increase of an electric current density observed in an ordinary carbon alloy that is not subjected to an acid treatment step (for example, a 700° C. baked product of a carbon alloy described in JP-A-2011-225431) even when the coated amount is increased.

For performing the rebaking step at a temperature that is higher than the temperature for the initial carbonization treatment, the upper limit of the baking temperature of the rebaking treatment may be 1,000° C. or less, and the lower limit of the baking temperature is preferably 500° C. or more, more preferably 600° C. or more, and further preferably 700° C. or more.

Nitrogen-Containing Carbon Alloy

The nitrogen-containing carbon alloy of the invention may be produced by the method for producing a nitrogen-containing carbon alloy of the invention.

The nitrogen-containing carbon alloy of the invention obtained by baking the precursor is a nitrogen-containing carbon alloy having nitrogen introduced thereto. The carbon alloy of the invention preferably contains graphene, which is an aggregate of carbon atoms, in which carbon atoms are chemically bonded through the $sp^2$ hybrid orbital to form a hexagonal network structure spreading two-dimensionally.

In the carbon alloy of the invention, furthermore, the content of surface nitrogen atoms in the carbon catalyst is preferably 0.05 or more and 0.3 or less in terms of atomic ratio (N/C) with respect to carbon atoms on the surface. When the atomic ratio (N/C) of nitrogen atoms and carbon atoms is less than 0.05, the number of effective nitrogen atoms that are bonded to the metal may be decreased, thereby failing to provide sufficient oxygen reduction catalytic characteristics. When the atomic ratio (N/C) of nitrogen atoms and carbon atoms exceeds 0.4, the strength of the carbon skeleton of the carbon alloy may be decreased, and the electroconductivity thereof may also be decreased.

The skeleton of the carbon alloy may be constituted by at least carbon atoms and nitrogen atoms, and may contain hydrogen atoms, oxygen atoms and the like as additional atoms. In this case, the atomic ratio of the additional atoms to carbon atoms and nitrogen atoms ((additional atoms)/(C+N)) is preferably 0.3 or less.

The specific surface area may be obtained by a BET (Brunauer-Emmett-Teller) method, in which the carbon alloy is placed in a prescribed container and cooled to a liquid nitrogen temperature (−196° C.), nitrogen gas is introduced to the container for adsorption, the monomolecular adsorption amount and the adsorption parameter are obtained from the absorption isotherm, and the specific surface area of the specimen is calculated from the molecular occupied cross sectional area of nitrogen (0.162 $cm^2$).

The pore shape of the carbon alloy is not particularly limited, and for example, pores may be formed only on the surface thereof, whereas pores may be formed not only on the surface but also in the interior thereof. In the case where pores are formed in the interior, for example, the pores may penetrate in the form of tunnels through the carbon alloy, or may have such a shape that voids having a spherical shape or a polygonal shape, such as a hexagonal columnar shape, are connected to each other.

The specific surface area of the carbon alloy is preferably 90 $m^2/g$ or more, more preferably 350 $m^2/g$ or more, and particularly preferably 670 $m^2/g$ or more. However, the specific surface area may be outside the aforementioned range in the case where the catalytically active sites (i.e., the metal coordination sites constituted by at least C, N and metal ion, or spaces (or fields) having the sites disposed therein) are generated and formed in a high density.

The specific surface area of the carbon alloy is preferably 3,000 $m^2/g$ or less, more preferably 2,000 $m^2/g$ or less, and particularly preferably 1,300 $m^2/g$ or less, for making oxygen reach the deep spaces of the pores to provide sufficient oxygen reduction catalytic characteristics.

The shape of the carbon alloy of the invention is not particularly limited as far as it has oxygen reduction reaction activity. Examples thereof include a sheet shape, a fiber shape, a block shape, a columnar shape, a particle shape, and largely distorted shapes, such as various ellipsoidal shapes other than a spherical shape, a flat shape, a rectangular shape, and the like. A block shape and a particle shape are preferred for facilitating dispersion.

The carbon alloy of the invention may be dispersed in a solvent to form a slurry containing the carbon alloy. Accordingly, for facilitating production of an electrode catalyst of a fuel cell or an electrode material of a capacitor device, the slurry containing the carbon alloy dispersed in a solvent may be coated, baked and dried on a supporting material, thereby forming a carbon catalyst having been formed into an arbitrary shape. By forming the carbon alloy into a slurry, the carbon catalyst is enhanced in workability and may be easily used as an electrode catalyst and an electrode material.

The carbon alloy catalyst for a fuel cell of the invention may have a coated amount of the nitrogen-containing carbon alloy after drying of 0.01 mg/cm$^2$ or more, more preferably from 0.02 to 100 mg/cm$^2$, and particularly preferably from 0.05 to 10 mg/cm$^2$.

The solvent used may be appropriately selected from solvents that are used in production of an electrode catalyst of a fuel cell and an electrode material of a capacitor device. Examples of the solvent used in production of an electrode material of a capacitor device include diethyl carbonate (DEC), dimethyl carbonate (DMC), 1,2-dimethoxyethane (DME), ethylene carbonate (EC), ethylmethyl carbonate (EMC), N-methyl-2-pyrrolidone (NMP), propylene carbonate (PC) and 7-butyrolactone (GBL), and these ordinary polar solvents may be used solely or as a mixture of plural kinds thereof. Examples of the solvent used in production of an electrode catalyst of a fuel cell include water, methanol, ethanol, isopropyl alcohol, butanol, toluene, xylene, methyl ethyl ketone and acetone.

Purpose of Nitrogen-Containing Carbon Alloy

The purpose of the nitrogen-containing carbon alloy of the invention is not particularly limited, for example, a structural material, an electrode material, a filter material, a catalytic material and the like, and is preferably used as an electrode material of a capacitor device, such as a capacitor and a lithium secondary battery, and more preferably as a carbon catalyst of a fuel cell, a zinc-air battery, a lithium-air battery and the like, due to the high oxygen reduction reaction activity. Furthermore, in a membrane-electrode assembly having a solid polymer electrolyte membrane and a catalyst layer provided in contact with the solid polymer electrolyte membrane, the catalyst may be contained in the catalyst layer. Moreover, the membrane-electrode assembly may be contained in a fuel cell.

Fuel Cell

FIG. 1 is a schematic structural illustration of a fuel cell 10 using a carbon catalyst formed of the carbon alloy of the invention. The carbon catalyst is applied to an anode electrode and a cathode electrode.

The fuel cell 10 has a separator 12, an anode electrode catalyst (fuel electrode) 13, a cathode electrode catalyst (oxidant electrode) 15, and a separator 16, which are disposed to hold a solid polymer electrolyte 14. The solid polymer electrolyte 14 used may be a fluorine cation exchange resin membrane, represented by a perfluorosulfonic acid resin membrane. The carbon catalyst is used as the anode electrode catalyst 13 and the cathode electrode catalyst 15 and made in contact with the both sides of the solid polymer electrolyte 14, thereby constituting the fuel cell 10 having the anode electrode catalyst 13 and the cathode electrode catalyst 15 that contain the carbon catalyst. The carbon catalyst is formed on both surfaces of the solid polymer electrolyte, and the anode electrode catalyst 13 and the cathode electrode catalyst 15 are made in close contact with the both main surfaces of the solid polymer electrolyte 14 by hot-pressing thereto on the side of the electrode reaction layer, thereby integrating them as an MEA (membrane electrode assembly).

In an ordinary fuel cell, a gas diffusion layer formed of a porous sheet having a function of a collector (for example, carbon paper) is inserted between the separator and the anode or cathode electrode catalyst. In the fuel cell 10 shown in FIG. 1, on the other hand, the carbon catalyst having a large specific surface area and a higher gas diffusion property can be used as the anode and cathode electrode catalysts. By using the carbon catalyst as the electrodes, the carbon catalyst is rendered to have a function of a gas diffusion layer even when no gas diffusion layer is provided, and thus such a fuel cell is provided that contains the anode and cathode electrode catalysts 13 and 15 integrated with a gas diffusion layer, thereby enabling miniaturization and cost reduction of a fuel cell due to the omission of a gas diffusion layer.

The separators 12 and 16 support the anode and cathode electrode catalyst layers 13 and 15, and feed and exhaust the reaction gases including a fuel gas H$_2$ and an oxidant gas O$_2$. On feeding the reaction gases to the anode and cathode electrode catalysts 13 and 15, a three-phase interface of the gas phase (reaction gas), the liquid phase (solid polymer electrolyte membrane) and the solid phase (catalysts of both the electrodes) is formed at the interface between the carbon catalysts provided on both the electrodes and the solid polymer electrolyte 14. An electrochemical reaction thus occurs therein to generate direct current electric power.

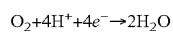
Cathode side: $O_2 + 4H^+ + 4e^- \rightarrow 2H_2O$

Anode side: $H_2 \rightarrow 2H^+ + 2e^-$

In the electrochemical reaction, the aforementioned reactions occur, and H$^+$ ion formed on the anode side migrates in the solid polymer electrolyte 14 to the cathode side, and e$^-$ (electron) migrates to the cathode side through an external load. On the cathode side, oxygen contained in the oxidant gas is reacted with H$^+$ ion and e$^-$ migrating from the anode side to form water. As a result, the fuel cell generates direct current electric power and forms water from hydrogen and oxygen.

Capacitor Device

Figure 2:
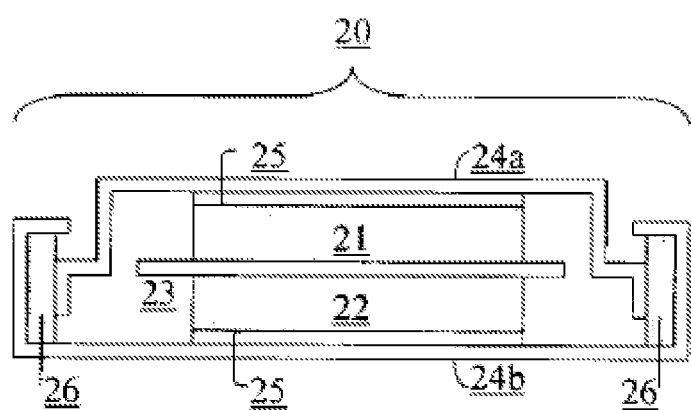
FIG. 2 The figure is a schematic structural illustration of an electric double layer capacitor using a carbon alloy according to the invention.

A capacitor device having an electrode material, to which a carbon catalyst formed of the carbon alloy of the invention is applied, will be described. FIG. 2 is a schematic structural illustration of an electric double layer capacitor 20 excellent in electric capacity using the carbon catalyst.

The electric double layer capacitor 20 shown in FIG. 2 has a first electrode 21 and a second electrode 22, which are polarizable electrodes, facing each other with a separator 23 intervening between them, and these are housed in an outer lid 24a and an outer chassis 24b. The first electrode 21 and the second electrode 22 are connected to the outer lid 24a and the outer chassis 24b, respectively, through collectors 25. The separator 23 is impregnated with an electrolytic solution. The outer lid 24a and the outer chassis 24b are sealed by crimping while electrically insulating them with a gasket 26, thereby constituting the electric double layer capacitor 20.

In the electric double layer capacitor 20 shown in FIG. 2, the carbon catalyst may be applied to the first electrode 21 and the second electrode 22, and thereby the electric double layer capacitor having an electrode material, to which the carbon catalyst is applied, may be constituted. The carbon catalyst has a fibrous structure containing an aggregate of nano-shell carbon, and has a large specific surface area due to the fiber diameter in a nanometer order, thereby providing a large electrode interface accumulating electric charge in the capacitor. Furthermore, the carbon catalyst is electrochemically inert to the electrolytic solution and has suitable electroconductivity. Accordingly, by applying the carbon catalyst to an electrode of a capacitor, the electrostatic capacity per unit volume of the electrode may be enhanced.

As similar to the capacitor described above, the carbon catalyst may also be applied to an electrode material constituted by a carbon material, for example, a negative electrode material of a lithium ion secondary battery, thereby providing a secondary battery having a large electric capacity due to the large specific surface area of the carbon catalyst.

Environmental Catalyst

An example where the carbon alloy of the invention is used as a substitute of an environmental catalyst containing a noble metal, such as platinum, will be described.

An environmental catalyst having a catalyst material constituted by a noble metal material, such as platinum, solely or as a composite material is used as an exhaust gas purifying catalyst for decomposing and removing contaminants (which are mainly gaseous substances) contained in contaminated air. The carbon catalyst may be used as a substitute of the exhaust gas purifying catalyst containing a noble metal, such as platinum. The carbon catalyst is imparted with an oxygen reduction reaction catalytic function, and thus has a decomposition function of substances to be treated, such as contaminants. Accordingly, by constituting an environmental catalyst by using the carbon catalyst, an environmental catalyst may be provided at low cost since an expensive noble metal, such as platinum, may not be necessarily used. Furthermore, the treatment area for decomposing substances to be treated per unit volume may be large due to the large specific surface area thereof, thereby constituting an environmental catalyst that is excellent in decomposition function per unit volume.

By using the carbon catalyst as a carrier that carries a noble metal, such as platinum, solely or as a composite material used in an ordinary environmental catalyst, an environmental catalyst further excellent in the catalytic function, such as the decomposition function, may be constituted. The environmental catalyst having the carbon catalyst may be used not only as the exhaust gas purifying catalyst described above, but also as a purification catalyst for water.

The carbon alloy of the invention may also be used as catalysts for a wide range of chemical reactions, and may be used particularly as a substitute of a platinum catalyst. Specifically, the carbon catalyst may be used as a substitute of an ordinary process catalyst containing a noble metal, such as platinum, for chemical industries. Accordingly, the carbon catalyst may avoid the use of an expensive noble metal, such as platinum, and may provide a low cost chemical reaction process catalyst. Furthermore, the carbon catalyst may provide a chemical reaction process catalyst that is excellent in chemical reaction efficiency per unit volume due to the large specific surface area thereof.

The carbon catalyst for chemical reaction may be applied to a catalyst for hydrogenation reaction, a catalyst for dehydrogenation reaction, a catalyst for oxidation reaction, a catalyst for polymerization reaction, a catalyst for modification reaction, a catalyst for modification of water vapor, and the like. More specifically, the carbon catalyst may be applied to various chemical reactions with reference to literatures relating to catalysts, for example, "Shokubai Chousei" (Catalyst Preparation), by Takayasu Shirasaki and Naoyuki Todoh, Kodansha, Ltd. (1975).

EXAMPLE

The invention will be described in more detail with reference to examples below. The materials, the amounts used, the ratios, the treatments, the treatment procedures and the like shown in the examples may be appropriately changed unless they deviate from the substances of the invention. Accordingly, the scopes of the invention are not limited to the examples shown below. The "part" is based on mass unless otherwise indicated.

Evaluation Method of Property of Nitrogen-Containing Carbon Alloy Measurement of Specific Surface Area by BET Method A specimen of a nitrogen-containing carbon alloy before acid cleaning and a specimen of a nitrogen-containing carbon alloy isolated after acid cleaning were dried under vacuum at 200° C. for 3 hours with a specimen pretreatment apparatus (BELPREP-flow, a trade name, produced by BEL Japan, Inc.).

The nitrogen-containing carbon alloy was measured for the specific surface area under a simple measurement condition with an automatic specific surface area/pore distribution measurement equipment (BELSORP-mini II, a trade name, produced by BEL Japan, Inc.).

The specific surface area was obtained by the BET (Brunauer-Emmett-Teller) method using the analysis program attached to the equipment.

Comparative Example 1

Synthesis of Carbon Material (C1C) of Cobalt(II) Chloride Hexahydrate-Added DCPy Mixture Preparation of Cobalt (II) Chloride Hexahydrate-Added DCPy Mixture 0.728 g of cobalt (II) chloride hexahydrate (produced by Wako Pure Chemical Industries, Ltd.) was added to 2.327 g of 3,4-dicyanopyridine (DCPy, produced by Sigma-Aldrich Corporation, Compound (B-9)) and mixed with an agate mortar to provide a cobalt(II) chloride hexahydrate-added DCPy mixture (C1A).

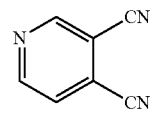

DCPy

Molecular formula: $C_7H_3N_3$
Molecular weight: 129.119
Elemental analysis (calculated value): C: 65.11, H: 2.34, N: 32.54

Infusiblization and Carbonization Treatment 3.0142 g of the cobalt(II) chloride hexahydrate-added DCPy mixture (C1A) was weighed in a quartz boat, which was placed at the center of a quartz tube having a diameter of 4.0 cm (inner diameter: 3.6 cm) inserted in a tubular furnace, and nitrogen was made to flow therein at 300 mL per minute at room temperature for 30 minutes.

The temperature was raised from 30° C. to 700° C. at a rate of 5° C. per minute and maintained at 700° C. for 1 hour. Thereafter, it was cooled to room temperature over 3 hours, thereby providing 0.4037 g of a carbon material (C1B).

Pulverization and Acid Cleaning Treatment and Measurement of Specific Surface Area The carbon material (C1B) was pulverized with an agate mortar to provide a non-acid cleaned carbon material. The resulting non-acid cleaned carbon material was measured for the specific surface area by the BET method. The result is shown in Table 1 below in the column of before acid cleaning.

The non-acid cleaned carbon material thus obtained by pulverizing the carbon material (C1B) with an agate mortar was repeatedly subjected to concentrated hydrochloric acid cleaning, centrifugal filtration and removal of the supernatant liquid until coloration was not observed. After rinsing with water, the material was filtered and dried in air. The resulting carbon material was dried under vacuum at 110° C. for 3 hours, allowed to stand until room temperature, and allowed to stand overnight, thereby providing an acid cleaned carbon material (C1C). The resulting acid cleaned carbon material (C1C) was designated as a nitrogen-containing carbon alloy of Comparative Example 1. The specific surface area thereof was measured by the BET method. The result is shown in Table 1 below in the column of after acid cleaning.

1. Oxygen Reduction Reaction (ORR) Activity of Carbon Alloy-coated Electrode (Evaluation of Electric Current Density)

Production of Carbon Alloy-Coated Electrode 110 mg of a Nafion solution (5% alcohol aqueous solution) as a binder, and 2.4 mL of water and 1.6 mL of 1-propanol (IPA) as solvents were added to 10 mg of the nitrogen-containing carbon alloy of Comparative Example 1 thus obtained, and dispersed with an ultrasonic homogenizer connected with an attachment having a diameter of 7 mm (US-150T, a trade name, produced by Nissei Limited) for 30 minutes. The nitrogen-containing carbon alloy dispersion liquid was coated on a carbon electrode to make an amount of the nitrogen-containing carbon alloy of 0.05 mg/cm$^2$ with a rotation ring disk electrode (HR2-RD1-Pt8/GC5, a trade name, produced by Hokuto Denko Corporation) and dried at room temperature, thereby providing a carbon alloy-coated electrode.

Measurement of Oxygen Reduction Reaction (ORR) Activity of Carbon Alloy-Coated Electrode A rotation electrode device (HR-201, a trade name, produced by Hokuto Denko Corporation) was connected to an automatic polarization system (HZ-3000, a trade name, produced by Hokuto Denko Corporation), and the measurement was performed in the following manner with the carbon alloy-coated electrode as the working electrode and a platinum electrode and a saturated calomel electrode (SCE) as the counter electrode and the reference electrode, respectively.

A. For cleaning the carbon alloy-coated electrode, 10 cycles of cyclic voltammetry were performed at a sweep potential of from 0.946 to −0.204 V (vs. SCE) and a sweep rate of 50 mV/s in a 0.1 M sulfuric acid aqueous solution having been bubbled with argon for 30 minutes or more at 20° C.

B. For a blank measurement, linear sweep voltammetry was performed at a sweep potential of from 0.746 to −0.204 V (vs. SCE), a sweep rate of 5 mV/s and an electrode rotation number of 1,500 rpm in a 0.1 M sulfuric acid aqueous solution having been bubbled with argon for 30 minutes or more at 20° C.

C. For measuring the oxygen reduction activity, linear sweep voltammetry was performed at a sweep potential of from 0.746 to −0.204 V (vs. SCE), a sweep rate of 5 mV/s and an electrode rotation number of 1,500 rpm in a 0.5 M sulfuric acid aqueous solution having been bubbled with oxygen for 30 minutes or more.

D. The measurement data of B was subtracted from the measurement data C, and the result was designated as the true oxygen reduction activity. The electric current density at a voltage of 0.7 V vs. NHE was obtained from the resulting voltammogram (voltage-current density curve), and the result was designated as the ORR activity value.

The result obtained is shown in Table 1 below.

2. Oxygen Reduction Reaction (ORR) Activity of Carbon Alloy-Coated Electrode (Evaluation of Rising Potential) and Number of Reaction Electrons in Oxygen Reduction Reaction Production of Carbon Alloy-Coated Electrode 110 mg of a Nafion solution (5% alcohol aqueous solution) as a binder, and 2.4 mL of water and 1.6 mL of 1-propanol (IPA) as solvents were added to 10 mg of the nitrogen-containing carbon alloy of Comparative Example 1 thus obtained, and dispersed with an ultrasonic homogenizer connected with an attachment having a diameter of 7 mm (US-150T, a trade name, produced by Nissei Limited) for 30 minutes. The nitrogen-containing carbon alloy dispersion liquid was coated on a carbon electrode to make an amount of the nitrogen-containing carbon alloy of 0.5 mg/cm$^2$ with a rotation ring disk electrode (HR2-RD1-Pt8/GC5, a trade name, produced by Hokuto Denko Corporation) and dried at room temperature, thereby providing a carbon alloy-coated electrode.

Measurement of Oxygen Reduction Reaction (ORR) Activity of Carbon Alloy-Coated Electrode (Evaluation of Rising Potential) and Evaluation of Number of Reaction Electrons in Oxygen Reduction Reaction The rising potential was obtained by the measurement of the oxygen reduction reaction activity, and the number of reaction electrons in the oxygen reduction reaction was obtained by the measurement of the hydrogen peroxide formation amount, in the following manners.

A rotation electrode device (HR-201, a trade name, produced by Hokuto Denko Corporation) was connected to an automatic polarization system (HZ-3000, a trade name, produced by Hokuto Denko Corporation), and the measurement was performed in the following manner with the rotation ring disk electrodes (the carbon alloy-coated electrode and the platinum ring disk electrode) as the working electrode and a platinum electrode and a saturated calomel electrode (SCE) as the counter electrode and the reference electrode, respectively.

A. For cleaning the carbon alloy-coated electrode, 10 cycles of cyclic voltammetry were performed at a sweep potential of from 0.946 to −0.204 V (vs. SCE) and a sweep rate of 50 mV/s in a 0.1 M sulfuric acid aqueous solution having been bubbled with argon for 30 minutes or more at 20° C.

B. For a blank measurement, linear sweep voltammetry was performed for the rotation ring disk electrodes (the carbon alloy-coated electrode and the platinum ring disk electrode) respectively at a sweep potential of from 0.746 to −0.204 V (vs. SCE), a sweep rate of 5 mV/s and an electrode rotation number of 1,500 rpm in a 0.1 M sulfuric acid aqueous solution having been bubbled with argon for 30 minutes or more at 20° C.

C. Linear sweep voltammetry was performed for the rotation ring disk electrodes (the carbon alloy-coated electrode and the platinum ring disk electrode) respectively at a sweep potential of from 0.746 to −0.204 V (vs. SCE), a sweep rate of 5 mV/s and an electrode rotation number of 1,500 rpm in a 0.5 M sulfuric acid aqueous solution having been bubbled with oxygen for 30 minutes or more.

D. The measurement data of B was subtracted from the measurement data C, and the result was designated as the true oxygen reduction activity. The potential (vs. NHE) at an electric current density of 1 mA/cm$^2$ was obtained from the resulting voltammogram (voltage-current density curve), and the result was designated as the rising potential of the carbon alloy-coated electrode as an index of the catalytic activity.

E. The measurement data of B was subtracted from the measurement data C for the rotation ring disk electrodes (the carbon alloy-coated electrode and the platinum ring disk electrode) respectively for calculating the electric current values ($I_D$ and $I_R$) with respect to the potentials.

The $H_2O_2$ formation rate (%) was calculated by the following expression according to the method described in A. Ohma, et al., Electrochimica Acta, vol. 55, p. 8829 (2010).

$$H_2O_2 \text{ formation rate } X_{H2O2} (\%) = \frac{2I_R/N}{I_D + (I_R/N)} \times 100$$

Capture rate $N = 0.49$ (experimentally obtained)

Subsequently, the number of electrons in oxygen reduction reaction was calculated by the following expression.

Number of electrons in oxygen reduction reaction=4×(1−$H_2O_2$ formation rate (%)/100%)+2× $H_2O_2$ formation rate (%)/100%

The results obtained are shown in Table 1 below.

Comparative Example 2

Synthesis of Carbon Material (C2C) of Iron(II) Chloride Tetrahydrate-Added DCPy Mixture Preparation of Iron(II) Chloride Tetrahydrate-Added DCPy Mixture 0.245 g of iron(II) chloride tetrahydrate (99.9%, produced by Wako Pure Chemical Industries, Ltd.) was added to 0.955 g of 3,4-dicyanopyridine (DCPy, produced by Sigma-Aldrich Corporation, Compound (B-9)) and mixed with an agate mortar to provide an iron (II) chloride tetrahydrate-added DCPy mixture (C2A).

Infusiblization and Carbonization Treatment 3.0116 g of the iron (II) chloride tetrahydrate-added DCPy mixture (C2A) was weighed in a quartz boat, which was placed at the center of a quartz tube having a diameter of 4.0 cm (inner diameter: 3.6 cm) inserted in a tubular furnace, and nitrogen was made to flow therein at 300 mL per minute at room temperature for 30 minutes.

The temperature was raised from 30° C. to 700° C. at a rate of 5° C. per minute and maintained at 700° C. for 1 hour. Thereafter, it was cooled to room temperature over 3 hours, thereby providing 0.6538 g of a carbon material (C2B).

Pulverization and Acid Cleaning Treatment and Measurement of Specific Surface Area The carbon material (C2B) was pulverized with an agate mortar to provide a non-acid cleaned carbon material. The resulting non-acid cleaned carbon material was measured for the specific surface area by the BET method. The result is shown in Table 1 below in the column of before acid cleaning.

The non-acid cleaned carbon material thus obtained by pulverizing the carbon material (C2B) with an agate mortar was repeatedly subjected to concentrated hydrochloric acid cleaning, centrifugal filtration and removal of the supernatant liquid until coloration was not observed. After rinsing with water, the material was filtered and dried in air. The resulting carbon material was dried under vacuum at 110° C. for 3 hours, allowed to stand until room temperature, and allowed to stand overnight, thereby providing an acid cleaned carbon material (C2C). The resulting acid cleaned carbon material (C2C) was designated as a nitrogen-containing carbon alloy of Comparative Example 2. The specific surface area thereof was measured by the BET method. The result is shown in Table 1 below in the column of after acid cleaning.

Production of Carbon Alloy-Coated Electrode, Measurement of Oxygen Reduction Reaction (ORR) Activity, and Number of Reaction Electrons in Oxygen Reduction Reaction A carbon alloy-coated electrode was produced in the same manner as in Comparative Example 1 except that the nitrogen-containing carbon alloy material obtained in Comparative Example 2 was used, and the ORR activity values (electric current density and rising potential) and the number of reaction electrons in oxygen reduction reaction were measured. The results obtained are shown in Table 1 below.

Comparative Example 3

Synthesis of Carbon Material of DCPy (C3C)

Infusiblization and Carbonization Treatment 4.000 g of 3,4-dicyanopyridine (DCPy, produced by Sigma-Aldrich Corporation) was weighed in a quartz boat, which was placed at the center of a quartz tube having a diameter of 4.0 cm (inner diameter: 3.6 cm) inserted in a tubular furnace, and nitrogen was made to flow therein at 300 mL per minute at room temperature for 30 minutes.

The temperature was raised from 30° C. to 700° C. at a rate of 5° C. per minute and maintained at 700° C. for 1 hour. Thereafter, it was cooled to room temperature over 3 hours, but no carbon material was obtained.

Comparative Example 4

Synthesis of Carbon Material (C4C) of FePc-Added-DCPy Mixture Preparation of FePc-Added DCPy Mixture 1.312 g of iron phthalocyanine (FePc produced by Tokyo Chemical Industry Co., LTD.) was added to 1.788 g of 3,4-dicyanopyridine (DCPy, produced by Sigma-Aldrich Corporation, Compound (B-9)) and mixed with an agate mortar to provide a FePc-added DCPy mixture (C4A).

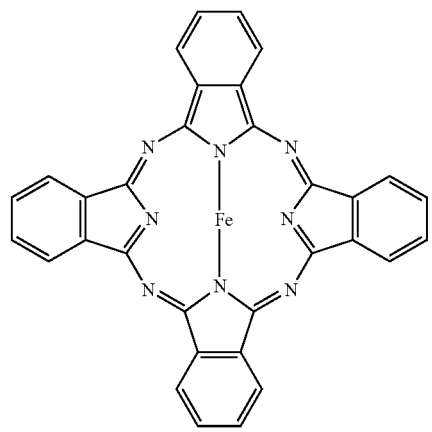

Fe-Pc

Molecular formula: $C_{32}H_{16}FeN_8$

Molecular weight: 568.368

Elemental analysis (calculated value): C: 67.62, H: 2.84, Fe, 9.83, N: 19.71

Infusiblization and Carbonization Treatment 1.0345 g of the FePc-added DCPy mixture (C4A) was weighed in a quartz boat, which was placed at the center of a quartz tube having a diameter of 4.0 cm (inner diameter: 3.6 cm) inserted in a tubular furnace, and nitrogen was made to flow therein at 300 mL per minute at room temperature for 30 minutes.

The temperature was raised from 30° C. to 700° C. at a rate of 5° C. per minute and maintained at 700° C. for 1 hour. Thereafter, it was cooled to room temperature over 3 hours, thereby providing 0.1327 g of a carbon material (C4B).

Pulverization and Acid Cleaning Treatment and Measurement of Specific Surface Area The carbon material (C4B) was pulverized with an agate mortar to provide a non-acid cleaned carbon material. The resulting non-acid cleaned carbon material was measured for the specific surface area by the BET method. The result is shown in Table 1 below in the column of before acid cleaning.

The non-acid cleaned carbon material thus obtained by pulverizing the carbon material (C4B) with an agate mortar was repeatedly subjected to concentrated hydrochloric acid cleaning, centrifugal filtration and removal of the supernatant liquid until coloration was not observed. After rinsing with water, the material was filtered and dried in air. The resulting carbon material was dried under vacuum at 110° C. for 3 hours, allowed to stand until room temperature, and allowed to stand overnight, thereby providing an acid cleaned carbon material (C4C). The resulting acid cleaned carbon material (C4C) was designated as a nitrogen-containing carbon alloy of Comparative Example 4. The specific surface area thereof was measured by the BET method. The result is shown in Table 1 below in the column of after acid cleaning.

Production of Carbon Alloy-Coated Electrode, Measurement of Oxygen Reduction Reaction (ORR) Activity, and Number of Reaction Electrons in Oxygen Reduction Reaction A carbon alloy-coated electrode was produced in the same manner as in Comparative Example 1 except that the nitrogen-containing carbon alloy material obtained in Comparative Example 4 was used, and the ORR activity values (electric current density and rising potential) and the number of reaction electrons in oxygen reduction reaction were measured. The results obtained are shown in Table 1 below.

Comparative Example 5

Synthesis of Carbon Material (C5C) of FeAA2-Added DCPy Mixture Preparation of FeAA2-Added DCPy Mixture 0.766 g of iron(II) acetylacetonato (99.95%, FeAA2, produced by Sigma-Aldrich Corporation) was added to 2.334 g of 3,4-dicyanopyridine (DCPy, produced by Sigma-Aldrich Corporation) and mixed with an agate mortar to provide a FeAA2-added DCPy mixture (C5A).

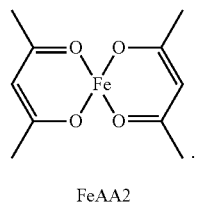

FeAA2

Molecular formula: $C_{10}H_{14}Fe_1O_4$

Molecular weight: 254.061

Elemental analysis (calculated value): C: 47.27, H: 5.55, Fe, 21.98, O, 25.19

Infusiblization and Carbonization Treatment 2.7681 g of the FeAA2-added DCPy mixture (C5A) was weighed in a quartz boat, which was placed at the center of a quartz tube having a diameter of 4.0 cm (inner diameter: 3.6 cm) inserted in a tubular furnace, and nitrogen was made to flow therein at 300 mL per minute at room temperature for 30 minutes.

The temperature was raised from 30° C. to 700° C. at a rate of 5° C. per minute and maintained at 700° C. for 1 hour. Thereafter, it was cooled to room temperature over 3 hours, thereby providing 1.3326 g of a carbon material (C5B).

Pulverization and Acid Cleaning Treatment and Measurement of Specific Surface Area The carbon material (C5B) was pulverized with an agate mortar to provide a non-acid cleaned carbon material. The resulting non-acid cleaned carbon material was measured for the specific surface area by the BET method. The result is shown in Table 1 below in the column of before acid cleaning.

The non-acid cleaned carbon material thus obtained by pulverizing the carbon material (C5B) with an agate mortar was repeatedly subjected to concentrated hydrochloric acid cleaning, centrifugal filtration and removal of the supernatant liquid until coloration was not observed. After rinsing with water, the material was filtered and dried in air. The resulting carbon material was dried under vacuum at 110° C. for 3 hours, allowed to stand until room temperature, and allowed to stand overnight, thereby providing an acid cleaned carbon material (C5C). The resulting acid cleaned carbon material (C5C) was designated as a nitrogen-containing carbon alloy of Comparative Example 5. The specific surface area thereof was measured by the BET method. The result is shown in Table 1 below in the column of after acid cleaning.

Production of Carbon Alloy-Coated Electrode, Measurement of Oxygen Reduction Reaction (ORR) Activity, and Number of Reaction Electrons in Oxygen Reduction Reaction A carbon alloy-coated electrode was produced in the same manner as in Comparative Example 1 except that the nitrogen-containing carbon alloy material obtained in Comparative Example 5 was used, and the ORR activity values (electric current density and rising potential) and the number of reaction electrons in oxygen reduction reaction were measured. The results obtained are shown in Table 1 below.

Example 1

Synthesis of Carbon Material of Mixture of Iron (II) Acetylacetonate and Iron(II) Chloride Tetrahydrate-Added DCPN (10)

Preparation of Mixture of Iron(II) Acetylacetonate and Iron (II) Chloride Tetrahydrate-Added DCPN 4.00 g of iron(II) chloride tetrahydrate (99.9%, produced by Wako Pure Chemical Industries, Ltd.) and 0.255 g of iron(II) acetylacetonate (99.95%, FeAA2, produced by Sigma-Aldrich Corporation) were added to 4.00 g of DCPN having the following structure (produced by Sigma-Aldrich Corporation, Compound (B-3)) andmixedwithX-TREMEMX1200XTM (producedbyWaring Products, Inc.) at 10,000 rpm for 50 seconds to provide a mixture of iron(II) acetylacetonate and iron(II) chloride tetrahydrate-added DCPy (1A).

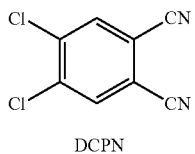

DCPN

Molecular formula: $C_8H_2Cl_2N_2$

Molecular weight: 197.02

Elemental analysis (calculated value): C: 48.77, H: 1.02, Cl: 35.99, N: 14.22

Infusiblization and Carbonization Treatment 3.0316 g of the mixture of iron(II) acetylacetonate and iron(II) chloride tetrahydrate-added DCPy(1A) was weighed in a quartz boat, which was placed at the center of a quartz tube having a diameter of 4.0 cm (inner diameter: 3.6 cm) inserted in a tubular furnace, and nitrogen was made to flow therein at 300 mL per minute at room temperature for 30 minutes.

The temperature was raised from 30° C. to 700° C. at a rate of 5° C. per minute and maintained at 700° C. for 1 hour. Thereafter, it was cooled to room temperature over 3 hours, thereby providing 1.0661 g of a carbon material (1B).

Pulverization and Acid Cleaning Treatment and Measurement of Specific Surface Area The carbon material (1B) was pulverized with an agate mortar to provide a non-acid cleaned carbon material. The resulting non-acid cleaned carbon material was measured for the specific surface area by the BET method. The result is shown in Table 1 below in the column of before acid cleaning.

The non-acid cleaned carbon material thus obtained by pulverizing the carbon material (1B) with an agate mortar was repeatedly subjected to concentrated hydrochloric acid cleaning, centrifugal filtration and removal of the supernatant liquid until coloration was not observed. After rinsing with water, the material was filtered and dried in air. The resulting carbon material was dried under vacuum at 110° C. for 3 hours, allowed to stand until room temperature, and allowed to stand overnight, thereby providing an acid cleaned carbon material (1C). The resulting acid cleaned carbon material (1C) was designated as a nitrogen-containing carbon alloy of Example 1. The specific surface area thereof was measured by the BET method. The result is shown in Table 1 below in the column of after acid cleaning.

Production of Carbon Alloy-Coated Electrode, Measurement of Oxygen Reduction Reaction (ORR) Activity, and Number of Reaction Electrons in Oxygen Reduction Reaction A carbon alloy-coated electrode was produced in the same manner as in Comparative Example 1 except that the nitrogen-containing carbon alloy material obtained in Example 1 was used, and the ORR activity values (electric current density and rising potential) and the number of reaction electrons in oxygen reduction reaction were measured. The results obtained are shown in Table 1 below.

Example 2

Synthesis of Carbon Material of Mixture of Iron (II) Acetylacetonate and Iron(II) Chloride Tetrahydrate-Added TCB (2C)

Preparation of Mixture of Iron(II) Acetylacetonate and Iron (II) Chloride Tetrahydrate-Added TCB 0.74 g of iron(II) chloride tetrahydrate (99.9%, produced by Wako Pure Chemical Industries, Ltd.) and 0.034 g of iron(II) acetylacetonate (99.95%, FeAA2, produced by Sigma-Aldrich Corporation) were added to 4.00 g of TCB having the following structure (produced by Tokyo Chemical Industry Co., LTD.) and mixed with X-TREME MX1200XTM (produced by Waring Products, Inc.) at 10,000 rpm for 50 seconds to provide a mixture of iron(II) acetylacetonate and iron (II) chloride tetrahydrate-added TCB (2A).

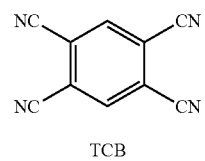

TCB

Molecular formula: $C_{10}H_2N_4$

Molecular weight: 178.15

Elemental analysis (calculated value): C: 67.42, H: 1.13, N: 31.45

Infusiblization and Carbonization Treatment 1.0311 g of the mixture of iron(II) acetylacetonate and iron(II) chloride tetrahydrate-added TCB(2A) was weighed in a quartz boat, which was placed at the center of a quartz tube having a diameter of 4.0 cm (inner diameter: 3.6 cm) inserted in a tubular furnace, and nitrogen was made to flow therein at 300 mL per minute at room temperature for 30 minutes.

The temperature was raised from 30° C. to 700° C. at a rate of 5° C. per minute and maintained at 700° C. for 1 hour. Thereafter, it was cooled to room temperature over 3 hours, thereby providing 0.1731 g of a carbon material (2B).

Pulverization and Acid Cleaning Treatment and Measurement of Specific Surface Area The carbon material (2B) was pulverized with an agate mortar to provide a non-acid cleaned carbon material. The resulting non-acid cleaned carbon material was measured for the specific surface area by the BET method. The result is shown in Table 1 below in the column of before acid cleaning.

The non-acid cleaned carbon material thus obtained by pulverizing the carbon material (2B) with an agate mortar was repeatedly subjected to concentrated hydrochloric acid cleaning, centrifugal filtration and removal of the supernatant liquid until coloration was not observed. After rinsing with water, the material was filtered and dried in air. The resulting carbon material was dried under vacuum at 110° C. for 3 hours, allowed to stand until room temperature, and allowed to stand overnight, thereby providing an acid cleaned carbon material (2C). The resulting acid cleaned carbon material (2C) was designated as a nitrogen-containing carbon alloy of Example 2. The specific surface area thereof was measured by the BET method. The result is shown in Table 1 below in the column of after acid cleaning.

Production of Carbon Alloy-Coated Electrode, Measurement of Oxygen Reduction Reaction (ORR) Activity, and Number of Reaction Electrons in Oxygen Reduction Reaction A carbon alloy-coated electrode was produced in the same manner as in Comparative Example 1 except that the nitrogen-containing carbon alloy material obtained in Example 2 was used, and the ORR activity values (electric current density and rising potential) and the number of reaction electrons in oxygen reduction reaction were measured. The results obtained are shown in Table 1 below.

Example 3

Synthesis of Carbon Material of Mixture of Iron (II) Acetylacetonate and Iron(II) Chloride Tetrahydrate-Added TCB (3C)

Preparation of Mixture of Iron(II) Acetylacetonate and Iron (II) Chloride Tetrahydrate-Added TCB 1.99 g of iron(II) chloride tetrahydrate (99.9%, produced by Wako Pure Chemical Industries, Ltd.) and 0.179 g of iron(II) acetylacetonate (99.95%, FeAA2, produced by Sigma-Aldrich Corporation) were added to 4.00 g of TCB (produced by Tokyo Chemical Industry Co., LTD.) and mixed with X-TREME MX1200XTM (produced by Waring Products, Inc.) at 10,000 rpm for 50 seconds to provide a mixture of iron(II) acetylacetonate and iron(II) chloride tetrahydrate-added TCB (3A).

Infusiblization and Carbonization Treatment 3.1770 g of the mixture of iron(II) acetylacetonate and iron(II) chloride tetrahydrate-added TCB(3A) was weighed in a quartz boat, which was placed at the center of a quartz tube having a diameter of 4.0 cm (inner diameter: 3.6 cm) inserted in a tubular furnace, and nitrogen was made to flow therein at 300 mL per minute at room temperature for 30 minutes.

The temperature was raised from 30° C. to 700° C. at a rate of 5° C. per minute and maintained at 700° C. for 1 hour. Thereafter, it was cooled to room temperature over 3 hours, thereby providing 1.2056 g of a carbon material (3B).

Pulverization and Acid Cleaning Treatment and Measurement of Specific Surface Area The carbon material (3B) was pulverized with an agate mortar to provide a non-acid cleaned carbon material. The resulting non-acid cleaned carbon material was measured for the specific surface area by the BET method. The result is shown in Table 1 below in the column of before acid cleaning.

The non-acid cleaned carbon material thus obtained by pulverizing the carbon material (3B) with an agate mortar was repeatedly subjected to concentrated hydrochloric acid cleaning, centrifugal filtration and removal of the supernatant liquid until coloration was not observed. After rinsing with water, the material was filtered and dried in air. The resulting carbon material was dried under vacuum at 110° C. for 3 hours, allowed to stand until room temperature, and allowed to stand overnight, thereby providing an acid cleaned carbon material (3C). The resulting acid cleaned carbon material (3C) was designated as a nitrogen-containing carbon alloy of Example 3. The specific surface area thereof was measured by the BET method. The result is shown in Table 1 below in the column of after acid cleaning.

Production of Carbon Alloy-Coated Electrode, Measurement of Oxygen Reduction Reaction (ORR) Activity, and Number of Reaction Electrons in Oxygen Reduction Reaction A carbon alloy-coated electrode was produced in the same manner as in Comparative Example 1 except that the nitrogen-containing carbon alloy material obtained in Example 3 was used, and the ORR activity values (electric current density and rising potential) and the number of reaction electrons in oxygen reduction reaction were measured. The results obtained are shown in Table 1 below.

Example 4

Synthesis of Carbon Material of Mixture of FeAA2 and Iron (II) Chloride Tetrahydrate-added PyDA (4C)

Preparation of Mixture of FeAA2 and Iron (II) Chloride Tetrahydrate-Added PyDA 2.80 g of iron (II) chloride tetrahydrate (99.9%, produced by Wako Pure Chemical Industries, Ltd.) and 0.26 g of iron (II) acetylacetonate (99.95%, FeAA2, produced by Sigma-Aldrich Corporation) were added to 4.00 g of 3,4-pyridyl-diamino (PyDA produced by Tokyo Chemical Industry Co., LTD. Compound (B-15)) and mixed with an agate mortar to provide a mixture of FeAA2 and iron (II) chloride tetrahydrate-added PyDA (4A).

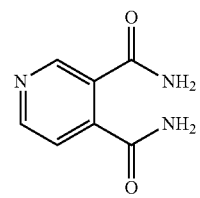

PyDA

Molecular formula: $C_7H_7N_3O_2$
Molecular weight: 165.15
Elemental analysis (calculated value): C: 50.91, H: 4.27, N: 25.44, O: 19.38

Infusiblization and Carbonization Treatment 3.1820 g of the mixture of FeAA2 and iron(II) chloride tetrahydrate-added DCPyDA(4A) was weighed in a quartz boat, which was placed at the center of a quartz tube having a diameter of 4.0 cm (inner diameter: 3.6 cm) inserted in a tubular furnace, and nitrogen was made to flow therein at 300 mL per minute at room temperature for 30 minutes.

The temperature was raised from 30° C. to 700° C. at a rate of 5° C. per minute and maintained at 700° C. for 1 hour. Thereafter, it was cooled to room temperature over 3 hours, thereby providing 0.5936 g of a carbon material (4B).

Pulverization and Acid Cleaning Treatment and Measurement of Specific Surface Area The carbon material (4B) was pulverized with an agate mortar to provide a non-acid cleaned carbon material. The resulting non-acid cleaned carbon material was measured for the specific surface area by the BET method. The result is shown in Table 1 below in the column of before acid cleaning.

The non-acid cleaned carbon material thus obtained by pulverizing the carbon material (4B) with an agate mortar was repeatedly subjected to concentrated hydrochloric acid cleaning, centrifugal filtration and removal of the supernatant liquid until coloration was not observed. After rinsing with water, the material was filtered and dried in air. The resulting carbon material was dried under vacuum at 110° C. for 3 hours, allowed to stand until room temperature, and allowed to stand overnight, thereby providing an acid cleaned carbon material (4C). The resulting acid cleaned carbon material (4C) was designated as a nitrogen-containing carbon alloy of Example 4. The specific surface area thereof was measured by the BET method. The result is shown in Table 1 below in the column of after acid cleaning.
Production of Carbon Alloy-Coated Electrode, Measurement of Oxygen Reduction Reaction (ORR) Activity, and Number of Reaction Electrons in Oxygen Reduction Reaction A carbon alloy-coated electrode was produced in the same manner as in Comparative Example 1 except that the nitrogen-containing carbon alloy material obtained in Example 4 was used, and the ORR activity values (electric current density and rising potential) and the number of reaction electrons in oxygen reduction reaction were measured. The results obtained are shown in Table 1 below.

Example 5

Synthesis of Carbon Material of Mixture of FeAA2 and Iron(II) Chloride tetrahydrate-Added DCPy (5C)

Preparation of Mixture of FeAA2 and Iron(II) Chloride Tetrahydrate-Added DCPy 2.00 g of iron(II) chloride tetrahydrate (99.9%), 4.00 g of 3,4-dicyanopyridine (DCPy, produced by Sigma-Aldrich Corporation) and 0.179 g of iron(II) acetylacetonate (99.95%, FeAA2, produced by Sigma-Aldrich Corporation) were added and mechanically pulverized and mixed to provide a mixture of FeAA2 and iron(II) chloride tetrahydrate-added DCPy (5A).
Infusiblization and Carbonization Treatment 3.0986 g of the mixture of FeAA2 and iron(II) chloride tetrahydrate-added DCPy(5A) was weighed in a quartz boat, which was placed at the center of a quartz tube having a diameter of 4.0 cm (inner diameter: 3.6 cm) inserted in a tubular furnace, and nitrogen was made to flow therein at 300 mL per minute at room temperature for 30 minutes.

The temperature was raised from 30° C. to 700° C. at a rate of 5° C. per minute and maintained at 700° C. for 1 hour. Thereafter, it was cooled to room temperature over 3 hours, thereby providing 0.7323 g of a carbon material (5B).
Pulverization and Acid Cleaning Treatment The carbon material (5B) was pulverized with an agate mortar and repeatedly subjected to concentrated hydrochloric acid cleaning, centrifugal filtration and removal of the supernatant liquid until coloration was not observed. After rinsing with water, the material was filtered and dried in air. The resulting carbon material was dried under vacuum at 110° C. for 3 hours, allowed to stand until room temperature, and allowed to stand overnight, thereby providing an acid cleaned carbon material (5C). The resulting acid cleaned carbon material (5C) was designated as a nitrogen-containing carbon alloy of Example 5.
Production of Carbon Alloy-Coated Electrode, Measurement of Oxygen Reduction Reaction (ORR) Activity, and Number of Reaction Electrons in Oxygen Reduction Reaction A carbon alloy-coated electrode was produced in the same manner as in Comparative Example 1 except that the nitrogen-containing carbon alloy material obtained in Example 5 was used, and the ORR activity values (electric current density and rising potential) and the number of reaction electrons in oxygen reduction reaction were measured. The results obtained are shown in Table 1 below.

Example 6

Synthesis of Carbon Material of Mixture of FeAA2 and Iron(II) Chloride tetrahydrate-Added DCPy (6C)

Preparation of Mixture of FeAA2 and Iron(II) Chloride Tetrahydrate-Added DCPy 2.40 g of iron(II) chloride tetrahydrate (99.9%), 4.00 g of 3,4-dicyanopyridine (DCPy, produced by Sigma-Aldrich Corporation) and 0.179 g of iron(II) acetylacetonate (99.95%, FeAA2, produced by Sigma-Aldrich Corporation) were added and mechanically pulverized and mixed to provide a mixture of FeAA2 and iron(II) chloride tetrahydrate-added DCPy (6A).
Infusiblization and Carbonization Treatment 3.0689 g of the mixture of FeAA2 and iron(II) chloride tetrahydrate-added DCPy(6A) was weighed in a quartz boat, which was placed at the center of a quartz tube having a diameter of 4.0 cm (inner diameter: 3.6 cm) inserted in a tubular furnace, and nitrogen was made to flow therein at 300 mL per minute at room temperature for 30 minutes.

The temperature was raised from 30° C. to 700° C. at a rate of 5° C. per minute and maintained at 700° C. for 1 hour. Thereafter, it was cooled to room temperature over 3 hours, thereby providing 0.5789 g of a carbon material (6B).
Pulverization and Acid Cleaning Treatment The carbon material (6B) was pulverized with an agate mortar and repeatedly subjected to concentrated hydrochloric acid cleaning, centrifugal filtration and removal of the supernatant liquid until coloration was not observed. After rinsing with water, the material was filtered and dried in air. The resulting carbon material was dried under vacuum at 110° C. for 3 hours, allowed to stand until room temperature, and allowed to stand overnight, thereby providing an acid cleaned carbon material (6C). The resulting acid cleaned carbon material (6C) was designated as a nitrogen-containing carbon alloy of Example 6.
Production of Carbon Alloy-Coated Electrode, Measurement of Oxygen Reduction Reaction (ORR) Activity, and Number of Reaction Electrons in Oxygen Reduction Reaction A carbon alloy-coated electrode was produced in the same manner as in Comparative Example 1 except that the nitrogen-containing carbon alloy material obtained in Example 6 was used, and the ORR activity values (electric current density and rising potential) and the number of reaction electrons in oxygen reduction reaction were measured. The results obtained are shown in Table 1 below.

Example 7

Synthesis of Carbon Material of Mixture of FeAA2 and Iron(II) Chloride Tetrahydrate-Added DCPy (7C)

Preparation of Mixture of FeAA2 and Iron(II) Chloride Tetrahydrate-Added DCPy 2.80 g of iron(II) chloride tetrahydrate (99.9%), 4.00 g of 3,4-dicyanopyridine (DCPy, produced by Sigma-Aldrich Corporation) and 0.179 g of iron(II) acetylacetonate (99.95%, FeAA2, produced by Sigma-Aldrich Corporation) were added and mechanically pulverized and mixed to provide a mixture of FeAA2 and iron(II) chloride tetrahydrate-added DCPy (7A).

Infusiblization and Carbonization Treatment 3.1581 g of the mixture of FeAA2 and iron(II) chloride tetrahydrate-added DCPy(7A) was weighed in a quartz boat, which was placed at the center of a quartz tube having a diameter of 4.0 cm (inner diameter: 3.6 cm) inserted in a tubular furnace, and nitrogen was made to flow therein at 300 mL per minute at room temperature for 30 minutes.

The temperature was raised from 30° C. to 700° C. at a rate of 5° C. per minute and maintained at 700° C. for 1 hour. Thereafter, it was cooled to room temperature over 3 hours, thereby providing 0.9312 g of a carbon material (7B).

Pulverization and Acid Cleaning Treatment

The carbon material (7B) was pulverized with an agate mortar and repeatedly subjected to concentrated hydrochloric acid cleaning, centrifugal filtration and removal of the supernatant liquid until coloration was not observed. After rinsing with water, the material was filtered and dried in air. The resulting carbon material was dried under vacuum at 110° C. for 3 hours, allowed to stand until room temperature, and allowed to stand overnight, thereby providing an acid cleaned carbon material (7C). The resulting acid cleaned carbon material (7C) was designated as a nitrogen-containing carbon alloy of Example 7.

Production of Carbon Alloy-Coated Electrode, Measurement of Oxygen Reduction Reaction (ORR) Activity, and Number of Reaction Electrons in Oxygen Reduction Reaction A carbon alloy-coated electrode was produced in the same manner as in Comparative Example 1 except that the nitrogen-containing carbon alloy material obtained in Example 7 was used, and the ORR activity values (electric current density and rising potential) and the number of reaction electrons in oxygen reduction reaction were measured. The results obtained are shown in Table 1 below.

Example 8

Synthesis of Carbon Material of Mixture of FeAA2 and Iron(II) Chloride tetrahydrate-Added DCPy (8C)

Preparation of Mixture of FeAA2 and Iron(II) Chloride Tetrahydrate-Added DCPy 3.20 g of iron(II) chloride tetrahydrate (99.9%), 4.00 g of 3,4-dicyanopyridine (DCPy, produced by Sigma-Aldrich Corporation) and 0.179 g of iron(II) acetylacetonate (99.95%, FeAA2, produced by Sigma-Aldrich Corporation) were added and mechanically pulverized and mixed to provide a mixture of FeAA2 and iron(II) chloride tetrahydrate-added DCPy (8A).

Infusiblization and Carbonization Treatment 3.0806 g of the mixture of FeAA2 and iron(II) chloride tetrahydrate-added DCPy(8A) was weighed in a quartz boat, which was placed at the center of a quartz tube having a diameter of 4.0 cm (inner diameter: 3.6 cm) inserted in a tubular furnace, and nitrogen was made to flow therein at 300 mL per minute at room temperature for 30 minutes.

The temperature was raised from 30° C. to 700° C. at a rate of 5° C. per minute and maintained at 700° C. for 1 hour. Thereafter, it was cooled to room temperature over 3 hours, thereby providing 0.8857 g of a carbon material (8B).

Pulverization and Acid Cleaning Treatment

The carbon material (8B) was pulverized with an agate mortar and repeatedly subjected to concentrated hydrochloric acid cleaning, centrifugal filtration and removal of the supernatant liquid until coloration was not observed. After rinsing with water, the material was filtered and dried in air. The resulting carbon material was dried under vacuum at 110° C. for 3 hours, allowed to stand until room temperature, and allowed to stand overnight, thereby providing an acid cleaned carbon material (8C). The resulting acid cleaned carbon material (8C) was designated as a nitrogen-containing carbon alloy of Example 8.

Production of Carbon Alloy-Coated Electrode, Measurement of Oxygen Reduction Reaction (ORR) Activity, and Number of Reaction Electrons in Oxygen Reduction Reaction A carbon alloy-coated electrode was produced in the same manner as in Comparative Example 1 except that the nitrogen-containing carbon alloy material obtained in Example 8 was used, and the ORR activity values (electric current density and rising potential) and the number of reaction electrons in oxygen reduction reaction were measured. The results obtained are shown in Table 1 below.

Example 9

Synthesis of Carbon Material of Mixture of FeAA2 and Iron(II) Chloride Tetrahydrate-Added DCPy (9C)

Preparation of Mixture of FeAA2 and Iron(II) Chloride Tetrahydrate-Added DCPy 3.60 g of iron(II) chloride tetrahydrate (99.9%), 4.00 g of 3,4-dicyanopyridine (DCPy, produced by Sigma-Aldrich Corporation) and 0.179 g of iron(II) acetylacetonate (99.95%, FeAA2, produced by Sigma-Aldrich Corporation) were added and mechanically pulverized and mixed to provide a mixture of FeAA2 and iron(II) chloride tetrahydrate-added DCPy (9A).

Infusiblization and Carbonization Treatment 3.0843 g of the mixture of FeAA2 and iron(II) chloride tetrahydrate-added DCPy(9A) was weighed in a quartz boat, which was placed at the center of a quartz tube having a diameter of 4.0 cm (inner diameter: 3.6 cm) inserted in a tubular furnace, and nitrogen was made to flow therein at 300 mL per minute at room temperature for 30 minutes.

The temperature was raised from 30° C. to 700° C. at a rate of 5° C. per minute and maintained at 700° C. for 1 hour. Thereafter, it was cooled to room temperature over 3 hours, thereby providing 0.9681 g of a carbon material (9B).

Pulverization and Acid Cleaning Treatment

The carbon material (9B) was pulverized with an agate mortar and repeatedly subjected to concentrated hydrochloric acid cleaning, centrifugal filtration and removal of the supernatant liquid until coloration was not observed. After rinsing with water, the material was filtered and dried in air. The resulting carbon material was dried under vacuum at 110° C. for 3 hours, allowed to stand until room temperature, and allowed to stand overnight, thereby providing an acid cleaned carbon material (9C). The resulting acid cleaned carbon material (9C) was designated as a nitrogen-containing carbon alloy of Example 9.

Production of Carbon Alloy-Coated Electrode, Measurement of Oxygen Reduction Reaction (ORR) Activity, and Number of Reaction Electrons in Oxygen Reduction Reaction A carbon alloy-coated electrode was produced in the same manner as in Comparative Example 1 except that the nitrogen-containing carbon alloy material obtained in Example 9 was used, and the ORR activity values (electric current density and rising potential) and the number of reaction electrons in oxygen reduction reaction were measured. The results obtained are shown in Table 1 below.

Example 10

Synthesis of Carbon Material of Mixture of FeAA2 and Iron(II) Chloride Tetrahydrate-Added DCPy (10C)

Preparation of Mixture of FeAA2 and Iron(II) Chloride Tetrahydrate-Added DCPy 6.30 g of iron(II) chloride tetrahydrate (99.9%), 6.30 g of 3,4-dicyanopyridine (DCPy, produced by Sigma-Aldrich Corporation) and 0.4024 g of iron(II) acetylacetonate (99.95%, FeAA2, produced by Sigma-Aldrich Corporation) were added and mechanically pulverized and mixed to provide a mixture of FeAA2 and iron(II) chloride tetrahydrate-added DCPy (10A).

Infusiblization and Carbonization Treatment 3.0228 g of the mixture of FeAA2 and iron(II) chloride tetrahydrate-added DCPy(10A) was weighed in a quartz boat, which was placed at the center of a quartz tube having a diameter of 4.0 cm (inner diameter: 3.6 cm) inserted in a tubular furnace, and nitrogen was made to flow therein at 300 mL per minute at room temperature for 30 minutes.

The temperature was raised from 30° C. to 700° C. at a rate of 5° C. per minute and maintained at 700° C. for 1 hour. Thereafter, it was cooled to room temperature over 3 hours, thereby providing 0.8442 g of a carbon material (10B).

Pulverization and Acid Cleaning Treatment

The carbon material (10B) was pulverized with an agate mortar and repeatedly subjected to concentrated hydrochloric acid cleaning, centrifugal filtration and removal of the supernatant liquid until coloration was not observed. After rinsing with water, the material was filtered and dried in air. The resulting carbon material was dried under vacuum at 110° C. for 3 hours, allowed to stand until room temperature, and allowed to stand overnight, thereby providing an acid cleaned carbon material (10C). The resulting acid cleaned carbon material (10C) was designated as a nitrogen-containing carbon alloy of Example 10.

Production of Carbon Alloy-Coated Electrode, Measurement of Oxygen Reduction Reaction (ORR) Activity, and Number of Reaction Electrons in Oxygen Reduction Reaction A carbon alloy-coated electrode was produced in the same manner as in Comparative Example 1 except that the nitrogen-containing carbon alloy material obtained in Example 10 was used, and the ORR activity values (electric current density and rising potential) and the number of reaction electrons in oxygen reduction reaction were measured. The results obtained are shown in Table 1 below.

Example 11

Synthesis of Carbon Material of Mixture of FeAA2 and Iron(II) Chloride Tetrahydrate-Added DCPy (11C)

Preparation of Mixture of FeAA2 and Iron(II) Chloride Tetrahydrate-Added DCPy 4.40 g of iron(II) chloride tetrahydrate (99.9%), 4.00 g of 3,4-dicyanopyridine (DCPy, produced by Sigma-Aldrich Corporation) and 0.179 g of iron(II) acetylacetonate (99.95%, FeAA2, produced by Sigma-Aldrich Corporation) were added and mechanically pulverized and mixed to provide a mixture of FeAA2 and iron(II) chloride tetrahydrate-added DCPy (11A).

Infusiblization and Carbonization Treatment 3.0474 g of the mixture of FeAA2 and iron(II) chloride tetrahydrate-added DCPy(11A) was weighed in a quartz boat, which was placed at the center of a quartz tube having a diameter of 4.0 cm (inner diameter: 3.6 cm) inserted in a tubular furnace, and nitrogen was made to flow therein at 300 mL per minute at room temperature for 30 minutes.

The temperature was raised from 30° C. to 700° C. at a rate of 5° C. per minute and maintained at 700° C. for 1 hour. Thereafter, it was cooled to room temperature over 3 hours, thereby providing 0.9342 g of a carbon material (11B).

Pulverization and Acid Cleaning Treatment

The carbon material (11B) was pulverized with an agate mortar and repeatedly subjected to concentrated hydrochloric acid cleaning, centrifugal filtration and removal of the supernatant liquid until coloration was not observed. After rinsing with water, the material was filtered and dried in air. The resulting carbon material was dried under vacuum at 110° C. for 3 hours, allowed to stand until room temperature, and allowed to stand overnight, thereby providing an acid cleaned carbon material (11C). The resulting acid cleaned carbon material (11C) was designated as a nitrogen-containing carbon alloy of Example 11.

Production of Carbon Alloy-Coated Electrode, Measurement of Oxygen Reduction Reaction (ORR) Activity, and Number of Reaction Electrons in Oxygen Reduction Reaction A carbon alloy-coated electrode was produced in the same manner as in Comparative Example 1 except that the nitrogen-containing carbon alloy material obtained in Example 11 was used, and the ORR activity values (electric current density and rising potential) and the number of reaction electrons in oxygen reduction reaction were measured. The results obtained are shown in Table 1 below.

Example 12

Synthesis of Carbon Material of Mixture of FeAA3 and Iron(II) Chloride Tetrahydrate-Added DCPy (12C)

Preparation of Mixture of FeAA3 and Iron(II) Chloride Tetrahydrate-Added DCPy 4.00 g of iron(II) chloride tetrahydrate (99.9%), 4.00 g of 3,4-dicyanopyridine (DCPy, produced by Sigma-Aldrich Corporation) and 0.355 g of iron(III) acetylacetonate (99.95%, FeAA3, produced by Sigma-Aldrich Corporation) were added and mechanically pulverized and mixed to provide a mixture of FeAA3 and iron(II) chloride tetrahydrate-added DCPy (12A).

Infusiblization and Carbonization Treatment 3.1380 g of the mixture of FeAA3 and iron(II) chloride tetrahydrate-added DCPy(12A) was weighed in a quartz boat, which was placed at the center of a quartz tube having a diameter of 4.0 cm (inner diameter: 3.6 cm) inserted in a tubular furnace, and nitrogen was made to flow therein at 300 mL per minute at room temperature for 30 minutes.

The temperature was raised from 30° C. to 700° C. at a rate of 5° C. per minute and maintained at 700° C. for 1 hour. Thereafter, it was cooled to room temperature over 3 hours, thereby providing 0.8470 g of a carbon material (12B).

Pulverization and Acid Cleaning Treatment

The carbon material (12B) was pulverized with an agate mortar and repeatedly subjected to concentrated hydrochloric acid cleaning, centrifugal filtration and removal of the supernatant liquid until coloration was not observed. After rinsing with water, the material was filtered and dried in air. The resulting carbon material was dried under vacuum at 110° C. for 3 hours, allowed to stand until room temperature, and allowed to stand overnight, thereby providing an acid cleaned carbon material (12C). The resulting acid cleaned carbon material (12C) was designated as a nitrogen-containing carbon alloy of Example 12.

Production of Carbon Alloy-Coated Electrode, Measurement of Oxygen Reduction Reaction (ORR) Activity, and Number of Reaction Electrons in Oxygen Reduction Reaction A carbon alloy-coated electrode was produced in the same manner as in Comparative Example 1 except that the nitrogen-containing carbon alloy material obtained in Example 12 was used, and the ORR activity values (electric current density and rising potential) and the number of reaction electrons in oxygen reduction reaction were measured. The results obtained are shown in Table 1 below.

Example 13

Synthesis of Carbon Material of Mixture of FeAA2 and Iron(II) Chloride Tetrahydrate-Added DCPy (13C)

Preparation of Mixture of FeAA2 and Iron(II) Chloride Tetrahydrate-Added DCPy 4.00 g of iron(II) chloride tetrahydrate (99.9%), 64.40 g of 3,4-dicyanopyridine (DCPy, produced by Sigma-Aldrich Corporation) and 0.4024 g of iron(II) acetylacetonate (99.95%, FeAA2, produced by Sigma-Aldrich Corporation) were added and mechanically pulverized and mixed to provide a mixture of FeAA2 and iron(II) chloride tetrahydrate-added DCPy (13A).

Infusiblization and Carbonization Treatment 3.0375 g of the mixture of FeAA2 and iron(II) chloride tetrahydrate-added DCPy(13A) was weighed in a quartz boat, which was placed at the center of a quartz tube having a diameter of 4.0 cm (inner diameter: 3.6 cm) inserted in a tubular furnace, and nitrogen was made to flow therein at 300 mL per minute at room temperature for 30 minutes.

The temperature was raised from 30° C. to 700° C. at a rate of 5° C. per minute and maintained at 700° C. for 1 hour. Thereafter, it was cooled to room temperature over 3 hours, thereby providing 0.5624 g of a carbon material (13B).

Pulverization and Acid Cleaning Treatment

The carbon material (13B) was pulverized with an agate mortar and repeatedly subjected to concentrated hydrochloric acid cleaning, centrifugal filtration and removal of the supernatant liquid until coloration was not observed. After rinsing with water, the material was filtered and dried in air. The resulting carbon material was dried under vacuum at 110° C. for 3 hours, allowed to stand until room temperature, and allowed to stand overnight, thereby providing an acid cleaned carbon material (13C). The resulting acid cleaned carbon material (13C) was designated as a nitrogen-containing carbon alloy of Example 13.

Production of Carbon Alloy-Coated Electrode, Measurement of Oxygen Reduction Reaction (ORR) Activity, and Number of Reaction Electrons in Oxygen Reduction Reaction A carbon alloy-coated electrode was produced in the same manner as in Comparative Example 1 except that the nitrogen-containing carbon alloy material obtained in Example 13 was used, and the ORR activity values (electric current density and rising potential) and the number of reaction electrons in oxygen reduction reaction were measured. The results obtained are shown in Table 1 below.

Example 14

Synthesis of Carbon Material of Mixture of Fe(DPM)$_2$ and Iron(II) Chloride Tetrahydrate-Added DCPy (14C)

Preparation of Fe(DPM)$_2$

Fe(DPM)$_2$ was prepared according to the following procedures by modifying the method described in Inorg. Chem., 1965, 4, pp. 920-921.

In a nitrogen atmosphere, 9.0 g of FeSO$_4$.7H$_2$O, 1.4 g of Na$_2$S$_2$O$_4$ and 135 mL of nitrogen-deaerated water were placed in a 500-mL three-neck flask, to which 14.9 g of DPM dissolved in 270 mL of methanol was added after nitrogen-deaeration, and the mixture was stirred at room temperature for 1 hour. 97 mL of a 1 N NaOH aqueous solution was added to the solution. The resulting crystals were filtered, rinsed with water and hexane, and dried to provide 11.7 g of Fe(DPM)$_2$ at a yield of 85%.

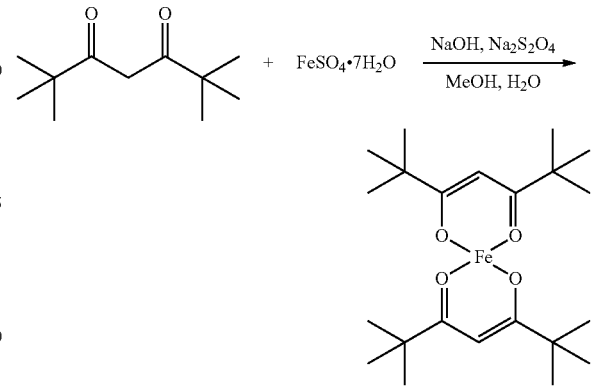

Preparation of Mixture of Fe(DPM)$_2$ and Iron(II) Chloride Tetrahydrate-Added DCPy 0.425 g of Fe(DPM)$_2$ described above, 2.80 g of iron(II) chloride tetrahydrate (99.9%) and 4.00 g of 3,4-dicyanopyridine (DCPy, produced by Sigma-Aldrich Corporation) were added and mechanically pulverized and mixed to provide a mixture of Fe(DPM)$_2$ and iron(II) chloride tetrahydrate-added DCPy (14A).

Infusiblization and Carbonization Treatment 0.9913 g of the mixture of Fe(DPM)$_2$ and iron(II) chloride tetrahydrate-added DCPy (14A) was weighed in a quartz boat, which was placed at the center of a quartz tube having a diameter of 4.0 cm (inner diameter: 3.6 cm) inserted in a tubular furnace, and nitrogen was made to flow therein at 300 mL per minute at room temperature for 30 minutes.

The temperature was raised from 30° C. to 700° C. at a rate of 5° C. per minute and maintained at 700° C. for 1 hour. Thereafter, it was cooled to room temperature over 3 hours, thereby providing 0.1418 g of a carbon material (14B).

Pulverization and Acid Cleaning Treatment and Measurement of Specific Surface Area The carbon material (14B) was pulverized with an agate mortar and repeatedly subjected to concentrated hydrochloric acid cleaning, centrifugal filtration and removal of the supernatant liquid until coloration was not observed. After rinsing with water, the material was filtered and dried in air. The resulting carbon material was dried under vacuum at 110° C. for 3 hours, allowed to stand until room temperature, and allowed to stand overnight, thereby providing an acid cleaned carbon material (14C). The resulting acid cleaned carbon material (14C) was designated as a nitrogen-containing carbon alloy of Example 14.

Production of Carbon Alloy-Coated Electrode, Measurement of Oxygen Reduction Reaction (ORR) Activity, and Number of Reaction Electrons in Oxygen Reduction Reaction A carbon alloy-coated electrode was produced in the same manner as in Comparative Example 1 except that the nitrogen-containing carbon alloy material obtained in Example 14 was used, and the ORR activity values (electric current density and rising potential) and the number of reaction electrons in oxygen reduction reaction were measured. The results obtained are shown in Table 1 below.

Example 15

Synthesis of Carbon Material of Mixture of Fe(TMOD)$_2$ and Iron(II) Chloride Tetrahydrate-Added DCPy (15C)

Preparation of Fe(TMOD)$_2$

Fe (TMOD)$_2$ was prepared according to the following procedures by modifying the method described in Inorg. Chem., 1965, 4, pp. 920-921.

In a nitrogen atmosphere, 3.0 g of FeSO$_4$.7H$_2$O, 0.47 g of Na$_2$S$_2$O$_4$ and 45 mL of nitrogen-deaerated water were placed in a 500-mL three-neck flask, to which 5.4 g of TMOD dissolved in 90 mL of methanol was added after nitrogen-deaeration, and the mixture was stirred at room temperature for 1 hour. 32 mL of a 1 N NaOH aqueous solution was added to the solution. The resulting crystals were filtered, rinsed with water and hexane, and dried to provide 40 g of Fe(TMOD)$_2$ at a yield of 89%.

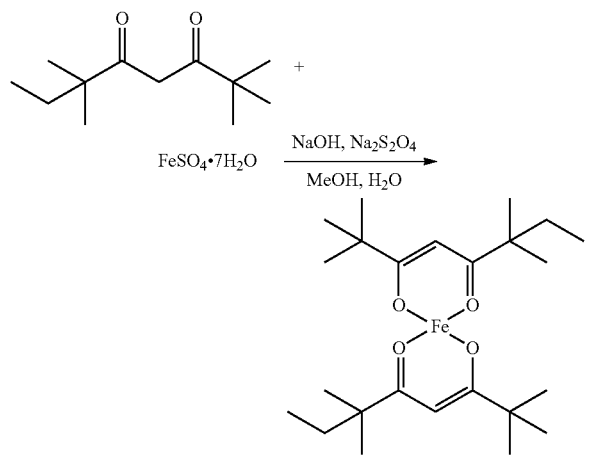

Preparation of Mixture of Fe(TMOD)$_2$ and Iron(II) Chloride Tetrahydrate-Added DCPy 0.4531 g of Fe(TMOD)$_2$ described above, 2.80 g of iron(II) chloride tetrahydrate (99.9%) and 4.00 g of 3,4-dicyanopyridine (DCPy, produced by Sigma-Aldrich Corporation) were added and mechanically pulverized and mixed to provide a mixture of Fe (TMOD)$_2$ and iron(II) chloride tetrahydrate-added DCPy (15A).

Infusiblization and Carbonization Treatment 1.0463 g of the mixture of Fe(TMOD)$_2$ and iron(II) chloride tetrahydrate-added DCPy (15A) was weighed in a quartz boat, which was placed at the center of a quartz tube having a diameter of 4.0 cm (inner diameter: 3.6 cm) inserted in a tubular furnace, and nitrogen was made to flow therein at 300 mL per minute at room temperature for 30 minutes.

The temperature was raised from 30° C. to 700° C. at a rate of 5° C. per minute and maintained at 700° C. for 1 hour. Thereafter, it was cooled to room temperature over 3 hours, thereby providing 0.0852 g of a carbon material (15B).

Pulverization and Acid Cleaning Treatment and Measurement of Specific Surface Area The carbon material (15B) was pulverized with an agate mortar and repeatedly subjected to concentrated hydrochloric acid cleaning, centrifugal filtration and removal of the supernatant liquid until coloration was not observed. After rinsing with water, the material was filtered and dried in air. The resulting carbon material was dried under vacuum at 110° C. for 3 hours, allowed to stand until room temperature, and allowed to stand overnight, thereby providing an acid cleaned carbon material (15C). The resulting acid cleaned carbon material (15C) was designated as a nitrogen-containing carbon alloy of Example 15.

Production of Carbon Alloy-Coated Electrode, Measurement of Oxygen Reduction Reaction (ORR) Activity, and Number of Reaction Electrons in Oxygen Reduction Reaction A carbon alloy-coated electrode was produced in the same manner as in Comparative Example 1 except that the nitrogen-containing carbon alloy material obtained in Example 15 was used, and the ORR activity values (electric current density and rising potential) and the number of reaction electrons in oxygen reduction reaction were measured. The results obtained are shown in Table 1 below.

Example 16

Synthesis of Carbon Material of Mixture of Fe(TMOD)$_3$ and Iron(II) Chloride Tetrahydrate-Added DCPy (16C)

Preparation of Mixture of Fe(TMOD)$_3$ and Iron(II) Chloride Tetrahydrate-Added DCPy 0.4024 g of Fe (TMOD)$_3$ (produced by Toshima Manufacturing CO., Ltd.), 2.80 g of iron(II) chloride tetrahydrate (99.9%) and 4.00 g of 3,4-dicyanopyridine (DCPy, produced by Sigma-Aldrich Corporation) were added and mechanically pulverized and mixed to provide a mixture of Fe(TMOD)$_3$ and iron(II) chloride tetrahydrate-added DCPy (16A).

Infusiblization and Carbonization Treatment 3.0632 g of the mixture of Fe(TMOD)$_3$ and iron(II) chloride tetrahydrate-added DCPy (16A) was weighed in a quartz boat, which was placed at the center of a quartz tube having a diameter of 4.0 cm (inner diameter: 3.6 cm) inserted in a tubular furnace, and nitrogen was made to flow therein at 300 mL per minute at room temperature for 30 minutes.

The temperature was raised from 30° C. to 700° C. at a rate of 5° C. per minute and maintained at 700° C. for 1 hour. Thereafter, it was cooled to room temperature over 3 hours, thereby providing 0.8058 g of a carbon material (16B).

Pulverization and Acid Cleaning Treatment and Measurement of Specific Surface Area The carbon material (16B) was pulverized with an agate mortar and repeatedly subjected to concentrated hydrochloric acid cleaning, centrifugal filtration and removal of the supernatant liquid until coloration was not observed. After rinsing with water, the material was filtered and dried in air. The resulting carbon material was dried under vacuum at 110° C. for 3 hours, allowed to stand until room temperature, and allowed to stand overnight, thereby providing an acid cleaned carbon material (16C). The resulting acid cleaned carbon material (16C) was designated as a nitrogen-containing carbon alloy of Example 16.

Production of Carbon Alloy-Coated Electrode, Measurement of Oxygen Reduction Reaction (ORR) Activity, and Number of Reaction Electrons in Oxygen Reduction Reaction A carbon alloy-coated electrode was produced in the same manner as in Comparative Example 1 except that the nitrogen-containing carbon alloy material obtained in Example 16 was used, and the ORR activity values (electric current density and rising potential) and the number of reaction electrons in oxygen reduction reaction were measured. The results obtained are shown in Table 1 below.

Example 17

Rebaking and Acid Treatment of Carbon Material of Mixture of FeAA2 and Iron(II) Chloride Tetrahydrate-Added DCPy (17C)

Infusiblization and Carbonization Treatment

The nitrogen-containing carbon alloy of Example 10 was rebaked in the following procedures to produce a nitrogen-containing carbon alloy of Example 17.

0.5178 g of the acid cleaned carbon material (10C) of Example 10 was weighed in a quartz boat, which was placed at the center of a quartz tube having a diameter of 4.0 cm (inner diameter: 3.6 cm) inserted in a tubular furnace, and nitrogen was made to flow therein at 300 mL per minute at room temperature for 30 minutes.

The temperature was raised from 30° C. to 900° C. at a rate of 5° C. per minute and maintained at 900° C. for 1 hour. Thereafter, it was cooled to room temperature over 3 hours, thereby providing 0.4750 g of a carbon material (17B).

Pulverization and Acid Cleaning Treatment and Measurement of Specific Surface Area The carbon material (17B) was pulverized with an agate mortar and repeatedly subjected to concentrated hydrochloric acid cleaning, centrifugal filtration and removal of the supernatant liquid until coloration was not observed. After rinsing with water, the material was filtered and dried in air. The resulting carbon material was dried under vacuum at 110° C. for 3 hours, allowed to stand until room temperature, and allowed to stand overnight, thereby providing an acid cleaned carbon material (17C). The resulting acid cleaned carbon material (17C) was designated as a nitrogen-containing carbon alloy of Example 17.

Production of Carbon Alloy-Coated Electrode, Measurement of Oxygen Reduction Reaction (ORR) Activity, and Number of Reaction Electrons in Oxygen Reduction Reaction A carbon alloy-coated electrode was produced in the same manner as in Comparative Example 1 except that the nitrogen-containing carbon alloy material obtained in Example 17 was used, and the ORR activity values (electric current density and rising potential) and the number of reaction electrons in oxygen reduction reaction were measured. The results obtained are shown in Table 1 below.

Example 18

Rebaking and Acid Treatment of Carbon Material of Mixture of FeAA2 and Iron (II) Chloride Tetrahydrate-Added DCPy (18C)

Infusiblization and Carbonization Treatment

The nitrogen-containing carbon alloy of Example 10 was rebaked in the following procedures to produce a nitrogen-containing carbon alloy of Example 18.

0.4036 g of the acid cleaned carbon material (10C) of Example 10 was weighed in a quartz boat, which was placed at the center of a quartz tube having a diameter of 4.0 cm (inner diameter: 3.6 cm) inserted in a tubular furnace, and nitrogen was made to flow therein at 300 mL per minute at room temperature for 30 minutes.

The temperature was raised from 30° C. to 1000° C. at a rate of 5° C. per minute and maintained at 1000° C. for 1 hour. Thereafter, it was cooled to room temperature over 3 hours, thereby providing 0.2927 g of a carbon material (18B).

Pulverization and Acid Cleaning Treatment and Measurement of Specific Surface Area The carbon material (18B) was pulverized with an agate mortar and repeatedly subjected to concentrated hydrochloric acid cleaning, centrifugal filtration and removal of the supernatant liquid until coloration was not observed. After rinsing with water, the material was filtered and dried in air. The resulting carbon material was dried under vacuum at 110° C. for 3 hours, allowed to stand until room temperature, and allowed to stand overnight, thereby providing an acid cleaned carbon material (18C). The resulting acid cleaned carbon material (18C) was designated as a nitrogen-containing carbon alloy of Example 18.

Production of Carbon Alloy-Coated Electrode, Measurement of Oxygen Reduction Reaction (ORR) Activity, and Number of Reaction Electrons in Oxygen Reduction Reaction A carbon alloy-coated electrode was produced in the same manner as in Comparative Example 1 except that the nitrogen-containing carbon alloy material obtained in Example 18 was used, and the ORR activity values (electric current density and rising potential) and the number of reaction electrons in oxygen reduction reaction were measured. The results obtained are shown in Table 1 below.

Example 19

Rebaking and Acid Treatment of Carbon Material of Mixture of FeAA2 and Iron (II) Chloride Tetrahydrate-Added DCPy (19C)

Pulverization Treatment

The nitrogen-containing carbon alloy of Example 7 was rebaked in the following procedures to produce a nitrogen-containing carbon alloy of Example 19.

The acid cleaned carbon material (7C) of Example 7 was mixed with X-TREME MX1200XTM (produced by Waring Products, Inc.) at 10,000 rpm for 50 seconds to provide a pulverized carbon material (7D).

Infusiblization and Carbonization Treatment 0.5086 g of the pulverized carbon material (7D) was weighed in a quartz boat, which was placed at the center of a quartz tube having a diameter of 4.0 cm (inner diameter:

3.6 cm) inserted in a tubular furnace, and nitrogen was made to flow therein at 300 mL per minute at room temperature for 30 minutes.

The temperature was raised from 30° C. to 1000° C. at a rate of 5° C. per minute and maintained at 1000° C. for 1 hour. Thereafter, it was cooled to room temperature over 3 hours, thereby providing 0.3802 g of a carbon material (19B).

Pulverization and Acid Cleaning Treatment

The carbon material (19B) was pulverized with an agate mortar and repeatedly subjected to concentrated hydrochloric acid cleaning, centrifugal filtration and removal of the supernatant liquid until coloration was not observed. After rinsing with water, the material was filtered and dried in air. The resulting carbon material was dried under vacuum at 110° C. for 3 hours, allowed to stand until room temperature, and allowed to stand overnight, thereby providing an acid cleaned carbon material (19C). The resulting acid cleaned carbon material (19C) was designated as a nitrogen-containing carbon alloy of Example 19.

Production of Carbon Alloy-Coated Electrode, Measurement of Oxygen Reduction Reaction (ORR) Activity, and Number of Reaction Electrons in Oxygen Reduction Reaction A carbon alloy-coated electrode was produced in the same manner as in Comparative Example 1 except that the nitrogen-containing carbon alloy material obtained in Example 19 was used, and the ORR activity values (electric current density and rising potential) and the number of reaction electrons in oxygen reduction reaction were measured. The results obtained are shown in Table 1 below.

Example 20

Rebaking and Acid Treatment of Carbon Material of Mixture of FeAA2 and Iron (II) Chloride Tetrahydrate-Added DCPy (20C)

Infusiblization and Carbonization Treatment

The nitrogen-containing carbon alloy of Example 7 was rebaked in the following procedures to produce a nitrogen-containing carbon alloy of Example 20.

0.5032 g of the pulverized carbon material (7D) of Example 7 was weighed in a quartz boat, which was placed at the center of a quartz tube having a diameter of 4.0 cm (inner diameter: 3.6 cm) inserted in a tubular furnace, and nitrogen was made to flow therein at 300 mL per minute at room temperature for 30 minutes.

While stopping the nitrogen flow during the temperature rising, the temperature was raised from 30° C. to 1,000° C. at a rate of 5° C. per minute and maintained at 1,000° C. for 1 hour. Thereafter, it was cooled to room temperature over 3 hours, thereby providing 0.3194 g of a carbon material (20B).

Pulverization and Acid Cleaning Treatment

The carbon material (20B) was pulverized with an agate mortar and repeatedly subjected to concentrated hydrochloric acid cleaning, centrifugal filtration and removal of the supernatant liquid until coloration was not observed. After rinsing with water, the material was filtered and dried in air. The resulting carbon material was dried under vacuum at 110° C. for 3 hours, allowed to stand until room temperature, and allowed to stand overnight, thereby providing an acid cleaned carbon material (20C). The resulting acid cleaned carbon material (20C) was designated as a nitrogen-containing carbon alloy of Example 20.

Production of Carbon Alloy-Coated Electrode, Measurement of Oxygen Reduction Reaction (ORR) Activity, and Number of Reaction Electrons in Oxygen Reduction Reaction A carbon alloy-coated electrode was produced in the same manner as in Comparative Example 1 except that the nitrogen-containing carbon alloy material obtained in Example 20 was used, and the ORR activity values (electric current density and rising potential) and the number of reaction electrons in oxygen reduction reaction were measured. The results obtained are shown in Table 1 below.

Example 21

Synthesis of Carbon Material of Mixture of FeAA2, Iron (II) Chloride Tetrahydrate, and 15% of Conductive Assistant-Added DCPy (21C)

Preparation of Mixture of FeAA2, Iron(II) Chloride Tetrahydrate, and 15% of Conductive Assistant-Added DCPy 1.20 g of a conductive assistant (Ketjen Black EC600JD) was added to 8.00 g of the iron(II) chloride tetrahydrate-added DCPy mixture of Example 7 and mixed with X-TREME MX1200XTM (produced by Waring Products, Inc.) at 10,000 rpm for 50 seconds to provide a mixture of iron(II) chloride tetrahydrate and 15% of conductive assistant-added DCPy (21A).

Infusiblization and Carbonization Treatment 1.0568 g of the mixture of iron(II) chloride tetrahydrate and 15% of conductive assistant-added DCPy (21A) was weighed in a quartz boat, which was placed at the center of a quartz tube having a diameter of 4.0 cm (inner diameter: 3.6 cm) inserted in a tubular furnace, and nitrogen was made to flow therein at 300 mL per minute at room temperature for 30 minutes.

The temperature was raised from 30° C. to 700° C. at a rate of 5° C. per minute and maintained at 700° C. for 1 hour. Thereafter, it was cooled to room temperature over 3 hours, thereby providing 0.7858 g of a carbon material (21B).

Pulverization and Acid Cleaning Treatment and Measurement of Specific Surface Area The carbon material (21B) was pulverized with an agate mortar to provide a non-acid cleaned carbon material. The resulting non-acid cleaned carbon material was measured for the specific surface area by the BET method. The result is shown in Table 1 below in the column of before acid cleaning.

The non-acid cleaned carbon material thus obtained by pulverizing the carbon material (21B) with an agate mortar was repeatedly subjected to concentrated hydrochloric acid cleaning, centrifugal filtration and removal of the supernatant liquid until coloration was not observed. After rinsing with water, the material was filtered and dried in air. The resulting carbon material was dried under vacuum at 110° C. for 3 hours, allowed to stand until room temperature, and allowed to stand overnight, thereby providing an acid cleaned carbon material (21C). The resulting acid cleaned carbon material (21C) was designated as a nitrogen-containing carbon alloy of Example 21. The specific surface area thereof was measured by the BET method. The result is shown in Table 1 below in the column of after acid cleaning.

Production of Carbon Alloy-Coated Electrode, Measurement of Oxygen Reduction Reaction (ORR) Activity, and Number of Reaction Electrons in Oxygen Reduction Reaction A carbon alloy-coated electrode was produced in the same manner as in Comparative Example 1 except that the nitrogen-containing carbon alloy material obtained in Example 21 was used, and the ORR activity values (electric current density and rising potential) and the number of reaction electrons in oxygen reduction reaction were measured. The results obtained are shown in Table 1 below.

Example 22

Synthesis of Carbon Material of Mixture of FeAA2, Iron (II) Chloride Tetrahydrate, and 10% of Conductive Assistant-Added DCPy (22C)

Preparation of Mixture of FeAA2, Iron(II) Chloride Tetrahydrate, and 10% of Conductive Assistant-Added DCPy 0.80 g of a conductive assistant (Ketjen Black EC600JD) was added to 8.00 g of the iron(II) chloride tetrahydrate-added DCPy mixture of Example 7 and mixed with X-TREME MX1200XTM (produced by Waring Products, Inc.) at 10,000 rpm for 50 seconds to provide a mixture of iron(II) chloride tetrahydrate and 10% of conductive assistant-added DCPy (22A).

Infusiblization and Carbonization Treatment 3.1204 g of the mixture of iron(II) chloride tetrahydrate and 10% of conductive assistant-added DCPy (22A) was weighed in a quartz boat, which was placed at the center of a quartz tube having a diameter of 4.0 cm (inner diameter: 3.6 cm) inserted in a tubular furnace, and nitrogen was made to flow therein at 300 mL per minute at room temperature for 30 minutes.

The temperature was raised from 30° C. to 700° C. at a rate of 5° C. per minute and maintained at 700° C. for 1 hour. Thereafter, it was cooled to room temperature over 3 hours, thereby providing 1.1800 g of a carbon material (22B).

Pulverization and Acid Cleaning Treatment and Measurement of Specific Surface Area The carbon material (22B) was pulverized with an agate mortar to provide a non-acid cleaned carbon material. The resulting non-acid cleaned carbon material was measured for the specific surface area by the BET method. The result is shown in Table 1 below in the column of before acid cleaning.

The non-acid cleaned carbon material thus obtained by pulverizing the carbon material (22B) with an agate mortar was repeatedly subjected to concentrated hydrochloric acid cleaning, centrifugal filtration and removal of the supernatant liquid until coloration was not observed. After rinsing with water, the material was filtered and dried in air. The resulting carbon material was dried under vacuum at 110° C. for 3 hours, allowed to stand until room temperature, and allowed to stand overnight, thereby providing an acid cleaned carbon material (22C). The resulting acid cleaned carbon material (22C) was designated as a nitrogen-containing carbon alloy of Example 22. The specific surface area thereof was measured by the BET method. The result is shown in Table 1 below in the column of after acid cleaning.

Production of Carbon Alloy-Coated Electrode, Measurement of Oxygen Reduction Reaction (ORR) Activity, and Number of Reaction Electrons in Oxygen Reduction Reaction A carbon alloy-coated electrode was produced in the same manner as in Comparative Example 1 except that the nitrogen-containing carbon alloy material obtained in Example 22 was used, and the ORR activity values (electric current density and rising potential) and the number of reaction electrons in oxygen reduction reaction were measured. The results obtained are shown in Table 1 below.

TABLE 1

| | Production conditions of nitrogen-containing carbon alloy | | | | | | | | | Characteristics of nitrogen-containing carbon alloy | | | Characteristics of carbon alloy-coated electrode | | |
|---|---|---|---|---|---|---|---|---|---|---|---|---|---|---|---|
| | Nitrogen-containing organic compound (substrate) | Inorganic metal salt and organic metal complex (catalyst) | | Ratio of catalyst 2 (mol %, to metal of catalyst 1) | Ratio of inorganic metal salt (% by mass, to substrate + catalyst) | Ratio of conductive assistant (% by mass, to substrate + catalyst) | Baking to rebaking temperature (° C.) | Nitrogen flow rate (mL/min) | Specific surface area by BET method ($m^2/g$) | | Nitrogen-containing carbon alloy isolated after acid cleaning | ORR activity in 0.05 g/$cm^2$ coating ($\mu A \cdot cm^{-2}$) | ORR voltage in 0.5 g/$cm^2$ coating (V) | Number of ORR reaction electrons in 0.5 g/$cm^2$ coating |
| | | Catalyst 1 | Catalyst 2 | | | | | | Before acid cleaning | | | | | |
| Comparative Example 1 | DCPy | $CoCl_2 \cdot 6H_2O$ | — | — | 24 | — | 700 | 300 | 138 | | 269 | −350 | 0.541 | 3.08 |
| Comparative Example 2 | DCPy | $FeCl_2 \cdot 4H_2O$ | — | — | 20 | — | 700 | 300 | 283 | | 341 | −209 | 0.431 | 2.97 |
| Comparative Example 3 | DCPy | — | — | — | — | — | 700 | 300 | — | | — | ND | ND | ND |
| Comparative Example 4 | DCPy | FePc | — | — | 42 | — | 700 | 300 | 72 | | 5.2 | −12 | 0.113 | 3.10 |
| Comparative Example 5 | DCPy | $Fe(AcAc)_2$ | — | — | 25 | — | 700 | 300 | 209 | | 128 | −25 | 0.231 | 2.93 |
| Example 1 | DCPN | $FeCl_2 \cdot 4H_2O$ | $Fe(AcAc)_2$ | 5 | 52 | — | 700 | 300 | 142 | | 1,089 | −428 | 0.745 | 3.93 |
| Example 2 | TCB | $FeCl_2 \cdot 4H_2O$ | $Fe(AcAc)_2$ | 5 | 16 | — | 600 | 300 | 32 | | 658 | −462 | 0.689 | 3.68 |
| Example 3 | TCB | $FeCl_2 \cdot 4H_2O$ | $Fe(AcAc)_2$ | 10 | 35 | — | 600 | 300 | 128 | | 698 | −700 | 0.679 | 3.76 |
| Example 4 | PyDA | $FeCl_2 \cdot 4H_2O$ | $Fe(AcAc)_2$ | 11 | 12 | — | 700 | 300 | 218 | | 1,506 | −421 | — | 3.58 |
| Example 5 | DCPy | $FeCl_2 \cdot 4H_2O$ | $Fe(AcAc)_2$ | 15 | 35 | — | 700 | 300 | 368 | | 705 | −856 | 0.686 | 3.63 |
| Example 6 | DCPy | $FeCl_2 \cdot 4H_2O$ | $Fe(AcAc)_2$ | 13 | 39 | — | 700 | 300 | 284 | | 1,039 | −913 | 0.692 | 3.79 |
| Example 7 | DCPy | $FeCl_2 \cdot 4H_2O$ | $Fe(AcAc)_2$ | 11 | 43 | — | 700 | 300 | 280 | | 1,106 | −1,220 | 0.716 | 3.76 |
| Example 8 | DCPy | $FeCl_2 \cdot 4H_2O$ | $Fe(AcAc)_2$ | 10 | 46 | — | 700 | 300 | 351 | | 1,098 | −865 | 0.687 | 3.62 |
| Example 9 | DCPy | $FeCl_2 \cdot 4H_2O$ | $Fe(AcAc)_2$ | 9 | 49 | — | 700 | 300 | 289 | | 1,119 | −896 | 0.694 | 3.71 |
| Example 10 | DCPy | $FeCl_2 \cdot 4H_2O$ | $Fe(AcAc)_2$ | 8 | 52 | — | 700 | 300 | 330 | | 1,096 | −831 | 0.724 | 3.73 |
| Example 11 | DCPy | $FeCl_2 \cdot 4H_2O$ | $Fe(AcAc)_2$ | 7 | 53 | — | 700 | 300 | 341 | | 1,147 | −601 | 0.695 | 3.60 |
| Example 12 | DCPy | $FeCl_2 \cdot 4H_2O$ | $Fe(AcAc)_2$ | 8 | 53 | — | 700 | 300 | 411 | | 760 | −450 | — | 3.59 |
| Example 13 | DCPy | $FeCl_2 \cdot 4H_2O$ | $Fe(AcAc)_3$ | 11 | 43 | — | 900 | 300 | 358 | | 572 | −570 | 0.659 | 3.63 |
| Example 14 | DCPy | $FeCl_2 \cdot 4H_2O$ | $Fe(AcAc)_2$ | 13 | 45 | — | 700 | 300 | 350 | | 1,206 | −591 | 0.660 | 3.75 |
| Example 15 | DCPy | $FeCl_2 \cdot 4H_2O$ | $Fe(DPM)_2$ | 11 | 45 | — | 700 | 300 | 249 | | 1,158 | −438 | 0.628 | 3.73 |
| Example 16 | DCPy | $FeCl_2 \cdot 4H_2O$ | $Fe(TMOD)_2$ | 12 | 46 | — | 600 | 300 | 375 | | 919 | −576 | — | 3.73 |
| Example 17 | nitrogen-containing carbon alloy of Example 10 | $Fe(TMOD)_3$ | | 8 | 52 | — | 700 -> 900 | 300 | — | | 935 | −879 | 0.759 | 3.94 |
| Example 18 | nitrogen-containing carbon alloy of Example 10 | | | 8 | 52 | — | 700 -> 1,000 | 300 | — | | 851 | −665 | 0.765 | 3.96 |
| Example 19 | nitrogen-containing carbon alloy of Example 7 | | | 11 | 43 | — | 700 -> 1,000 | 300 | — | | 675 | −747 | 0.781 | 3.96 |
| Example 20 | nitrogen-containing carbon alloy of Example 7 | | | 11 | 43 | — | 700 -> 1,000 | 0 | 540 | | 704 | −1,094 | 0.785 | 3.96 |
| Example 21 | precursor mixture (7A) of Example 7 | | | | | 15 | 700 | 300 | 540 | | 685 | −534 | 0.739 | 3.63 |
| Example 22 | precursor mixture (7A) of Example 7 | | | | | 10 | 700 | 300 | 453 | | 678 | −713 | 0.757 | 3.91 |

It was understood from Table 1 that the nitrogen-containing carbon alloy produced by the production method of the invention has sufficiently high redox activity or a large number of electrons of redox reaction. Furthermore, it was understood that the nitrogen-containing carbon alloy of the invention that was produced by the more preferred production method of the invention containing the acid cleaning and was isolated after the acid cleaning had enhanced redox activity as compared to the nitrogen-containing carbon alloy before the acid cleaning. The fact that the capability of the nitrogen-containing carbon alloy is largely enhanced by isolating after the acid cleaning is unexpected from JP-A-2011-245431 and the other related art literatures, in which the value before acid cleaning and the value after acid cleaning are not directly compared to each other.

On the other hand, it was understood from Comparative Examples 1, 2, 4 and 5 that in the case where one of the inorganic metal salt and the organic metal complex was not contained, the redox activity was low, and the number of reaction electrons of redox reaction was small.

It was understood from Comparative Example 3 that in the case where the inorganic metal salt was not used, no carbon alloy was able to be produced. The term ND for the ORR activity of Comparative Example 3 means that no carbonized material is not obtained.

The invention will be described in further detail with reference to examples below.

Example 101

Synthesis of Carbon Material (101C) of Cobalt(II) Chloride Hexahydrate-Added DCPy Mixture Preparation of Cobalt(II) Chloride Hexahydrate-Added DCPy Mixture 4.00 g of cobalt(II) chloride hexahydrate (produced by Wako Pure Chemical Industries, Ltd.) was added to 4.00 g of 3,4-dicyanopyridine (DCPy, produced by Sigma-Aldrich, Corporation, Compound (B-9)) and mixed with an agate mortar to provide a cobalt(II) chloride hexahydrate-added DCPy mixture (101A).

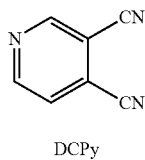

DCPy

Molecular formula: $C_7H_3N_3$
Molecular weight: 129.119
Elemental analysis (calculated value): C: 65.11, H: 2.34, N: 32.54

Infusiblization and Carbonization Treatment 1.0175 g of the cobalt(II) chloride hexahydrate-added DCPy mixture (101A) was weighed in a quartz boat, which was placed at the center of a quartz tube having a diameter of 4.0 cm (inner diameter: 3.6 cm) inserted in a tubular furnace, and nitrogen was made to flow therein at 300 mL per minute at room temperature for 30 minutes.

The temperature was raised from 30° C. to 700° C. at a rate of 5° C. per minute and maintained at 700° C. for 1 hour. Thereafter, it was cooled to room temperature over 3 hours, thereby providing 0.0798 g of a carbon material (101B).

Pulverization and Acid Cleaning Treatment and Measurement of Specific Surface Area The carbon material (101B) was pulverized with an agate mortar to provide a non-acid cleaned carbon material. The resulting non-acid cleaned carbon material was measured for the specific surface area by the BET method. The result is shown in Table 2 below in the column of before acid cleaning.

The non-acid cleaned carbon material thus obtained by pulverizing the carbon material (101B) with an agate mortar was repeatedly subjected to concentrated hydrochloric acid cleaning, centrifugal filtration and removal of the supernatant liquid until coloration was not observed. After rinsing with water, the material was filtered and dried in air. The resulting carbon material was dried under vacuum at 110° C. for 3 hours, allowed to stand until room temperature, and allowed to stand overnight, thereby providing an acid cleaned carbon material (101C). The resulting acid cleaned carbon material (101C) was designated as a nitrogen-containing carbon alloy of Example 101. The specific surface area thereof was measured by the BET method. The result is shown in Table 2 below in the column of after acid cleaning.

1. Oxygen Reduction Reaction (ORR) Activity of Carbon Alloy-Coated Electrode

Production of Carbon Alloy-Coated Electrode 110 mg of a Nafion solution (5% alcohol aqueous solution) as a binder, and 2.4 mL of water and 1.6 mL of 1-propanol (IPA) as solvents were added to 10 mg of the nitrogen-containing carbon alloy of Example 101 thus obtained, and dispersed with an ultrasonic homogenizer connected with an attachment having a diameter of 7 mm (US-150T, a trade name, produced by Nissei Limited) for 30 minutes. The nitrogen-containing carbon alloy dispersion liquid was coated on a carbon electrode to make an amount of the nitrogen-containing carbon alloy of 0.05 mg/cm$^2$ with a rotation ring disk electrode (HR2-RD1-Pt8/GC5, a trade name, produced by Hokuto Denko Corporation) and dried at room temperature, thereby providing a carbon alloy-coated electrode.

Measurement of Oxygen Reduction Reaction (ORR) Activity of Carbon Alloy-Coated Electrode A rotation electrode device (HR-201, a trade name, produced by Hokuto Denko Corporation) was connected to an automatic polarization system (HZ-3000, a trade name, produced by Hokuto Denko Corporation), and the measurement was performed in the following manner with the carbon alloy-coated electrode as the working electrode and a platinum electrode and a saturated calomel electrode (SCE) as the counter electrode and the reference electrode, respectively.

A. For cleaning the carbon alloy-coated electrode, 10 cycles of cyclic voltammetry were performed at a sweep potential of from 0.946 to −0.204 V (vs. SCE) and a sweep rate of 50 mV/s in a 0.1 M sulfuric acid aqueous solution having been bubbled with argon for 30 minutes or more at 20° C.

B. For a blank measurement, linear sweep voltammetry was performed at a sweep potential of from 0.746 to −0.204 V (vs. SCE), a sweep rate of 5 mV/s and an electrode rotation number of 1,500 rpm in a 0.1 M sulfuric acid aqueous solution having been bubbled with argon for 30 minutes or more at 20° C.

C. For measuring the oxygen reduction activity, linear sweep voltammetry was performed at a sweep potential of from 0.746 to −0.204 V (vs. SCE), a sweep rate of 5 mV/s and an electrode rotation number of 1,500 rpm in a 0.5 M sulfuric acid aqueous solution having been bubbled with oxygen for 30 minutes or more.

D. The measurement data of B was subtracted from the measurement data C, and the result was designated as the true oxygen reduction activity. The electric current density at a voltage of 0.7 V vs. NHE was obtained from the resulting voltammogram (voltage-current density curve), and the result was designated as the ORR activity value.

The result obtained is shown in Table 2 below.

2. Number of Reaction Electrons in Oxygen Reduction Reaction Production of Carbon Alloy-Coated Electrode 110 mg of a Nafion solution (5% alcohol aqueous solution) as a binder, and 2.4 mL of water and 1.6 mL of 1-propanol (IPA) as solvents were added to 10 mg of the nitrogen-containing carbon alloy of Example 101 thus obtained, and dispersed with an ultrasonic homogenizer connected with an attachment having a diameter of 7 mm (US-150T, a trade name, produced by Nissei Limited) for 30 minutes. The nitrogen-containing carbon alloy dispersion liquid was coated on a carbon electrode to make an amount of the nitrogen-containing carbon alloy of 0.05 mg/cm$^2$ with a rotation ring disk electrode (HR2-RD1-Pt8/GC5, a trade name, produced by Hokuto Denko Corporation) and dried at room temperature, thereby providing a carbon alloy-coated electrode.

Evaluation of Number of Reaction Electrons in Oxygen Reduction Reaction

The number of reaction electrons in the oxygen reduction reaction was obtained by the measurement of the hydrogen peroxide formation amount, in the following manners.

A rotation electrode device (HR-201, a trade name, produced by Hokuto Denko Corporation) was connected to an automatic polarization system (HZ-3000, a trade name, produced by Hokuto Denko Corporation), and the measurement was performed in the following manner with the rotation ring disk electrodes (the carbon alloy-coated electrode and the platinum ring disk electrode) as the working electrode and a platinum electrode and a saturated calomel electrode (SCE) as the counter electrode and the reference electrode, respectively.

A. For cleaning the carbon alloy-coated electrode, 10 cycles of cyclic voltammetry were performed at a sweep potential of from 0.946 to −0.204 V (vs. SCE) and a sweep rate of 50 mV/s in a 0.1 M sulfuric acid aqueous solution having been bubbled with argon for 30 minutes or more at 20° C.

B. For a blank measurement, linear sweep voltammetry was performed for the rotation ring disk electrodes (the carbon alloy-coated electrode and the platinum ring disk electrode) respectively at a sweep potential of from 0.746 to −0.204 V (vs. SCE), a sweep rate of 5 mV/s and an electrode rotation number of 1,500 rpm in a 0.1 M sulfuric acid aqueous solution having been bubbled with argon for 30 minutes or more at 20° C.

C. Linear sweep voltammetry was performed for the rotation ring disk electrodes (the carbon alloy-coated electrode and the platinum ring disk electrode) respectively at a sweep potential of from 0.746 to −0.204 V (vs. SCE), a sweep rate of 5 mV/s and an electrode rotation number of 1,500 rpm in a 0.5 M sulfuric acid aqueous solution having been bubbled with oxygen for 30 minutes or more.

D. The measurement data of B was subtracted from the measurement data C for the rotation ring disk electrodes (the carbon alloy-coated electrode and the platinum ring disk electrode) respectively for calculating the electric current values ($I_D$ and $I_R$) with respect to the potentials.

The $H_2O_2$ formation rate (%) was calculated by the following expression according to the method described in A. Ohma, et al., Electrochimica Acta, vol. 55, p. 8829 (2010).

$$H_2O_2 \text{ formation rate } X_{H2O2} (\%) = \frac{2I_R/N}{I_D + (I_R/N)} \times 100$$

Capture rate $N = 0.49$ (experimentally obtained)

Subsequently, the number of electrons in oxygen reduction reaction was calculated by the following expression.

Number of electrons in oxygen reduction reaction=$4 \times (1-H_2O_2$ formation rate (%)/100%)+$2 \times H_2O_2$ formation rate (%)/100%

The results obtained are shown in Table 2 below.

Example 102

Synthesis of Carbon Material (102C) of Iron(II) Chloride Tetrahydrate-Added DCPy Mixture Preparation of Iron(II) Chloride Tetrahydrate-Added DCPy Mixture 4.00 g of iron(II) chloride tetrahydrate (99.9%, produced by Wako Pure Chemical Industries, Ltd.) was added to 4.00 g of 3,4-dicyanopyridine (DCPy, produced by Sigma-Aldrich Corporation) and mixed with an agate mortar to provide an iron(II) chloride tetrahydrate-added DCPy mixture (102A).

Infusiblization and Carbonization Treatment 3.0203 g of the iron(II) chloride tetrahydrate-added DCPy mixture (102A) was weighed in a quartz boat, which was placed at the center of a quartz tube having a diameter of 4.0 cm (inner diameter: 3.6 cm) inserted in a tubular furnace, and nitrogen was made to flow therein at 300 mL per minute at room temperature for 30 minutes.

The temperature was raised from 30° C. to 600° C. at a rate of 5° C. per minute and maintained at 600° C. for 1 hour. Thereafter, it was cooled to room temperature over 3 hours, thereby providing 1.1374 g of a carbon material (102B).

Pulverization and Acid Cleaning Treatment and Measurement of Specific Surface Area The carbon material (102B) was pulverized with an agate mortar to provide a non-acid cleaned carbon material. The resulting non-acid cleaned carbon material was measured for the specific surface area by the BET method. The result is shown in Table 2 below in the column of before acid cleaning.

The non-acid cleaned carbon material thus obtained by pulverizing the carbon material (102B) with an agate mortar was repeatedly subjected to concentrated hydrochloric acid cleaning, centrifugal filtration and removal of the supernatant liquid until coloration was not observed. After rinsing with water, the material was filtered and dried in air. The resulting carbon material was dried under vacuum at 110° C. for 3 hours, allowed to stand until room temperature, and allowed to stand overnight, thereby providing an acid cleaned carbon material (102C). The resulting acid cleaned carbon material (102C) was designated as a nitrogen-containing carbon alloy of Example 102. The specific surface area thereof was measured by the BET method. The result is shown in Table 2 below in the column of after acid cleaning.

Production of Carbon Alloy-Coated Electrode, Measurement of Oxygen Reduction Reaction (ORR) Activity, and Number of Reaction Electrons in Oxygen Reduction Reaction A carbon alloy-coated electrode was produced in the same manner as in Example 101 except that the nitrogen-containing carbon alloy material obtained in Example 102 was used, and the ORR activity values (electric current density and rising potential) and the number of reaction electrons in oxygen reduction reaction were measured. The results obtained are shown in Table 2 below.

Example 103

Synthesis of Carbon Material (103C) of Cobalt(II) Chloride Hexahydrate-Added DCPN Mixture Preparation of Cobalt(II) Chloride Hexahydrate-Added DCPN Mixture 4.00 g of cobalt(II) chloride hexahydrate (produced by Wako Pure Chemical Industries, Ltd.) was added to 4.00 g of DCPN having the following structure (produced by Sigma-Aldrich Corporation, Compound (B-3)) and mixed with an agate mortar to provide a cobalt(II) chloride hexahydrate-added DCPy mixture (103A).

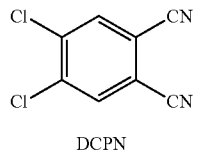

DCPN

Molecular formula: $C_8H_2Cl_2N_2$
Molecular weight: 197.02
Elemental analysis (calculated value): C: 48.77, H: 1.02, Cl: 35.99, N: 14.22

Infusiblization and Carbonization Treatment 3.0217 g of the cobalt(II) chloride hexahydrate-added DCPy mixture (103A) was weighed in a quartz boat, which was placed at the center of a quartz tube having a diameter of 4.0 cm (inner diameter: 3.6 cm) inserted in a tubular furnace, and nitrogen was made to flow therein at 300 mL per minute at room temperature for 30 minutes.

The temperature was raised from 30° C. to 700° C. at a rate of 5° C. per minute and maintained at 700° C. for 1 hour. Thereafter, it was cooled to room temperature over 3 hours, thereby providing 1.3224 g of a carbon material (103B).

Pulverization and Acid Cleaning Treatment and Measurement of Specific Surface Area The carbon material (103B) was pulverized with an agate mortar to provide a non-acid cleaned carbon material. The resulting non-acid cleaned carbon material was measured for the specific surface area by the BET method. The result is shown in Table 2 below in the column of before acid cleaning. The non-acid cleaned carbon material thus obtained by pulverizing the carbon material (103B) with an agate mortar was repeatedly subjected to concentrated hydrochloric acid cleaning, centrifugal filtration and removal of the supernatant liquid until coloration was not observed. After rinsing with water, the material was filtered and dried in air. The resulting carbon material was dried under vacuum at 110° C. for 3 hours, allowed to stand until room temperature, and allowed to stand overnight, thereby providing an acid cleaned carbon material (103C). The resulting acid cleaned carbon material (103C) was designated as a nitrogen-containing carbon alloy of Example 103. The specific surface area thereof was measured by the BET method. The result is shown in Table 2 below in the column of after acid cleaning.

Production of Carbon Alloy-Coated Electrode, Measurement of Oxygen Reduction Reaction (ORR) Activity, and Number of Reaction Electrons in Oxygen Reduction Reaction A carbon alloy-coated electrode was produced in the same manner as in Example 101 except that the nitrogen-containing carbon alloy material obtained in Example 103 was used, and the ORR activity values (electric current density and rising potential) and the number of reaction electrons in oxygen reduction reaction were measured. The results obtained are shown in Table 2 below.

Example 104

Synthesis of Carbon Material (104C) of Cobalt(II) Chloride Hexahydrate-Added PyCN Mixture Preparation of Cobalt(II) Chloride Hexahydrate-Added PyCN Mixture 4.00 g of cobalt(II) chloride hexahydrate (produced by Wako Pure Chemical Industries, Ltd.) was added to 4.00 g of 3-cyanopyridine (PyCN, produced by Tokyo Chemical Industry Co., LTD., Compound (B-7)) and mixed with an agate mortar to provide a cobalt(II) chloride hexahydrate-added PyCN mixture (104A).

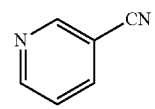

PyCN

Molecular formula: $C_6H_4N_2$
Molecular weight: 104.109
Elemental analysis (calculated value): C: 69.22, H: 3.87, N: 26.91

Infusiblization and Carbonization Treatment 2.9278 g of the cobalt(II) chloride hexahydrate-added PyCN mixture (104A) was weighed in a quartz boat, which was placed at the center of a quartz tube having a diameter of 4.0 cm (inner diameter: 3.6 cm) inserted in a tubular furnace, and nitrogen was made to flow therein at 300 mL per minute at room temperature for 30 minutes.

The temperature was raised from 30° C. to 700° C. at a rate of 5° C. per minute and maintained at 700° C. for 1 hour. Thereafter, it was cooled to room temperature over 3 hours, thereby providing 0.0697 g of a carbon material (104B).

Pulverization and Acid Cleaning Treatment and Measurement of Specific Surface Area The carbon material (104B) was pulverized with an agate mortar to provide a non-acid cleaned carbon material. The resulting non-acid cleaned carbon material was measured for the specific surface area by the BET method. The result is shown in Table 2 below in the column of before acid cleaning.

The non-acid cleaned carbon material thus obtained by pulverizing the carbon material (104B) with an agate mortar was repeatedly subjected to concentrated hydrochloric acid cleaning, centrifugal filtration and removal of the supernatant liquid until coloration was not observed. After rinsing with water, the material was filtered and dried in air. The resulting carbon material was dried under vacuum at 110° C. for 3 hours, allowed to stand until room temperature, and allowed to stand overnight, thereby providing an acid cleaned carbon material (104C). The resulting acid cleaned carbon material (104C) was designated as a nitrogen-containing carbon alloy of Example 104. The specific surface area thereof was measured by the BET method. The result is shown in Table 2 below in the column of after acid cleaning.

Production of Carbon Alloy-Coated Electrode, Measurement of Oxygen Reduction Reaction (ORR) Activity, and Number of Reaction Electrons in Oxygen Reduction Reaction A carbon alloy-coated electrode was produced in the same manner as in. Example 101 except that the nitrogen-containing carbon alloy material obtained in Example 104 was used, and the ORR activity values (electric current density and rising potential) and the number of reaction electrons in oxygen reduction reaction were measured. The results obtained are shown in Table 2 below.

Example 105

Synthesis of Carbon Material of Mixture of Fe(bpy)$_3$Cl$_2$-Added PR254 (105C)

Preparation of Fe(bpy)$_3$Cl$_2$

Fe(bpy)$_3$Cl$_2$ was prepared according to the following procedures by modifying the method described in R. Nazir, etc, J. Them. Anal calorim, Springer, 30 Sep. 2011 (DOI 10.1007/s10973-011-1919-5).

Preparation of Mixture of Fe(bpy)$_3$Cl$_2$-added PR254

4.00 g of Fe(bpy)$_3$Cl$_2$ described above was added to 4.00 g of Pigmentred254 (IRGAPHOR RED BT-CF, PR254, a trade name, produced by Chiba Specialty Chemicals, Ltd.) and mixed with an agate mortar to provide an mixture of Fe(bpy)$_3$Cl$_2$-added PR254 (105A).

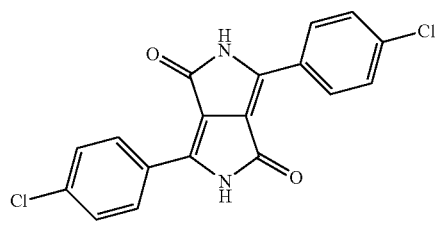

PR254

Molecular formula: C$_{18}$H$_{10}$Cl$_2$N$_2$O$_2$

Molecular weight: 357.190

Elemental analysis (calculated value): C: 60.53, H: 2.82, Cl: 19.85, N: 7.84, O: 8.96

Infusiblization and Carbonization Treatment 1.0692 g of the mixture of Fe(bpy)$_3$Cl$_2$-added PR254 (105A) was weighed in a quartz boat, which was placed at the center of a quartz tube having a diameter of 4.0 cm (inner diameter: 3.6 cm) inserted in a tubular furnace, and nitrogen was made to flow therein at, 300 mL per minute at room temperature for 30 minutes.

The temperature was raised from 30° C. to 700° C. at a rate of 5° C. per minute and maintained at 700° C. for 1 hour. Thereafter, it was cooled to room temperature over 3 hours, thereby providing 0.4936 g of a carbon material (105B).

Pulverization and Acid Cleaning Treatment and Measurement of Specific Surface Area The carbon material (105B) was pulverized with an agate mortar to provide a non-acid cleaned carbon material. The resulting non-acid cleaned carbon material was measured for the specific surface area by the BET method. The result is shown in Table 2 below in the column of before acid cleaning.

The non-acid cleaned carbon material thus obtained by pulverizing the carbon material (105B) with an agate mortar was repeatedly subjected to concentrated hydrochloric acid cleaning, centrifugal filtration and removal of the supernatant liquid until coloration was not observed. After rinsing with water, the material was filtered and dried in air. The resulting carbon material was dried under vacuum at 110° C. for 3 hours, allowed to stand until room temperature, and allowed to stand overnight, thereby providing an acid cleaned carbon material (105C). The resulting acid cleaned carbon material (105C) was designated as a nitrogen-containing carbon alloy of Example 105. The specific surface area thereof was measured by the BET method. The result is shown in Table 2 below in the column of after acid cleaning.

Production of Carbon Alloy-Coated Electrode, Measurement of Oxygen Reduction Reaction (ORR) Activity, and Number of Reaction Electrons in Oxygen Reduction Reaction A carbon alloy-coated electrode was produced in the same manner as in Example 101 except that the nitrogen-containing carbon alloy material obtained in Example 105 was used, and the ORR activity values (electric current density and rising potential) and the number of reaction electrons in oxygen reduction reaction were measured. The results obtained are shown in Table 2 below.

Example 106

Synthesis of Carbon Material (106C) of Cobalt(II) Chloride Hexahydrate-Added DCPA Mixture Preparation of Cobalt(II) Chloride Hexahydrate-Added DCPA Mixture 4.00 g of cobalt(II) chloride hexahydrate (produced by Wako Pure Chemical Industries, Ltd.) was added to 4.00 g of 3,4-dichloropthalamide (DCPA, produced by Sigma-Aldrich. Corporation, Compound (B-5)) and mixed with an agate mortar to provide a cobalt(II) chloride hexahydrate-added DCPA mixture (106A).

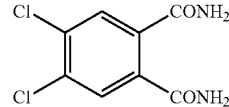

DCPA

Molecular formula: C$_8$H$_6$Cl$_2$N$_2$O$_2$

Molecular weight: 233.05

Elemental analysis (calculated value): C: 41.23, H: 2.59, Cl: 30.42, N: 12.02, O: 13.73

Infusiblization and Carbonization Treatment 3.0232 g of the cobalt(II) chloride hexahydrate-added DCPA mixture (106A) was weighed in a quartz boat, which was placed at the center of a quartz tube having a diameter of 4.0 cm (inner diameter: 3.6 cm) inserted in a tubular furnace, and nitrogen was made to flow therein at 300 mL per minute at room temperature for 30 minutes.

The temperature was raised from 30° C. to 700° C. at a rate of 5° C. per minute and maintained at 700° C. for 1 hour. Thereafter, it was cooled to room temperature over 3 hours, thereby providing 0.1828 g of a carbon material (106B).

Pulverization and Acid Cleaning Treatment and Measurement of Specific Surface Area The carbon material (106B) was pulverized with an agate mortar to provide a non-acid cleaned carbon material. The resulting non-acid cleaned carbon material was measured for the specific surface area by the BET method. The result is shown in Table 2 below in the column of before acid cleaning.

The non-acid cleaned carbon material thus obtained by pulverizing the carbon material (106B) with an agate mortar was repeatedly subjected to concentrated hydrochloric acid cleaning, centrifugal filtration and removal of the supernatant liquid until coloration was not observed. After rinsing with water, the material was filtered and dried in air. The resulting carbon material was dried under vacuum at 110° C. for 3 hours, allowed to stand until room temperature, and allowed to stand overnight, thereby providing an acid cleaned carbon material (106C). The resulting acid cleaned carbon material (106C) was designated as a nitrogen-containing carbon alloy of Example 106. The specific surface area thereof was measured by the BET method. The result is shown in Table 2 below in the column of after acid cleaning.

Production of Carbon Alloy-Coated Electrode, Measurement of Oxygen Reduction Reaction (ORR) Activity, and Number of Reaction Electrons in Oxygen Reduction Reaction A carbon alloy-coated electrode was produced in the same manner as in Example 101 except that the nitrogen-containing carbon alloy material obtained in Example 106 was used, and the ORR activity values (electric current density and rising potential) and the number of reaction electrons in oxygen reduction reaction were measured. The results obtained are shown in Table 2 below.

Example 107

Synthesis of Carbon Material (107C) of Cobalt(II) Chloride Hexahydrate-Added PyCA Mixture Preparation of Cobalt(II) Chloride Hexahydrate-Added PyCA Mixture 4.00 g of cobalt(II) chloride hexahydrate (produced by Wako Pure Chemical Industries, Ltd.) was added to 4.00 g of 3-pyridine carboxyamidine hydrochloride (PyCA, produced by AlfaAesar Corporation, Compound (B-11)) and mixed with an agate mortar to provide a cobalt(II) chloride hexahydrate-added PyCA mixture (107A).

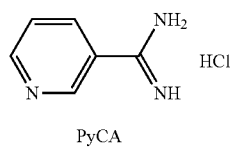

PyCA

Molecular formula: $C_6H_9Cl_1N_3$
Molecular weight: 157.601
Elemental analysis (calculated value): C: 45.73, H: 5.12, Cl: 22.50, N: 26.66

Infusiblization and Carbonization Treatment 1.0501 g of the cobalt(II) chloride hexahydrate-added PyCA mixture (107A) was weighed in a quartz boat, which was placed at the center of a quartz tube having a diameter of 4.0 cm (inner diameter: 3.6 cm) inserted in a tubular furnace, and nitrogen was made to flow therein at 300 mL per minute at room temperature for 30 minutes.

The temperature was raised from 30° C. to 700° C. at a rate of 5° C. per minute and maintained at 700° C. for 1 hour. Thereafter, it was cooled to room temperature over 3 hours, thereby providing 0.5446 g of a carbon material (107B).

Pulverization and Acid Cleaning Treatment and Measurement of Specific Surface Area The carbon material (107B) was pulverized with an agate mortar to provide a non-acid cleaned carbon material. The resulting non-acid cleaned carbon material was measured for the specific surface area by the BET method. The result is shown in Table 2 below in the column of before acid cleaning.

The non-acid cleaned carbon material thus obtained by pulverizing the carbon material (107B) with an agate mortar was repeatedly subjected to concentrated hydrochloric acid cleaning, centrifugal filtration and removal of the supernatant liquid until coloration was not observed. After rinsing with water, the material was filtered and dried in air. The resulting carbon material was dried under vacuum at 110° C. for 3 hours, allowed to stand until room temperature, and allowed to stand overnight, thereby providing an acid cleaned carbon material (107C). The resulting acid cleaned carbon material (107C) was designated as a nitrogen-containing carbon alloy of Example 107. The specific surface area thereof was measured by the BET method. The result is shown in Table 2 below in the column of after acid cleaning.

Production of Carbon Alloy-Coated Electrode, Measurement of Oxygen Reduction Reaction (ORR) Activity, and Number of Reaction Electrons in Oxygen Reduction Reaction A carbon alloy-coated electrode was produced in the same manner as in Example 101 except that the nitrogen-containing carbon alloy material obtained in Example 107 was used, and the ORR activity values (electric current density and rising potential) and the number of reaction electrons in oxygen reduction reaction were measured. The results obtained are shown in Table 2 below.

Example 108

Synthesis of Carbon Material (108C) of Cobalt(II) Chloride Hexahydrate-Added DCPy Mixture Preparation of Cobalt(II) Chloride Hexahydrate-Added DCPy Mixture 0.77 g of cobalt(II) chloride hexahydrate (produced by Wako Pure Chemical Industries, Ltd.) was added to 0.33 g of 3,4-dicyanopyridine (DCPy, produced by Sigma-Aldrich Corporation) and mixed with an agate mortar to provide a cobalt(II) chloride hexahydrate-added DCPy mixture (108A).

Infusiblization and Carbonization Treatment 1.0305 g of the cobalt(II) chloride hexahydrate-added DCPy mixture (108A) was weighed in a quartz boat, which was placed at the center of a quartz tube having a diameter of 4.0 cm (inner diameter: 3.6 cm) inserted in a tubular furnace, and nitrogen was made to flow therein at 300 mL per minute at room temperature for 30 minutes.

The temperature was raised from 30° C. to 700° C. at a rate of 5° C. per minute and maintained at 700° C. for 1 hour. Thereafter, it was cooled to room temperature over 3 hours, thereby providing 0.1416 g of a carbon material (108B).

Pulverization and Acid Cleaning Treatment and Measurement of Specific Surface Area The carbon material (108B) was pulverized with an agate mortar to provide a non-acid cleaned carbon material. The resulting non-acid cleaned carbon material was measured for the specific surface area by the BET method. The result is shown in Table 2 below in the column of before acid cleaning.

The non-acid cleaned carbon material thus obtained by pulverizing the carbon material (108B) with an agate mortar was repeatedly subjected to concentrated hydrochloric acid cleaning, centrifugal filtration and removal of the supernatant liquid until coloration was not observed. After rinsing with water, the material was filtered and dried in air. The resulting carbon material was dried under vacuum at 110° C. for 3 hours, allowed to stand until room temperature, and allowed to stand overnight, thereby providing an acid cleaned carbon material (108C). The resulting acid cleaned carbon material (108C) was designated as a nitrogen-containing carbon alloy of Example 108. The specific surface area thereof was measured by the BET method. The result is shown in Table 2 below in the column of after acid cleaning.

Production of Carbon Alloy-Coated Electrode, Measurement of Oxygen Reduction Reaction (ORR) Activity, and Number of Reaction Electrons in Oxygen Reduction Reaction A carbon alloy-coated electrode was produced in the same manner as in Example 101 except that the nitrogen-containing carbon alloy material obtained in Example 108 was used, and the ORR activity values (electric current density and rising potential) and the number of reaction electrons in oxygen reduction reaction were measured. The results obtained are shown in Table 2 below.

Example 109

Synthesis of Carbon Material (109C) of Cobalt(II) Chloride Hexahydrate-Added DCPy Mixture Preparation of Cobalt(II) Chloride Hexahydrate-Added DCPy Mixture 0.66 g of cobalt(II) chloride hexahydrate (produced by Wako Pure Chemical Industries, Ltd.) was added to 0.44 g of 3,4-dicyanopyridine (DCPy, produced by Sigma-Aldrich Corporation) and mixed with an agate mortar to provide a cobalt(II) chloride hexahydrate-added DCPy mixture (109A).

Infusiblization and Carbonization Treatment 1.0246 g of the cobalt(II) chloride hexahydrate-added DCPy mixture (109A) was weighed in a quartz boat, which was placed at the center of a quartz tube having a diameter of 4.0 cm (inner diameter: 3.6 cm) inserted in a tubular furnace, and nitrogen was made to flow therein at 300 mL per minute at room temperature for 30 minutes.

The temperature was raised from 30° C. to 700° C. at a rate of 5° C. per minute and maintained at 700° C. for 1 hour. Thereafter, it was cooled to room temperature over 3 hours, thereby providing 0.1186 g of a carbon material (109B).

Pulverization and Acid Cleaning Treatment and Measurement of Specific Surface Area The carbon material (109B) was pulverized with an agate mortar to provide a non-acid cleaned carbon material. The resulting non-acid cleaned carbon material was measured for the specific surface area by the BET method. The result is shown in Table 2 below in the column of before acid cleaning.

The non-acid cleaned carbon material thus obtained by pulverizing the carbon material (109B) with an agate mortar was repeatedly subjected to concentrated hydrochloric acid cleaning, centrifugal filtration and removal of the supernatant liquid until coloration was not observed. After rinsing with water, the material was filtered and dried in air. The resulting carbon material was dried under vacuum at 110° C. for 3 hours, allowed to stand until room temperature, and allowed to stand overnight, thereby providing an acid cleaned carbon material (109C). The resulting acid cleaned carbon material (109C) was designated as a nitrogen-containing carbon alloy of Example 109. The specific surface area thereof was measured by the BET method. The result is shown in Table 2 below in the column of after acid cleaning.

Production of Carbon Alloy-Coated Electrode, Measurement of Oxygen Reduction Reaction (ORR) Activity, and Number of Reaction Electrons in Oxygen Reduction Reaction A carbon alloy-coated electrode was produced in the same manner as in Example 101 except that the nitrogen-containing carbon alloy material obtained in Example 109 was used, and the ORR activity values (electric current density and rising potential) and the number of reaction electrons in oxygen reduction reaction were measured. The results obtained are shown in Table 2 below.

Comparative Example 101

Synthesis of Carbon Material (C101C) of Cobalt(II) Chloride Hexahydrate-Added DCPy Mixture Preparation of Cobalt(II) Chloride Hexahydrate-Added DCPy Mixture 0.728 g of cobalt (II) chloride hexahydrate (produced by Wako Pure Chemical Industries, Ltd.) was added to 2.372 g of 3,4-dicyanopyridine (DCPy, produced by Sigma-Aldrich Corporation) and mixed with an agate mortar to provide a cobalt(II) chloride hexahydrate-added DCPy mixture (C101A).

Infusiblization and Carbonization Treatment 3.0142 g of the cobalt(II) chloride hexahydrate-added DCPy mixture (C101A) was weighed in a quartz boat, which was placed at the center of a quartz tube having a diameter of 4.0 cm (inner diameter: 3.6 cm) inserted in a tubular furnace, and nitrogen was made to flow therein at 300 mL per minute at room temperature for 30 minutes.

The temperature was raised from 30° C. to 700° C. at a rate of 5° C. per minute and maintained at 700° C. for 1 hour. Thereafter, it was cooled to room temperature over 3 hours, thereby providing 0.4037 g of a carbon material (C101B).

Pulverization and Acid Cleaning Treatment and Measurement of Specific Surface Area The carbon material (C101B) was pulverized with an agate mortar to provide a non-acid cleaned carbon material. The resulting non-acid cleaned carbon material was measured for the specific surface area by the BET method. The result is shown in Table 2 below in the column of before acid cleaning.

The non-acid cleaned carbon material thus obtained by pulverizing the carbon material (C101B) with an agate mortar was repeatedly subjected to concentrated hydrochloric acid cleaning, centrifugal filtration and removal of the supernatant liquid until coloration was not observed. After rinsing with water, the material was filtered and dried in air. The resulting carbon material was dried under vacuum at 110° C. for 3 hours, allowed to stand until room temperature, and allowed to stand overnight, thereby providing an acid cleaned carbon material (C101C). The resulting acid cleaned carbon material (C101C) was designated as a nitrogen-containing carbon alloy of Comparative Example 101. The specific surface area thereof was measured by the BET method. The result is shown in Table 2 below in the column of after acid cleaning.

Production of Carbon Alloy-Coated Electrode, Measurement of Oxygen Reduction Reaction (ORR) Activity, and Number of Reaction Electrons in Oxygen Reduction Reaction A carbon alloy-coated electrode was produced in the same manner as in Example 101 except that the nitrogen-containing carbon alloy material obtained in Comparative Example 101 was used, and the ORR activity values (electric current density and rising potential) and the number of reaction electrons in oxygen reduction reaction were measured. The results obtained are shown in Table 2 below.

Comparative Example 102

Synthesis of Carbon Material (C102C) of Iron(II) Chloride Tetrahydrate-Added DCPy Mixture Preparation of Iron(II) Chloride Tetrahydrate-Added DCPy Mixture 0.245 g of iron(II) chloride tetrahydrate (99.9%, produced by Wako Pure Chemical Industries, Ltd.) was added to 0.955 g of 3,4-dicyanopyridine (DCPy, produced by Sigma-Aldrich Corporation) and mixed with an agate mortar to provide an iron(II) chloride tetrahydrate-added DCPy mixture (C102A).

Infusiblization and Carbonization Treatment 3.0116 g of the iron (II) chloride tetrahydrate-added DCPy mixture (C102A) was weighed in a quartz boat, which was placed at the center of a quartz tube having a diameter of 4.0 cm (inner diameter: 3.6 cm) inserted in a tubular furnace, and nitrogen was made to flow therein at 300 mL per minute at room temperature for 30 minutes.

The temperature was raised from 30° C. to 700° C. at a rate of 5° C. per minute and maintained at 700° C. for 1 hour. Thereafter, it was cooled to room temperature over 3 hours, thereby providing 0.6538 g of a carbon material (C102B).

Pulverization and Acid Cleaning Treatment and Measurement of Specific Surface Area The carbon material (C102B) was pulverized with an agate mortar to provide a non-acid cleaned carbon material. The resulting non-acid cleaned carbon material was measured for the specific surface area by the BET method. The result is shown in Table 2 below in the column of before acid cleaning.

The non-acid cleaned carbon material thus obtained by pulverizing the carbon material (C102B) with an agate mortar was repeatedly subjected to concentrated hydrochloric acid cleaning, centrifugal filtration and removal of the supernatant liquid until coloration was not observed. After rinsing with water, the material was filtered and dried in air. The resulting carbon material was dried under vacuum at 110° C. for 3 hours, allowed to stand until room temperature, and allowed to stand overnight, thereby providing an acid cleaned carbon material (C102C). The resulting acid cleaned carbon material (C102C) was designated as a nitrogen-containing carbon alloy of Comparative Example 102. The specific surface area thereof was measured by the BET method. The result is shown in Table 2 below in the column of after acid cleaning.

Production of Carbon Alloy-Coated Electrode, Measurement of Oxygen Reduction Reaction (ORR) Activity, and Number of Reaction Electrons in Oxygen Reduction Reaction A carbon alloy-coated electrode was produced in the same manner as in Example 101 except that the nitrogen-containing carbon alloy material obtained in Comparative Example 102 was used, and the ORR activity values (electric current density and rising potential) and the number of reaction electrons in oxygen reduction reaction were measured. The results obtained are shown in Table 2 below.

Comparative Example 103

Synthesis of Carbon Material of DCPy (C103C)

Infusiblization and Carbonization Treatment 4.000 g of 3,4-dicyanopyridine (DCPy, produced by Sigma-Aldrich Corporation) was weighed in a quartz boat, which was placed at the center of a quartz tube having a diameter of 4.0 cm (inner diameter: 3.6 cm) inserted in a tubular furnace, and nitrogen was made to flow therein at 300 mL per minute at room temperature for 30 minutes.

The temperature was raised from 30° C. to 700° C. at a rate of 5° C. per minute and maintained at 700° C. for 1 hour. Thereafter, it was cooled to room temperature over 3 hours, but no carbon material was obtained.

Comparative Example 104

Synthesis of Carbon Material (C104C) of FePc-Added DCPy Mixture Preparation of FePc-Added DCPy Mixture 1.312 g of iron phthalocyanine (FePc produced by Tokyo Chemical Industry Co., LTD.) was added to 1.788 g of 3,4-dicyanopyridine (DCPy, produced by Sigma-Aldrich Corporation) and mixed with an agate mortar to provide a FePc-added DCPy mixture (C104A).

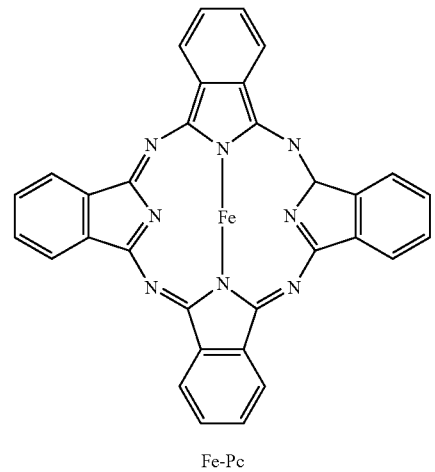

Fe-Pc

Molecular formula: $C_{32}H_{16}FeN_8$
Molecular weight: 568.368
Elemental analysis (calculated value): C: 67.62, H: 2.84, Fe: 9.83, N: 19.71

Infusiblization and Carbonization Treatment 1.0345 g of the FePc-added DCPy mixture (C104A) was weighed in a quartz boat, which was placed at the center of a quartz tube having a diameter of 4.0 cm (inner diameter: 3.6 cm) inserted in a tubular furnace, and nitrogen was made to flow therein at 300 mL per minute at room temperature for 30 minutes.

The temperature was raised from 30° C. to 700° C. at a rate of 5° C. per minute and maintained at 700° C. for 1 hour. Thereafter, it was cooled to room temperature over 3 hours, thereby providing 0.1327 g of a carbon material (C104B).

Pulverization and Acid Cleaning Treatment and Measurement of Specific Surface Area The carbon material (C104B) was pulverized with an agate mortar to provide a non-acid cleaned carbon material. The resulting non-acid cleaned carbon material was measured for the specific surface area by the BET method. The result is shown in Table 2 below in the column of before acid cleaning.

The non-acid cleaned carbon material thus obtained by pulverizing the carbon material (C104B) with an agate mortar was repeatedly subjected to concentrated hydrochloric acid cleaning, centrifugal filtration and removal of the supernatant liquid until coloration was not observed. After rinsing with water, the material was filtered and dried in air. The resulting carbon material was dried under vacuum at 110° C. for 3 hours, allowed to stand until room temperature, and allowed to stand overnight, thereby providing an acid cleaned carbon material (C104C). The resulting acid cleaned carbon material (C104C) was designated as a nitrogen-containing carbon alloy of Comparative Example 104. The specific surface area thereof was measured by the BET method. The result is shown in Table 2 below in the column of after acid cleaning.

Production of Carbon Alloy-Coated Electrode, Measurement of Oxygen Reduction Reaction (ORR) Activity, and Number of Reaction Electrons in Oxygen Reduction Reaction A carbon alloy-coated electrode was produced in the same manner as in Example 101 except that the nitrogen-containing carbon alloy material obtained in Comparative Example 104 was used, and the ORR activity values (electric current density and rising potential) and the number of reaction electrons in oxygen reduction reaction were measured. The results obtained are shown in Table 2 below.

Comparative Example 105

Synthesis of Carbon Material (C105C) of FeAA2-Added DCPy Mixture

Preparation of FeAA2-Added DCPy Mixture 0.766 g of iron (II) acetylacetonato (99.95%, FeAA2, produced by Sigma-Aldrich Corporation) was added to 2.334 g of 3,4-dicyanopyridine (DCPy, produced by Sigma-Aldrich Corporation) and mixed with an agate mortar to provide a FeAA2-added DCPy mixture (C105A).

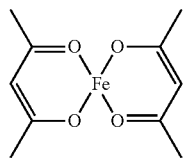

FeAA2

Molecular formula: $C_{10}H_{14}Fe_1O_4$
Molecular weight: 254.061

Elemental analysis (calculated value): C: 47.27, H: 5.55, Fe: 21.98, O: 25.19

Infusiblization and Carbonization Treatment 2.7681 g of the FeAA2-added DCPy mixture (C105A) was weighed in a quartz boat, which was placed at the center of a quartz tube having a diameter of 4.0 cm (inner diameter: 3.6 cm) inserted in a tubular furnace, and nitrogen was made to flow therein at 300 mL per minute at room temperature for 30 minutes.

The temperature was raised from 30° C. to 700° C. at a rate of 5° C. per minute and maintained at 700° C. for 1 hour. Thereafter, it was cooled to room temperature over 3 hours, thereby providing 1.3326 g of a carbon material (C105B).

Pulverization and Acid Cleaning Treatment and Measurement of Specific Surface Area The carbon material (C105B) was pulverized with an agate mortar to provide a non-acid cleaned carbon material. The resulting non-acid cleaned carbon material was measured for the specific surface area by the BET method. The result is shown in Table 2 below in the column of before acid cleaning.

The non-acid cleaned carbon material thus obtained by pulverizing the carbon material (C105B) with an agate mortar was repeatedly subjected to concentrated hydrochloric acid cleaning, centrifugal filtration and removal of the supernatant liquid until coloration was not observed. After rinsing with water, the material was filtered and dried in air. The resulting carbon material was dried under vacuum at 110° C. for 3 hours, allowed to stand until room temperature, and allowed to stand overnight, thereby providing an acid cleaned carbon material (C105C). The resulting acid cleaned carbon material (C105C) was designated as a nitrogen-containing carbon alloy of Comparative Example 105. The specific surface area thereof was measured by the BET method. The result is shown in Table 2 below in the column of after acid cleaning.

Production of Carbon Alloy-Coated Electrode, Measurement of Oxygen Reduction Reaction (ORR) Activity, and Number of Reaction Electrons in Oxygen Reduction Reaction A carbon alloy-coated electrode was produced in the same manner as in Example 101 except that the nitrogen-containing carbon alloy material obtained in Comparative Example 105 was used, and the ORR activity values (electric current density and rising potential) and the number of reaction electrons in oxygen reduction reaction were measured. The results obtained are shown in Table 2 below.

Example 110

Synthesis of Carbon Material of Mixture of Iron(II) Chloride Tetrahydrate and Cobalt(II) Chloride Hexahydrate-Added DCPy (110C)

Preparation of Mixture of Iron(II) Chloride Tetrahydrate and Cobalt(II) Chloride Hexahydrate-Added DCPy 0.270 g of iron(II) chloride tetrahydrate (produced by Wako Pure Chemical Industries, Ltd.) was added to 6.459 g of 3,4-dicyanopyridine (DCPy, produced by Sigma-Aldrich Corporation), which were then dissolved in 350 g of acetone under heating, and then acetone was distilled off. The mixture was dried under heating and vacuum with a vacuum pump, and the resulting solid matter was pulverized. 6.470 g of cobalt(II) chloride hexahydrate (produced by Wako Pure Chemical Industries, Ltd.) was added to the resulting powder to provide a mixture of iron(II) chloride tetrahydrate and cobalt(II) chloride hexahydrate-added DCPy (110A).

Infusiblization and Carbonization Treatment 3.1160 g of the mixture of iron (II) chloride tetrahydrate and cobalt(II) chloride hexahydrate-added DCPy (110A) was weighed in a quartz boat, which was placed at the center of a quartz tube having a diameter of 4.0 cm (inner diameter: 3.6 cm) inserted in a tubular furnace, and nitrogen was made to flow therein at 300 mL per minute at room temperature for 30 minutes.

The temperature was raised from 30° C. to 700° C. at a rate of 5° C. per minute and maintained at 700° C. for 1 hour. Thereafter, it was cooled to room temperature over 3 hours, thereby providing 0.6638 g of a carbon material (110B).

Pulverization and Acid Cleaning Treatment and Measurement of Specific Surface Area The carbon material (110B) was pulverized with an agate mortar and repeatedly subjected to concentrated hydrochloric acid cleaning, centrifugal filtration and removal of the supernatant liquid until coloration was not observed. After rinsing with water, the material was filtered and dried in air. The resulting carbon material was dried under vacuum at 110° C. for 3 hours, allowed to stand until room temperature, and allowed to stand overnight, thereby providing an acid cleaned carbon material (110C). The resulting acid cleaned carbon material (110C) was designated as a nitrogen-containing carbon alloy of Example 110.

Production of Carbon Alloy-Coated Electrode, Measurement of Oxygen Reduction Reaction (ORR) Activity, and Number of Reaction Electrons in Oxygen Reduction Reaction A carbon alloy-coated electrode was produced in the same manner as in Example 101 except that the nitrogen-containing carbon alloy material obtained in Example 110 was used, and the ORR activity values (electric current density and rising potential) and the number of reaction electrons in oxygen reduction reaction were measured. The results obtained are shown in Table 2 below.

Example 111

Synthesis of Carbon Material of Mixture of Iron (II) Chloride Tetrahydrate and Cobalt (II) Chloride Hexahydrate-Added DCPy (111C)

Infusiblization and Carbonization Treatment 3.0781 g of the mixture of iron (II) chloride tetrahydrate and cobalt (II) chloride hexahydrate-added DCPy (110A) of Example 110 was weighed in a quartz boat, which was placed at the center of a quartz tube having a diameter of 4.0 cm (inner diameter: 3.6 cm) inserted in a tubular furnace, and nitrogen was made to flow therein at 300 mL per minute at room temperature for 30 minutes.

The temperature was raised from 30° C. to 900° C. at a rate of 5° C. per minute and maintained at 900° C. for 1 hour. Thereafter, it was cooled to room temperature over 3 hours, thereby providing 0.4339 g of a carbon material (111B).

Pulverization and Acid Cleaning Treatment

The carbon material (111B) was pulverized with an agate mortar and repeatedly subjected to concentrated hydrochloric acid cleaning, centrifugal filtration and removal of the supernatant liquid until coloration was not observed. After rinsing with water, the material was filtered and dried in air. The resulting carbon material was dried under vacuum at 110° C. for 3 hours, allowed to stand until room temperature, and allowed to stand overnight, thereby providing an acid cleaned carbon material (111C). The resulting acid cleaned carbon material (111C) was designated as a nitrogen-containing carbon alloy of Example 111.

Production of Carbon Alloy-Coated Electrode, Measurement of Oxygen Reduction Reaction (ORR) Activity, and Number of Reaction Electrons in Oxygen Reduction Reaction A carbon alloy-coated electrode was produced in the same manner as in Example 101 except that the nitrogen-containing carbon alloy material obtained in Example 111 was used, and the ORR activity values (electric current density and rising potential) and the number of reaction electrons in oxygen reduction reaction were measured. The results obtained are shown in Table 2 below.

Example 112

Rebaking of Carbon Material of Mixture of Iron(II) Chloride Tetrahydrate and Cobalt(II) Chloride Hexahydrate-Added DCPy (112C)

Carbonization Treatment

The nitrogen-containing carbon alloy of Example 110 was rebaked in the following procedures to produce a nitrogen-containing carbon alloy of Example 112.

0.5027 g of the acid cleaned carbon material (110C) of Example 110 was weighed in a quartz boat, which was placed at the center of a quartz tube having a diameter of 4.0 cm (inner diameter: 3.6 cm) inserted in a tubular furnace, and nitrogen was made to flow therein at 300 mL per minute at room temperature for 30 minutes.

The temperature was raised from 30° C. to 900° C. at a rate of 5° C. per minute and maintained at 900° C. for 1 hour. Thereafter, it was cooled to room temperature over 3 hours, thereby providing 0.3820 g of a carbon material (112B).

Pulverization Treatment

The carbon material (112B) was pulverized with an agate mortar to provide a non-acid cleaned carbon material (112C). The resulting non-acid cleaned carbon material (112C) was designated as a nitrogen-containing carbon alloy of Example 112.

Production of Carbon Alloy-Coated Electrode, Measurement of Oxygen Reduction Reaction (ORR) Activity, and Number of Reaction Electrons in Oxygen Reduction Reaction A carbon alloy-coated electrode was produced in the same manner as in Example 101 except that the nitrogen-containing carbon alloy material obtained in Example 112 was used, and the ORR activity values (electric current density and rising potential) and the number of reaction electrons in oxygen reduction reaction were measured. The results obtained are shown in Table 2 below.

Example 113

Acid Treatment of Carbon Material of Mixture of Iron(II) Chloride Tetrahydrate and Cobalt(II) Chloride Hexahydrate-Added DCPy (113C) Acid Treatment The non-acid cleaned carbon material (112C) of Example 112 was repeatedly subjected to concentrated hydrochloric acid cleaning, centrifugal filtration and removal of the supernatant liquid until coloration was not observed. After rinsing with water, the material was filtered and dried in air. The resulting carbon material was dried under vacuum at 110° C. for 3 hours, allowed to stand until room temperature, and allowed to stand overnight, thereby providing an acid cleaned carbon material (113C). The resulting acid cleaned carbon material (113C) was designated as a nitrogen-containing carbon alloy of Example 113. The specific surface area thereof was measured by the BET method. The result is shown in Table 2 below in the column of after acid cleaning.
Production of Carbon Alloy-Coated Electrode, Measurement of Oxygen Reduction Reaction (ORR) Activity, and Number of Reaction Electrons in Oxygen Reduction Reaction A carbon alloy-coated electrode was produced in the same manner as in Example 101 except that the nitrogen-containing carbon alloy material obtained in Example 113 was used, and the ORR activity values (electric current density and rising potential) and the number of reaction electrons in oxygen reduction reaction were measured. The results obtained are shown in Table 2 below.

Comparative Example 106

Synthesis of Carbon Material (C106C) of Cobalt(II) Chloride Hexahydrate-Added 4-NPI Mixture Preparation of Cobalt(II) Chloride Hexahydrate-Added 4-NPI Mixture 4.00 g of cobalt(II) chloride hexahydrate (produced by Wako Pure Chemical Industries, Ltd.) was added to 4.00 g of 4-nitrophthalimide (4-NPI, produced by Wako Pure Chemical Industries, Ltd.) and mixed with an agate mortar to provide a cobalt(II) chloride hexahydrate-added 4-NPI mixture (C106A).

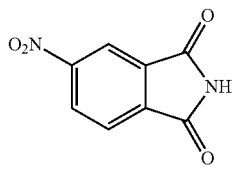

4-NPI

Molecular formula: $C_8H_4N_2O_4$
Molecular weight: 192.13
Elemental analysis (calculated value): C: 50.01, H: 2.10, N: 14.58, O: 4.0
Infusiblization and Carbonization Treatment 3.0364 g of the cobalt(II) chloride hexahydrate-added 4-NPI mixture (C106A) was weighed in a quartz boat, which was placed at the center of a quartz tube having a diameter of 4.0 cm (inner diameter: 3.6 cm) inserted in a tubular furnace, and nitrogen was made to flow therein at 300 mL per minute at room temperature for 30 minutes.

The temperature was raised from 30° C. to 700° C. at a rate of 5° C. per minute and maintained at 700° C. for 1 hour. Thereafter, it was cooled to room temperature over 3 hours, thereby providing 1.2991 g of a carbon material (C106B).
Pulverization and Acid Cleaning Treatment and Measurement of Specific Surface Area The carbon material (C106B) was pulverized with an agate mortar to provide a non-acid cleaned carbon material. The resulting non-acid cleaned carbon material was measured for the specific surface area by the BET method. The result is shown in Table 2 below in the column of before acid cleaning.

The non-acid cleaned carbon material thus obtained by pulverizing the carbon material (C106B) with an agate mortar was repeatedly subjected to concentrated hydrochloric acid cleaning, centrifugal filtration and removal of the supernatant liquid until coloration was not observed. After rinsing with water, the material was filtered and dried in air. The resulting carbon material was dried under vacuum at 110° C. for 3 hours, allowed to stand until room temperature, and allowed to stand overnight, thereby providing an acid cleaned carbon material (C106C). The resulting acid cleaned carbon material (C106C) was designated as a nitrogen-containing carbon alloy of Comparative Example 106. The specific surface area thereof was measured by the BET method. The result is shown in Table 2 below in the column of after acid cleaning.
Production of Carbon Alloy-Coated Electrode, Measurement of Oxygen Reduction Reaction (ORR) Activity, and Number of Reaction Electrons in Oxygen Reduction Reaction A carbon alloy-coated electrode was produced in the same manner as in Example 101 except that the nitrogen-containing carbon alloy material obtained in Comparative Example 106 was used, and the ORR activity values (electric current density and rising potential) and the number of reaction electrons in oxygen reduction reaction were measured. The results obtained are shown in Table 2 below.

Comparative Example 107

Synthesis of Carbon Material (C107C) of Iron(II) Chloride Tetrahydrate-Added BDC1 Mixture Preparation of Iron(II) Chloride Tetrahydrate-Added BDCl Mixture 4.00 g of iron(II) chloride tetrahydrate (produced by Wako Pure Chemical Industries, Ltd.) was added to 4.00 g of benzene-1,2,4,5-tetracarboxylic acid diimide (BDCl, produced by Tokyo Chemical Industry Co., LTD.) and mixed with an agate mortar to provide an iron (II) chloride tetrahydrate-added BDCl mixture (C107A).

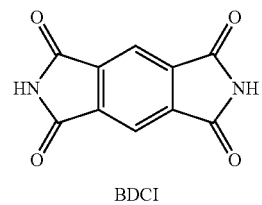

BDCl

Molecular formula: $C_{10}H_4N_2O_4$
Molecular weight: 216.15
Elemental analysis (calculated value): C: 55.57, H: 1.87, N: 12.96, O: 29.61
Infusiblization and Carbonization Treatment 3.2370 g of the iron(II) chloride tetrahydrate-added BDC1 mixture (C107A) was weighed in a quartz boat, which was placed at the center of a quartz tube having a diameter of 4.0 cm (inner diameter: 3.6 cm) inserted in a tubular furnace, and nitrogen was made to flow therein at 300 mL per minute at room temperature for 30 minutes.

The temperature was raised from 30° C. to 700° C. at a rate of 5° C. per minute and maintained at 700° C. for 1 hour. Thereafter, it was cooled to room temperature over 3 hours, thereby providing 0.5673 g of a carbon material (C107B).
Pulverization and Acid Cleaning Treatment and Measurement of Specific Surface Area The carbon material (C107B) was pulverized with an agate mortar to provide a non-acid cleaned carbon material. The resulting non-acid cleaned carbon material was measured for the specific surface area by the BET method. The result is shown in Table 2 below in the column of before acid cleaning.

The non-acid cleaned carbon material thus obtained by pulverizing the carbon material (C107B) with an agate mortar was repeatedly subjected to concentrated hydrochloric acid cleaning, centrifugal filtration and removal of the supernatant liquid until coloration was not observed. After rinsing with water, the material was filtered and dried in air. The resulting carbon material was dried under vacuum at 110° C. for 3 hours, allowed to stand until room temperature, and allowed to stand overnight, thereby providing an acid cleaned carbon material (C107C). The resulting acid cleaned carbon material (C107C) was designated as a nitrogen-containing carbon alloy of Comparative Example 107. The specific surface area thereof was measured by the BET method. The result is shown in Table 2 below in the column of after acid cleaning.

Production of Carbon Alloy-Coated Electrode, Measurement of Oxygen Reduction Reaction (ORR) Activity, and Number of Reaction Electrons in Oxygen Reduction Reaction A carbon alloy-coated electrode was produced in the same manner as in Example 101 except that the nitrogen-containing carbon alloy material obtained in Comparative Example 107 was used, and the ORR activity values (electric current density and rising potential) and the number of reaction electrons in oxygen reduction reaction were measured. The results obtained are shown in Table 2 below.

Example 114

Synthesis of Carbon Material (114C) of Cobalt(II) Chloride Hexahydrate-Added PyDA Mixture Preparation of Cobalt(II) Chloride Hexahydrate-Added PyDA Mixture 4.00 g of cobalt(II) chloride hexahydrate (produced by Wako Pure Chemical Industries, Ltd.) was added to 4.00 g of 3,4-pyridyldiamino (PyDA produced by Tokyo Chemical Industry Co., LTD. Compound (B-15)) and mixed with an agate mortar to provide a cobalt(II) chloride hexahydrate-added PyDA mixture (114A).

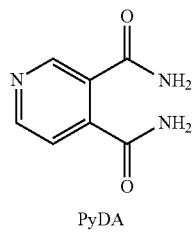 [SMILES: NC(=O)c1ccncc1C(N)=O]

PyDA

Molecular formula: $C_7H_7N_3O_2$
Molecular weight: 165.15
Elemental analysis (calculated value): C: 50.91, H: 4.27, N: 25.44, O: 19.38

Infusiblization and Carbonization Treatment 3.0162 g of the cobalt(II) chloride hexahydrate-added PyDA mixture (114A) was weighed in a quartz boat, which was placed at the center of a quartz tube having a diameter of 4.0 cm (inner diameter: 3.6 cm) inserted in a tubular furnace, and nitrogen was made to flow therein at 300 mL per minute at room temperature for 30 minutes.

The temperature was raised from 30° C. to 700° C. at a rate of 5° C. per minute and maintained at 700° C. for 1 hour. Thereafter, it was cooled to room temperature over 3 hours, thereby providing 0.1808 g of a carbon material (114B).

Pulverization and Acid Cleaning Treatment and Measurement of Specific Surface Area The carbon material (114B) was pulverized with an agate mortar to provide a non-acid cleaned carbon material. The resulting non-acid cleaned carbon material was measured for the specific surface area by the BET method. The result is shown in Table 2 below in the column of before acid cleaning.

The non-acid cleaned carbon material thus obtained by pulverizing the carbon material (114B) with an agate mortar was repeatedly subjected to concentrated hydrochloric acid cleaning, centrifugal filtration and removal of the supernatant liquid until coloration was not observed. After rinsing with water, the material was filtered and dried in air. The resulting carbon material was dried under vacuum at 110° C. for 3 hours, allowed to stand until room temperature, and allowed to stand overnight, thereby providing an acid cleaned carbon material (114C). The resulting acid cleaned carbon material (114C) was designated as a nitrogen-containing carbon alloy of Example 114. The specific surface area thereof was measured by the BET method. The result is shown in Table 2 below in the column of after acid cleaning.

Production of Carbon Alloy-Coated Electrode, Measurement of Oxygen Reduction Reaction (ORR) Activity, and Number of Reaction Electrons in Oxygen Reduction Reaction A carbon alloy-coated electrode was produced in the same manner as in Example 101 except that the nitrogen-containing carbon alloy material obtained in Example 114 was used, and the ORR activity values (electric current density and rising potential) and the number of reaction electrons in oxygen reduction reaction were measured. The results obtained are shown in Table 2 below.

Example 115

Synthesis of Carbon Material (1150) of Cobalt(II) Chloride Hexahydrate-Added TCB Mixture Preparation of Cobalt(II) Chloride Hexahydrate-Added TCB Mixture 4.00 g of cobalt(II) chloride hexahydrate (produced by Wako Pure Chemical Industries, Ltd.) was added to 4.00 g 1,2,4,5-tetracyanobenzene (TCB, produced by Tokyo Chemical Industry Co., LTD.) and mixed with an agate mortar to provide a cobalt (II) chloride hexahydrate-added TCB mixture (115A).

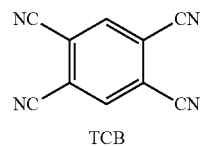

TCB

Molecular formula: $C_{10}H_2N_4$
Molecular weight: 178.15
Elemental analysis (calculated value): C: 67.42, H: 1.13, N: 31.45

Infusiblization and Carbonization Treatment 3.1427 g of the cobalt (II) chloride hexahydrate-added TCB mixture (115A) was weighed in a quartz boat, which was placed at the center of a quartz tube having a diameter of 4.0 cm (inner diameter: 3.6 cm) inserted in a tubular furnace, and nitrogen was made to flow therein at 300 mL per minute at room temperature for 30 minutes.

The temperature was raised from 30° C. to 700° C. at a rate of 5° C. per minute and maintained at 700° C. for 1 hour. Thereafter, it was cooled to room temperature over 3 hours, thereby providing 0.6590 g of a carbon material (115B).

Pulverization and Acid Cleaning Treatment and Measurement of Specific Surface Area The carbon material (115B) was pulverized with an agate mortar to provide a non-acid cleaned carbon material. The resulting non-acid cleaned carbon material was measured for the specific surface area by the BET method. The result is shown in Table 2 below in the column of before acid cleaning.

0.6 g of the non-acid cleaned carbon material thus obtained by pulverizing the carbon material (115B) with an agate mortar was placed in a 12-cc zirconia container, to which 2.1 g of zirconia beads having a diameter of 5 mm and 2.5 g of ethanol were added, and the material was intermittently pulverized with a planetary ball mill P-7, produced by Fritsch GmbH, at 800 rpm for 60 minutes. The resulting non-acid cleaned carbon material was repeatedly subjected to concentrated hydrochloric acid cleaning, centrifugal filtration and removal of the supernatant liquid until coloration was not observed. After rinsing with water, the material was filtered and dried in air. The resulting carbon material was dried under vacuum at 110° C. for 3 hours, allowed to stand until room temperature, and allowed to stand overnight, thereby providing an acid cleaned carbon material (115C). The resulting acid cleaned carbon material (115C) was designated as a nitrogen-containing carbon alloy of Example 115. The specific surface area thereof was measured by the BET method. The result is shown in Table 2 below in the column of after acid cleaning.

Production of Carbon Alloy-Coated Electrode, Measurement of Oxygen Reduction Reaction (ORR) Activity, and Number of Reaction Electrons in Oxygen Reduction Reaction A carbon alloy-coated electrode was produced in the same manner as in Example 101 except that the nitrogen-containing carbon alloy material obtained in Example 115 was used, and the ORR activity values (electric current density and rising potential) and the number of reaction electrons in oxygen reduction reaction were measured. The results obtained are shown in Table 2 below.

Example 116

Synthesis of Carbon Material of Mixture of Iron(II) Chloride Tetrahydrate and Cobalt(II) Chloride Hexahydrate-Added TCB (116C)

Preparation of Mixture of Iron(II) Chloride Tetrahydrate and Cobalt(II) Chloride Hexahydrate-Added TCB 4.00 g of 1,2,4,5-tetracyanobenzene (TCB, produced by Tokyo Chemical Industry Co., LTD.), 2.98 g of iron (II) chloride tetrahydrate (99.9%, produced by Wako Pure Chemical Industries, Ltd.), and 1.78 g of cobalt(II) chloride hexahydrate (99.9%, produced by Wako Pure Chemical Industries, Ltd.) were added and mixed with an agate mortar to provide a mixture of iron(II) chloride tetrahydrate and cobalt(II) chloride hexahydrate-added TCB (116A).

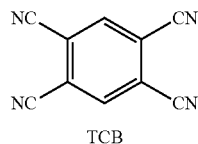

TCB

Molecular formula: $C_{10}H_2N_4$
Molecular weight: 178.15
Elemental analysis (calculated value): C: 67.42, H: 1.13, N: 31.45

Infusiblization and Carbonization Treatment 3.1239 g of mixture of the iron (II) chloride tetrahydrate and cobalt (II) chloride hexahydrate-added TCB (116A) was weighed in a quartz boat, which was placed at the center of a quartz tube having a diameter of 4.0 cm (inner diameter: 3.6 cm) inserted in a tubular furnace, and nitrogen was made to flow therein at 300 mL per minute at room temperature for 30 minutes.

The temperature was raised from 30° C. to 700° C. at a rate of 5° C. per minute and maintained at 700° C. for 1 hour. Thereafter, it was cooled to room temperature over 3 hours, thereby providing 0.8740 g of a carbon material (116B).

Pulverization and Acid Cleaning Treatment and Measurement of Specific Surface Area The carbon material (116B) was pulverized with an agate mortar to provide a non-acid cleaned carbon material. The resulting non-acid cleaned carbon material was measured for the specific surface area by the BET method. The result is shown in Table 2 below in the column of before acid cleaning.

The non-acid cleaned carbon material thus obtained by pulverizing the carbon material (116B) with an agate mortar was repeatedly subjected to concentrated hydrochloric acid cleaning, centrifugal filtration and removal of the supernatant liquid until coloration was not observed. After rinsing with water, the material was filtered and dried in air. The resulting carbon material was dried under vacuum at 110° C. for 3 hours, allowed to stand until room temperature, and allowed to stand overnight, thereby providing an acid cleaned carbon material (116C). The resulting acid cleaned carbon material (116C) was designated as a nitrogen-containing carbon alloy of Example 116. The specific surface area thereof was measured by the BET method. The result is shown in Table 2 below in the column of after acid cleaning.

Production of Carbon Alloy-Coated Electrode, Measurement of Oxygen Reduction Reaction (ORR) Activity, and Number of Reaction Electrons in Oxygen Reduction Reaction A carbon alloy-coated electrode was produced in the same manner as in Example 101 except that the nitrogen-containing carbon alloy material obtained in Example 116 was used, and the ORR activity values (electric current density and rising potential) and the number of reaction electrons in oxygen reduction reaction were measured. The results obtained are shown in Table 2 below.

Comparative Example 108

Synthesis of Carbon Material of Mixture of Iron (II) Chloride Tetrahydrate and 15% of Conductive Assistant-added DCPy (C108C)

Preparation of Mixture of Iron (II) Chloride Tetrahydrate and 15% of Conductive Assistant-Added DCPy 1.20 g of a conductive assistant (Ketjen Black EC600JD) was added to 8.00 g of the iron (II) chloride tetrahydrate-added DCPy mixture of Example 102 and mixed with X-TREME MX1200XTM (produced by Waring Products, Inc.) at 10,000 rpm for 50 seconds to provide a mixture of iron (II) chloride tetrahydrate and 15% of conductive assistant-added DCPy (C108A).

Infusiblization and Carbonization Treatment 1.0349 g of the mixture of iron (II) chloride tetrahydrate and 15% of conductive assistant-added DCPy (C108A) was weighed in a quartz boat, which was placed at the center of a quartz tube having a diameter of 4.0 cm (inner diameter: 3.6 cm) inserted in a tubular furnace, and nitrogen was made to flow therein at 300 mL per minute at room temperature for 30 minutes.

The temperature was raised from 30° C. to 700° C. at a rate of 5° C. per minute and maintained at 700° C. for 1 hour. Thereafter, it was cooled to room temperature over 3 hours, thereby providing 0.7766 g of a carbon material (C108B).

Pulverization and Acid Cleaning Treatment and Measurement of Specific Surface Area The carbon material (C108B) was pulverized with an agate mortar to provide a non-acid cleaned carbon material. The resulting non-acid cleaned carbon material was measured for the specific surface area by the BET method. The result is shown in Table 2 below in the column of before acid cleaning.

The non-acid cleaned carbon material thus obtained by pulverizing the carbon material (C108B) with an agate mortar was repeatedly subjected to concentrated hydrochloric acid cleaning, centrifugal filtration and removal of the supernatant liquid until coloration was not observed. After rinsing with water, the material was filtered and dried in air. The resulting carbon material was dried under vacuum at 110° C. for 3 hours, allowed to stand until room temperature, and allowed to stand overnight, thereby providing an acid cleaned carbon material (C108C). The resulting acid cleaned carbon material (C108C) was designated as a nitrogen-containing carbon alloy of Comparative Example 108. The specific surface area thereof was measured by the BET method. The result is shown in Table 2 below in the column of after acid cleaning.

Production of Carbon Alloy-Coated Electrode, Measurement of Oxygen Reduction Reaction (ORR) Activity, and Number of Reaction Electrons in Oxygen Reduction Reaction A carbon alloy-coated electrode was produced in the same manner as in Example 101 except that the nitrogen-containing carbon alloy material obtained in Comparative Example 108 was used, and the ORR activity values (electric current density and rising potential) and the number of reaction electrons in oxygen reduction reaction were measured. The results obtained are shown in Table 2 below.

Example 117

Synthesis of Carbon Material of Mixture of Iron(II) Chloride Tetrahydrate and 10% of Conductive Assistant-Added DCPy (117C)

Preparation of Mixture of Iron(II) Chloride Tetrahydrate and 10% of Conductive Assistant-Added DCPy 0.80 g of a conductive assistant (Ketjen Black EC600JD) was added to 8.00 g of the iron(II) chloride tetrahydrate-added DCPy mixture of Example 102 and mixed with X-TREME MX1200XTM (produced by Waring Products, Inc.) at 10,000 rpm for 50 seconds to provide a mixture of iron(II) chloride tetrahydrate and 10% of conductive assistant-added DCPy (117A).

Infusiblization and Carbonization Treatment 1.0211 g of the mixture of iron(II) chloride tetrahydrate and 10% of conductive assistant-added DCPy (117A) was weighed in a quartz boat, which was placed at the center of a quartz tube having a diameter of 4.0 cm (inner diameter: 3.6 cm) inserted in a tubular furnace, and nitrogen was made to flow therein at 300 mL per minute at room temperature for 30 minutes.

The temperature was raised from 30° C. to 700° C. at a rate of 5° C. per minute and maintained at 700° C. for 1 hour. Thereafter, it was cooled to room temperature over 3 hours, thereby providing 0.7788 g of a carbon material (117B).

Pulverization and Acid Cleaning Treatment and Measurement of Specific Surface Area The carbon material (117B) was pulverized with an agate mortar to provide a non-acid cleaned carbon material. The resulting non-acid cleaned carbon material was measured for the specific surface area by the BET method. The result is shown in Table 2 below in the column of before acid cleaning.

The non-acid cleaned carbon material thus obtained by pulverizing the carbon material (117B) with an agate mortar was repeatedly subjected to concentrated hydrochloric acid cleaning, centrifugal filtration and removal of the supernatant liquid until coloration was not observed. After rinsing with water, the material was filtered and dried in air. The resulting carbon material was dried under vacuum at 110° C. for 3 hours, allowed to stand until room temperature, and allowed to stand overnight, thereby providing an acid cleaned carbon material (117C). The resulting acid cleaned carbon material (117C) was designated as a nitrogen-containing carbon alloy of Example 117. The specific surface area thereof was measured by the BET method. The result is shown in Table 2 below in the column of after acid cleaning.

Production of Carbon Alloy-Coated Electrode, Measurement of Oxygen Reduction Reaction (ORR) Activity, and Number of Reaction Electrons in Oxygen Reduction Reaction A carbon alloy-coated electrode was produced in the same manner as in Example 101 except that the nitrogen-containing carbon alloy material obtained in Example 117 was used, and the ORR activity values (electric current density and rising potential) and the number of reaction electrons in oxygen reduction reaction were measured. The results obtained are shown in Table 2 below.

Example 118

Synthesis of Carbon Material of Mixture of Iron(II) Chloride Tetrahydrate and 10% of Conductive Assistant-Added DCPy (118C) Infusiblization and Carbonization Treatment 1.0211 g of the mixture of iron(II) chloride tetrahydrate and 10% of conductive assistant-added DCPy (117A) of Example 117 was weighed in a quartz boat, which was placed at the center of a quartz tube having a diameter of 4.0 cm (inner diameter: 3.6 cm) inserted in a tubular furnace, and nitrogen was made to flow therein at 300 mL per minute at room temperature for 30 minutes.

The temperature was raised from 30° C. to 1000° C. at a rate of 5° C. per minute and maintained at 1000° C. for 1 hour. Thereafter, it was cooled to room temperature over 3 hours, thereby providing 0.7113 g of a carbon material (118B).

Pulverization and Acid Cleaning Treatment and Measurement of Specific Surface Area The carbon material (118B) was pulverized with an agate mortar to provide a non-acid cleaned carbon material. The resulting non-acid cleaned carbon material was measured for the specific surface area by the BET method. The result is shown in Table 2 below in the column of before acid cleaning.

The non-acid cleaned carbon material thus obtained by pulverizing the carbon material (118B) with an agate mortar was repeatedly subjected to concentrated hydrochloric acid cleaning, centrifugal filtration and removal of the supernatant liquid until coloration was not observed. After rinsing with water, the material was filtered and dried in air. The resulting carbon material was dried under vacuum at 110° C. for 3 hours, allowed to stand until room temperature, and allowed to stand overnight, thereby providing an acid cleaned carbon material (118C). The resulting acid cleaned carbon material (118C) was designated as a nitrogen-containing carbon alloy of Example 118. The specific surface area thereof was measured by the BET method. The result is shown in Table 2 below in the column of after acid cleaning.

Production of Carbon Alloy-Coated Electrode, Measurement of Oxygen Reduction Reaction (ORR) Activity, and Number of Reaction Electrons in Oxygen Reduction Reaction A carbon alloy-coated electrode was produced in the same manner as in Example 101 except that the nitrogen-containing carbon alloy material obtained in Example 118 was used, and the ORR activity values (electric current density and rising potential) and the number of reaction electrons in oxygen reduction reaction were measured. The results obtained are shown in Table 2 below.

Example 119

Rebaking of Carbon Material of Mixture of Iron(II) Chloride Tetrahydrate and 10% of Conductive Assistant-added DCPy (119C) Carbonization Treatment The nitrogen-containing carbon alloy of Example 117 was rebaked in the following procedures to produce a nitrogen-containing carbon alloy of Example 119.

0.5021 g of the acid cleaned carbon material (117C) of Example 110 was weighed in a quartz boat, which was placed at the center of a quartz tube having a diameter of 4.0 cm (inner diameter: 3.6 cm) inserted in a tubular furnace, and nitrogen was made to flow therein at 300 mL per minute at room temperature for 30 minutes.

The temperature was raised from 30° C. to 1000° C. at a rate of 5° C. per minute and maintained at 1000° C. for 1 hour. Thereafter, it was cooled to room temperature over 3 hours, thereby providing 0.3146 g of a carbon material (119B).

Pulverization and Acid Cleaning Treatment and Measurement of Specific Surface Area The carbon material (119B) was pulverized with an agate mortar to provide a non-acid cleaned carbon material. The resulting non-acid cleaned carbon material was measured for the specific surface area by the BET method. The result is shown in Table 2 below in the column of before acid cleaning.

The non-acid cleaned carbon material thus obtained by pulverizing the carbon material (119B) with an agate mortar was repeatedly subjected to concentrated hydrochloric acid cleaning, centrifugal filtration and removal of the supernatant liquid until coloration was not observed. After rinsing with water, the material was filtered and dried in air. The resulting carbon material was dried under vacuum at 110° C. for 3 hours, allowed to stand until room temperature, and allowed to stand overnight, thereby providing an acid cleaned carbon material (119C). The resulting acid cleaned carbon material (119C) was designated as a nitrogen-containing carbon alloy of Example 119. The specific surface area thereof was measured by the BET method. The result is shown in Table 2 below in the column of after acid cleaning.

Production of Carbon Alloy-Coated Electrode, Measurement of Oxygen Reduction Reaction (ORR) Activity, and Number of Reaction Electrons in Oxygen Reduction Reaction A carbon alloy-coated electrode was produced in the same manner as in Example 101 except that the nitrogen-containing carbon alloy material obtained in Example 119 was used, and the ORR activity values (electric current density and rising potential) and the number of reaction electrons in oxygen reduction reaction were measured. The results obtained are shown in Table 2 below.

TABLE 2

| | Production conditions of nitrogen-containing carbon alloy | | | | | | | | Characteristics of nitrogen-containing carbon alloy | | Characteristics of carbon alloy-coated electrode | |
|---|---|---|---|---|---|---|---|---|---|---|---|---|
| | Nitrogen-containing organic compound 1 (substrate) | Inorganic metal salt (catalyst) | | Catalyst 2 vs Catalyst 1 (mol %) | Ratio of conductive assistant (% by mass, to substrate + catalyst) | Ratio of inorganic metal salt (% by mass, to substrate + catalyst + conductive assistant) | Baking to rebaking temperature (° C.) | Nitrogen flow rate (mL/min) | Specific surface area by BET method (m²/g) | | ORR activity value in 0.05 g/cm² coating (μA · cm⁻²) | Number of ORR reaction electrons in 0.5 g/cm² coating |
| | | Catalyst 1 | Catalyst 2 | | | | | | Before acid cleaning | Nitrogen-containing carbon alloy isolated after acid cleaning | | |
| Example 101 | DCPy | CoCl₂·6H₂O | — | — | — | 50 | 700 | 300 | 167 | 981 | −802 | 3.31 |
| Example 102 | DCPy | FeCl₂·4H₂O | — | — | — | 50 | 600 | 300 | 234 | 1,290 | −523 | 3.42 |
| Example 103 | DCPN | CoCl₂·6H₂O | — | — | — | 50 | 700 | 300 | 285 | 846 | −650 | 3.27 |
| Example 104 | PyCN | CoCl₂·6H₂O | — | — | — | 50 | 700 | 300 | 97 | 832 | −581 | 3.29 |
| Example 105 | PR254 | Fe(bpy)₃Cl₂ | — | — | — | 50 | 700 | 300 | 140 | 653 | −415 | 3.43 |
| Example 106 | DCPA | CoCl₂·6H₂O | — | — | — | 50 | 700 | 300 | 134 | 785 | −683 | 3.33 |
| Example 107 | PyCA | CoCl₂·6H₂O | — | — | — | 50 | 700 | 300 | 252 | 553 | −514 | 3.28 |
| Example 108 | DCPy | CoCl₂·6H₂O | — | — | — | 70 | 700 | 300 | 358 | 1,207 | −629 | 3.29 |
| Example 109 | DCPy | CoCl₂·6H₂O | — | — | — | 60 | 700 | 300 | 243 | 1,149 | −750 | 3.30 |
| Comparative Example 101 | DCPy | CoCl₂·6H₂O | — | — | — | 24 | 700 | 300 | 138 | 269 | −350 | 3.08 |
| Comparative Example 102 | DCPy | FeCl₂·4H₂O | — | — | — | 20 | 700 | 300 | 283 | 341 | −209 | 2.97 |
| Comparative Example 103 | DCPy | — | — | — | — | — | 700 | 300 | — | — | ND | — |
| Comparative Example 104 | DCPy | FePc | — | — | — | 42 | 700 | 300 | 72 | 5.2 | −12 | 3.10 |
| Comparative Example 105 | DCPy | Fe(AcAc)₂ | — | — | — | 25 | 700 | 300 | 209 | 128 | −25 | 2.93 |
| Example 110 | DCPy | CoCl₂·6H₂O | FeCl₂·4H₂O | 5 | — | 50 | 700 | 300 | 139 | 1,101 | −1,221 | 3.56 |
| Example 111 | DCPy | CoCl₂·6H₂O | FeCl₂·4H₂O | 5 | — | 50 | 900 | 300 | 385 | 942 | −683 | 3.74 |
| Example 112 | nitrogen-containing carbon alloy of Example 110 | — | — | — | — | 50 | 700 -> 900 | 300 | 768 | — | −786 | 3.74 |
| Example 113 | nitrogen-containing carbon alloy of Example 112 | — | — | — | — | 50 | — | — | — | 748 | −794 | 3.77 |
| Comparative Example 106 | 4-NPI | CoCl₂·6H₂O | — | — | — | 50 | 700 | 300 | 380 | 480 | −21 | 2.85 |
| Comparative Example 107 | BDCl | FeCl₂·4H₂O | — | — | — | 50 | 700 | 300 | 185 | 1,441 | −188 | 3.18 |
| Example 114 | PyDA | CoCl₂·6H₂O | — | — | — | 50 | 700 | 300 | 83 | 732 | −408 | 3.40 |
| Example 115 | TCB | CoCl₂·6H₂O | — | — | — | 50 | 700 | 300 | 206 | 720 | −940 | 3.35 |
| Example 116 | TCB | FeCl₂·4H₂O | CoCl₂·6H₂O | 50 | — | 54 | 700 | 300 | 145 | 706 | −1,077 | 3.41 |
| Comparative Example 108 | DCPy | FeCl₂·4H₂O | — | — | 15 (KB600) | 43 | 700 | 300 | 385 | 821 | −403 | 3.47 |
| Example 117 | DCPy | FeCl₂·4H₂O | — | — | 10 (KB600) | 45 | 700 | 300 | 359 | 768 | −623 | 3.58 |
| Example 118 | DCPy | FeCl₂·4H₂O | — | — | 10 (KB600) | 45 | 1,000 | 300 | 286 | 673 | −723 | 3.68 |
| Example 119 | nitrogen-containing carbon alloy of Example 117 | — | — | — | — | 45 | 700 -> 1,000 | 300 | 742 | 753 | −786 | 3.74 |

It was understood from Table 2 that the nitrogen-containing carbon alloy produced by the production method of the invention has sufficiently high redox activity or a large number of electrons of redox reaction. Furthermore, it was understood that the nitrogen-containing carbon alloy of the invention that was produced by the more preferred production method of the invention containing the acid cleaning had enhanced redox activity as compared to the nitrogen-containing carbon alloy before the acid cleaning. The fact that the capability of the nitrogen-containing carbon alloy is largely enhanced by isolating after the acid cleaning is unexpected from JP-A-2011-245431 and the other related art literatures, in which the value before acid cleaning and the value after acid cleaning are not directly compared to each other.

On the other hand, it was understood from Comparative Examples 101, 102, 104 and 105 that in the case where the ratio of the inorganic metal salt was smaller than the lower limit defined in the invention, the redox activity was low, and the number of reaction electrons of redox reaction was small.

It was understood from Comparative Example 103 that in the case where the inorganic metal salt was not used, no carbon alloy was able to be produced. The term ND for the ORR activity of Comparative Example 103 means that no carbonized material is obtained.

It was understood from Comparative Example 106 that in the case where a nitrogen-containing organic compound having phthalimide as a substituent, which was outside the scope of the invention, the redox activity was low, and the number of reaction electrons of redox reaction was small.

Evaluation of Electric Power Generation Capability of Fuel Cell

Non-platinum catalyst inks for cathode (13E), (17E), (18E) and (20E) were prepared with the nitrogen-containing carbon alloy materials of the invention, and comparative carbon material inks for cathode (C1E), (C2E), (C4E) and (C5E) were prepared. Electrode composite membranes were prepared with the inks, and cells (Cell-1) to (Cell-8) for evaluation were fabricated and measured for electric current and voltage.

(1) Preparation of Catalyst Ink
(1)-1 Preparation of Catalyst Ink for Cathode (20E)

0.1 g of the nitrogen-containing carbon alloy material (20C) of Example 20, 1.0 g of a 5% by mass Nafion, a registered trade name, solution (solvent: mixture of water and lower alcohol, produced by Sigma-Aldrich Corporation, product No. 274704), 0.25 mL of water (ion-exchanged water) and 0.5 mL of 1-propanol were dispersed with an ultrasonic dispersing device for 2.5 hours to provide a non-platinum catalyst ink for cathode (20E).

(1)-2 Preparation of Catalyst Ink for Anode 0.5 g of platinum-carried carbon having 50% by mass of platinum carried thereon (TEC10V50E, produced by Tanaka Kikinzoku Kogyo Co., Ltd.) was weighed in a glass container, to which 0.8 mL of water was added, and then the glass container was sealed with a septum seal, followed by substituting the interior of the container with nitrogen. 4.3 mL of a 5% by mass Nafion solution, which was the same as above, and 1 mL of 1-propanol were injected into the glass container, which was then irradiated with ultrasonic wave for 2.5 hours to provide a catalyst ink for anode.

(2) Production of Catalyst Coated Membrane for Transfer
(2)-1 Preparation of Catalyst Membrane for Cathode The catalyst ink for cathode prepared in (1)-1 was coated on a Teflon, a registered trade name, sheet base with an applicator having a clearance of 200 μm, and was slowly dried over 24 hours. After drying, the coated membrane was cut into a square shape of 5 cm×5 cm. The weight of the coated membrane, which was obtained by subtracting the weight of the base from the coated membrane, was 67.5 mg (2.7 mg/cm$^2$).

(2)-2 Preparation of Catalyst Membrane for Anode

The catalyst ink for anode prepared in (1)-2 was coated on a Teflon, a registered trade name, sheet base with an applicator having a clearance of 300 μm, and was slowly dried over 24 hours. After drying, the coated membrane was cut into a square shape of 5 cm×5 cm. The weight of the coated membrane, which was obtained by subtracting the weight of the base from the coated membrane, was 18 mg (0.24 mg/cm$^2$).

(3) Preparation of Protonic Conductive Membrane for Transfer

A Nafion membrane (NR212, produced by DuPont Corporation) was cut into a square shape of 8 cm×8 cm, and the membrane was immersed in a 1 mol/L aqueous solution for 10 hours, rinsed with ion exchanged water, and then dried to provide a protonic conductive membrane for transfer.

(4) Preparation of Electrode Composite Membrane

The catalyst membrane prepared in (2)-1, the protonic conductive membrane prepared in (3) and the catalyst membrane prepared in (2)-2 were laminated in this order and held between two polyimide membranes (Upilex 75, produced by Ube Industries, Ltd.) having been cut into a square shape of 10 cm×10 cm. At this time, the catalyst membranes were disposed at the center of the protonic conductive membrane with the coated surfaces thereof directed to the protonic conductive membrane. The laminated sheet was pressed at 210° C. and 15 MPa for 10 minutes. The heat-pressed membranes were taken out from the two polyimide membranes, and the Teflon, a registered trade name, sheets as the base of the cathode coated membrane and the anode coated membrane were released, thereby providing an electrode composite membrane containing the protonic conductive membrane having the catalyst layers transferred to both surfaces thereof. The electrode composite membrane was immersed in a 0.5 mol/L sulfuric acid aqueous solution for 10 hours, then rinsed with water and dried, thereby providing the target electrode composite membrane.

(5) Fabrication of Fuel Cell for Evaluation

The electrode composite membrane obtained in (4) was held between two carbon cloth sheets (ELAT gas diffusion layer, produced by BASF AG) cut into a square shape of 5 cm×5 cm, and installed in a JARI standard cell (produced by FC Development Co., Ltd.) with a gasket (formed of Teflon) having a thickness of 200 μm, thereby providing a fuel cell having a catalyst effective area of 25 cm$^2$ (Cell-1). Preparation of electrode composite membrane. The catalyst membrane prepared in (2)-1, the protonic conductive membrane prepared in (3) and the catalyst membrane prepared in (2)-2 were laminated in this order and held between two polyimide membranes (Upilex 75, produced by Ube Industries, Ltd.) having been cut into a square shape of 10 cm×10 cm. At this time, the catalyst membranes were disposed at the center of the protonic conductive membrane with the coated surfaces directed to the protonic conductive membrane. The laminated sheet was pressed at 210° C. and 15 MPa for 10 minutes. The heat-pressed membranes were taken out from the two polyimide membranes, and the Teflon, a registered trade name, sheets were released, thereby providing an electrode composite membrane containing the protonic conductive membrane having the catalyst layers transferred to both surfaces thereof.

(6) Fabrication of Fuel Cell for Evaluation

The electrode composite membrane obtained in (4) was held between two carbon cloth sheets (ELAT gas diffusion layer, produced by BASF AG) cut into a square shape of 5 cm×5 cm, and installed in a JARI standard cell (produced by FC Development Co., Ltd.) with a gasket (formed of Teflon) having a thickness of 200 μm, thereby providing a fuel cell having a catalyst effective area of 25 cm$^2$ (Cell-1).

(7) Evaluation of Capability of Electric Power Generation

The fuel cell was maintained at 80° C., to which moistened hydrogen was fed to the anode, and moistened air was fed to the cathode. Hydrogen and air were moistened by passing the gases through bubblers containing water. The water temperature of the bubbler for hydrogen was 80° C., and the water temperature of the bubbler for air was 80° C. The gas flow rate of hydrogen was 1,000 mL/min, and the gas flow rate of air was 2,500 mL/min, which were measured under ordinary pressure.

The electric current value of the fuel cell was changed from 0 A to 16 A every 30 seconds, and the voltages that were stable at each of the current values were measured.

Cells for evaluation (Cell-2) to (Cell-8) were fabricated in the same procedures in (1) to (5) except that the non-platinum catalyst inks for cathode (13E), (17E) and (18E) prepared with the nitrogen-containing carbon alloy materials of the invention and the carbon material inks for cathode (C1E) to (C5E) of Comparative Examples were used instead of the carbon material ink for cathode (20E) of Example 20 used in (1)-1, and were measured for electric current and voltage in the same manner as in (6). The voltages at an electric current value of 2 A are shown in Table 3.

TABLE 3

| Cell No. | Carbon material | Cell voltage at 2 A (V) | Note |
| --- | --- | --- | --- |
| 1 | 20E | 0.56 | Invention |
| 2 | 17E | 0.48 | Invention |
| 3 | 18E | 0.54 | Invention |
| 4 | 13E | 0.43 | Invention |
| 5 | C1E | 0.22 | Comparative example |
| 6 | C2E | 0.18 | Comparative example |
| 7 | C4E | 0.04 | Comparative example |
| 8 | C5E | 0.08 | Comparative example |

It was understood from Table 3 that all Cell-1 to Cell-4 using the nitrogen-containing carbon alloys produced by the production method of the invention had high electric power generation capability.

In particular, it was understood that the nitrogen-containing carbon alloy of the invention produced by the multi-stage production, which was a preferred production method according to the invention, had higher electric power generation capability than the nitrogen-containing carbon alloy that was produced by the single stage baking.

On the other hand, it was understood from Cell-5 to Cell-8 using the carbon materials of Comparative Examples 1, 2, 4 and 5 that in the case where, in addition to the nitrogen-containing organic compound, one of the inorganic metal salt and the organic metal complex was not contained in the precursor mixture, the electric power generation capability was low.

As compared to Cell-5 and Cell-6 using the carbon material containing only the inorganic metal salt added, Cell-1 to Cell-4 using the carbon materials containing the inorganic metal salt and the organic metal complex added show higher electric power generation capability.

As compared to Cell-7 and Cell-8 using only the organic metal complex, Cell-1 to Cell-4 using the carbon materials containing the inorganic metal salt and the organic metal complex added show higher electric power generation capability.

It was unexpected that the electric power generation capability was enhanced by making both the organic metal complex and the inorganic metal salt present exist in combination with each other.

REFERENCE SIGN LIST 10 fuel cell
12 separator
13 anode electrode catalyst
14 solid polymer electrolyte
15 cathode electrode catalyst
16 separator
20 electric double layer capacitor
21 first electrode
22 second electrode
23 separator
24a outer lid
24b outer chassis
25 collector
26 gasket While the present invention has been described in detail and with reference to specific embodiments thereof, it will be apparent to one skilled in the art that various changes and modifications can be made therein without departing from the spirit and scope thereof.

The present disclosure relates to the subject matter contained in International Application No. PCT/JP2013/053926, filed Feb. 19, 2013, and Japanese Patent Application No. 2012-033640, filed Feb. 20, 2012, the contents of which are expressly incorporated herein by reference in their entirety. All the publications referred to in the present specification are also expressly incorporated herein by reference in their entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims.

What is claimed is:

1. A method for producing a nitrogen-containing carbon alloy comprising baking a precursor containing a nitrogen-containing organic compound and an inorganic metal salt containing one or more kinds of Fe, Co, Ni, Mn and Cr, wherein:

the precursor satisfies one of the requirements (a) and (b) below, and, the nitrogen-containing organic compound is one of a compound represented by the formula (1) below, a tautomer of the compound, and a salt and hydrate thereof:

(a) the precursor contains the inorganic metal salt in an amount exceeding 45% by mass based on the total amount of the nitrogen-containing organic compound and the inorganic metal salt of the precursor, in which the total amount includes the mass of hydrated water in the nitrogen-containing organic compound and the inorganic metal salt, and the amount of the inorganic metal salt includes the mass of hydrated water in the inorganic metal, (b) the precursor further contains a β-diketone metal complex:

  Formula (1)

wherein, Q represents a 5-membered to 7-membered aromatic or heterocyclic ring, R represents a substituent represented by the following formulae (2) to (5), and n represents an integer of from 1 to 4;

  Formula (2)

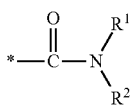  Formula (3)

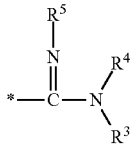  Formula (4)

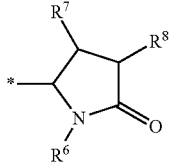  Formula (5)

wherein, $R^1$ to $R^8$ each independently represent a hydrogen atom, a substituted or unsubstituted alkyl group, a substituted or unsubstituted aryl group, a substituted or unsubstituted heterocyclic group, or a substituted or unsubstituted heterocyclic group that is formed by taking $R^1$ and $R^2$ together, or taking $R^3$ and $R^4$ together, or taking $R^7$ and $R^8$ together, and * represents a site bonded to Q.

2. The method for producing a nitrogen-containing carbon alloy according to claim 1, comprising baking a precursor containing at least one nitrogen-containing organic compound, an inorganic metal salt containing one or more kinds of Fe, Co, Ni, Mn and Cr, and at least one β-diketone metal complex, wherein:

the nitrogen-containing organic compound is one of a compound represented by the following formula (1), a tautomer of the compound, and, a salt and hydrate thereof:

  Formula (1)

wherein, Q represents a 5-membered to 7-membered aromatic or heterocyclic ring, R represents a substituent represented by the following formulae (2) to (5), and n represents an integer of from 1 to 4;

  Formula (2)

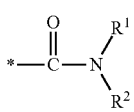  Formula (3)

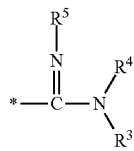  Formula (4)

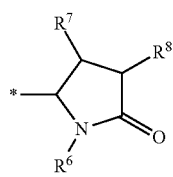  Formula (5)

wherein, $R^1$ to $R^8$ each independently represent a hydrogen atom, a substituted or unsubstituted alkyl group, a substituted or unsubstituted aryl group, a substituted or unsubstituted heterocyclic group, or a substituted or unsubstituted heterocyclic group that is formed by taking $R^1$ and $R^2$ together, or taking $R^3$ and $R^4$ together, or taking $R^7$ and $R^8$ together, and * represents a site bonded to Q.

3. The method for producing a nitrogen-containing carbon alloy according to claim 2, wherein the β-diketone metal complex is represented by the following formula (6):

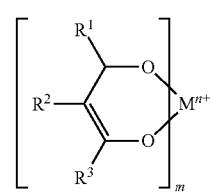  Formula (6)

wherein, M represents a metal, $R^1$ and $R^3$ each independently represent a hydrocarbon group which may have a substituent, and $R^2$ represents a hydrogen atom or a hydrocarbon group which may have a substituent, and $R^1$, $R^2$ and $R^3$ may be bonded to each other to form a ring, and n represents an integer of 0 or more, and m represents an integer of 1 or more, and in the β-diketone metal complex, β-diketone or an ion thereof is coordinated or bound to an atom or an ion of the metal M.

4. The method for producing a nitrogen-containing carbon alloy according to claim 2, wherein the β-diketone metal complex is acetylacetone iron(II), bis(dipivaloylmethane)iron(II), bis(diisobutoxymethane)iron(II), bis(isobutoxypivaloylmethane)iron(II), or bis(tetramethyloctadione)iron(II).

5. The method for producing a nitrogen-containing carbon alloy according to claim 2, wherein the inorganic metal salt is a halide.

6. The method for producing a nitrogen-containing carbon alloy according to claim 2, wherein the inorganic metal salt contains Fe or Co.

7. The method for producing a nitrogen-containing carbon alloy according to claim 2, wherein, in the formula (1), Q represents a 5- or 6-membered aromatic ring, a 5- or 6-membered heterocyclic ring, or a condensed ring thereof.

8. The method for producing a nitrogen-containing carbon alloy according to claim 2, wherein, in the formula (1), Q represents a benzene ring, a pyridine ring, or a condensed ring thereof.

9. The method for producing a nitrogen-containing carbon alloy according to claim 2, wherein the nitrogen-containing organic compound is a compound represented by the following formula (7) or (8), or a multimer of two or more compounds containing two or more moiety represented by the formula (7) or (8):

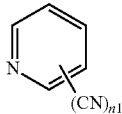

Formula (7)

Formula (8)

wherein, n1 represents an integer of from 1 to 5, and n2 represents an integer of from 1 to 6.

10. The method for producing a nitrogen-containing carbon alloy according to claim 2, further comprising cleaning the baked nitrogen-containing carbon alloy with an acid.

11. The method for producing a nitrogen-containing carbon alloy according to claim 10, further comprising rebaking the nitrogen-containing carbon alloy cleaned with an acid.

12. The method for producing a nitrogen-containing carbon alloy according to claim 2, wherein the precursor further contains a conductive assistant.

13. A nitrogen-containing carbon alloy produced by baking a precursor containing at least one nitrogen-containing organic compound, an inorganic metal salt containing one or more kinds of Fe, Co, Ni, Mn and Cr, and at least one β-diketone metal complex, wherein:

the nitrogen-containing organic compound is one of a compound represented by the following formula (1), a tautomer of the compound, and, a salt and hydrate thereof:

$$Q\text{-}(R)_n$$  Formula (1)

wherein, Q represents a 5-membered to 7-membered aromatic or heterocyclic ring, R represents a substituent represented by the following formulae (2) to (5), and n represents an integer of from 1 to 4;

Formula (2)

Formula (3)

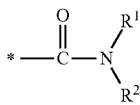

Formula (4)

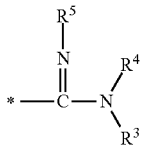

Formula (5)

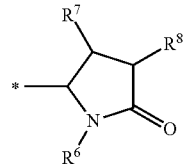

wherein, $R^1$ to $R^8$ each independently represent a hydrogen atom, a substituted or unsubstituted alkyl group, a substituted or unsubstituted aryl group, a substituted or unsubstituted heterocyclic group, or a substituted or unsubstituted heterocyclic group that is formed by taking $R^1$ and $R^2$ together, or taking $R^3$ and $R^4$ together, or taking $R^7$ and $R^8$ together, and * represents a site bonded to Q.

14. The nitrogen-containing carbon alloy according to claim 13, wherein specific surface area of the nitrogen-containing carbon alloy obtained by a Brunauer-Emmett-Teller method is 670 m²/g or more.

15. A carbon alloy catalyst containing a nitrogen-containing carbon alloy produced by baking a precursor containing at least one nitrogen-containing organic compound, an inorganic metal salt containing one or more kinds of Fe, Co, Ni, Mn, and Cr, and at least one β-diketone metal complex, wherein:

the nitrogen-containing organic compound is one of a compound represented by the following formula (1), a tautomer of the compound, and, a salt and hydrate thereof:

$$Q\text{-}(R)_n$$  Formula (1)

wherein, Q represents a 5-membered to 7-membered aromatic or heterocyclic ring, R represents a substituent represented by the following formulae (2) to (5), and n represents an integer of from 1 to 4;

Formula (2)

Formula (3)

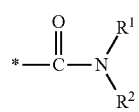

Formula (4)

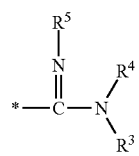

Formula (5)

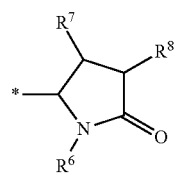

wherein, $R^1$ to $R^8$ each independently represent a hydrogen atom, a substituted or unsubstituted alkyl group, a substituted or unsubstituted aryl group, a substituted or unsubstituted heterocyclic group, or a substituted or unsubstituted heterocyclic group that is formed by taking $R^1$ and $R^2$ together, or taking $R^3$ and $R^4$ together, or taking $R^7$ and $R^8$ together, and * represents a site bonded to Q.

16. The carbon alloy catalyst according to claim 15, wherein a coated amount of the nitrogen-containing carbon alloy after drying is 0.05 mg/cm² or more.

17. A membrane-electrode assembly including a carbon alloy catalyst containing a nitrogen-containing carbon alloy produced by baking a precursor containing at least one nitrogen-containing organic compound, an inorganic metal salt containing one or more kinds of Fe, Co, Ni, Mn, and Cr, and at least one β-diketone metal complex, wherein:

the nitrogen-containing organic compound is one of a compound represented by the following formula (1), a tautomer of the compound, and, a salt and hydrate thereof:

$$Q(\!-\!R)_n \qquad \text{Formula (1)}$$

wherein, Q represents a 5-membered to 7-membered aromatic or heterocyclic ring, R represents a substituent represented by the following formulae (2) to (5), and n represents an integer of from 1 to 4;

  Formula (2)

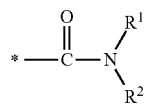  Formula (3)

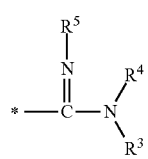  Formula (4)

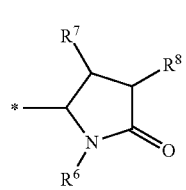  Formula (5)

wherein, $R^1$ to $R^8$ each independently represent a hydrogen atom, a substituted or unsubstituted alkyl group, a substituted or unsubstituted aryl group, a substituted or unsubstituted heterocyclic group, or a substituted or unsubstituted heterocyclic group that is formed by taking $R^1$ and $R^2$ together, or taking $R^3$ and $R^4$ together, or taking $R^7$ and $R^8$ together, and * represents a site bonded to Q.

18. A fuel cell including a carbon alloy catalyst containing a nitrogen-containing carbon alloy produced by baking a precursor containing at least one nitrogen-containing organic compound, an inorganic metal salt containing one or more kinds of Fe, Co, Ni, Mn, and Cr, and at least one β-diketone metal complex, wherein:

the nitrogen-containing organic compound is one of a compound represented by the following formula (1), a tautomer of the compound, and, a salt and hydrate thereof:

$$Q(\!-\!R)_n \qquad \text{Formula (1)}$$

wherein, Q represents a 5-membered to 7-membered aromatic or heterocyclic ring, R represents a substituent represented by the following formulae (2) to (5), and n represents an integer of from 1 to 4;

  Formula (2)

Formula (3)

Formula (4)

Formula (5)

wherein, $R^1$ to $R^8$ each independently represent a hydrogen atom, a substituted or unsubstituted alkyl group, a substituted or unsubstituted aryl group, a substituted or unsubstituted heterocyclic group, or a substituted or unsubstituted heterocyclic group that is formed by taking $R^1$ and $R^2$ together, or taking $R^3$ and $R^4$ together, or taking $R^7$ and $R^8$ together, and * represents a site bonded to Q.

* * * * *